United States Patent
Chitalia et al.

(10) Patent No.: US 12,489,696 B2
(45) Date of Patent: *Dec. 2, 2025

(54) POLICY CONTROLLER FOR DISTRIBUTED VIRTUALIZATION INFRASTRUCTURE ELEMENT MONITORING

(71) Applicant: Juniper Networks, Inc., Sunnyvale, CA (US)

(72) Inventors: Harshit Naresh Chitalia, Mountain View, CA (US); Avi K. Patel, San Jose, CA (US); Parantap Roy, Mountain View, CA (US); Travis Gregory Newhouse, Encinitas, CA (US); Sumeet Singh, Saratoga, CA (US); Neeren Shripad Patki, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/532,070

(22) Filed: Dec. 7, 2023

(65) Prior Publication Data
US 2024/0113950 A1  Apr. 4, 2024

Related U.S. Application Data

(63) Continuation of application No. 17/645,594, filed on Dec. 22, 2021, now Pat. No. 11,888,714, which is a
(Continued)

(51) Int. Cl.
*G06F 11/00* (2006.01)
*G06F 9/50* (2006.01)
(Continued)

(52) U.S. Cl.
CPC .......... *H04L 43/045* (2013.01); *G06F 9/5072* (2013.01); *G06F 11/3006* (2013.01);
(Continued)

(58) Field of Classification Search
CPC .. G06F 11/30; G06F 11/3003; G06F 11/3006; G06F 3/048
See application file for complete search history.

(56) References Cited

U.S. PATENT DOCUMENTS

D379,695 S  6/1997  Africa
6,182,157 B1  1/2001  Schlener et al.
(Continued)

FOREIGN PATENT DOCUMENTS

CN  1787424 A  6/2006
CN  102045537 A  5/2011
(Continued)

OTHER PUBLICATIONS

"AppFormix Metrics," AppFormix, Aug. 6, 2017, 6 pp.
(Continued)

*Primary Examiner* — Jonathan D Gibson
(74) *Attorney, Agent, or Firm* — Shumaker & Sieffert, P.A.

(57) ABSTRACT

This disclosure describes techniques for monitoring, scheduling, and performance management for virtualization infrastructures within networks. In one example, a computing system includes a plurality of different cloud-based compute clusters (e.g., different cloud projects), each comprising a set of compute nodes. Policy agents execute on the compute nodes to monitor performance and usage metrics relating to resources of the compute nodes. Policy controllers within each cluster deploy policies to the policy agents and evaluate performance and usage metrics from the policy agents by application of one or more rulesets for infrastructure elements of the compute cluster. Each of the policy controllers outputs data to a multi-cluster dashboard software system indicative of a current health status for the infrastructure elements based on the evaluation of the performance and usage metrics for the cluster. The multi-cluster dashboard
(Continued)

software system data outputs, as single user interface screen, the current health status for each of the cloud-based compute clusters.

20 Claims, 19 Drawing Sheets

Related U.S. Application Data continuation of application No. 17/120,420, filed on Dec. 14, 2020, now Pat. No. 11,240,128, which is a continuation of application No. 15/846,400, filed on Dec. 19, 2017, now Pat. No. 10,868,742.

(60) Provisional application No. 62/487,244, filed on Apr. 19, 2017, provisional application No. 62/487,254, filed on Apr. 19, 2017, provisional application No. 62/478,515, filed on Mar. 29, 2017.

(51) Int. Cl.
| | |
|---|---|
| *G06F 11/30* | (2006.01) |
| *G06F 11/32* | (2006.01) |
| *G06F 11/34* | (2006.01) |
| *G06F 21/41* | (2013.01) |
| *H04L 43/045* | (2022.01) |
| *H04L 43/06* | (2022.01) |
| *H04L 43/0876* | (2022.01) |
| *G06F 3/04847* | (2022.01) |

(52) U.S. Cl.
CPC ........ *G06F 11/327* (2013.01); *G06F 11/3433* (2013.01); *G06F 11/3452* (2013.01); *G06F 21/41* (2013.01); *H04L 43/06* (2013.01); *H04L 43/0876* (2013.01); *G06F 3/04847* (2013.01); *G06F 2201/815* (2013.01); *G06F 2209/508* (2013.01); *G06F 2221/2137* (2013.01)

(56) References Cited

U.S. PATENT DOCUMENTS

| | | | |
|---|---|---|---|
| 6,493,316 B1 | 12/2002 | Chapman et al. | |
| 6,678,835 B1 | 1/2004 | Shah et al. | |
| 6,741,563 B2 | 5/2004 | Packer | |
| 6,754,228 B1 | 6/2004 | Ludwig | |
| 6,941,355 B1 | 9/2005 | Donaghey et al. | |
| 6,968,291 B1 | 11/2005 | Desai | |
| 7,032,022 B1 | 4/2006 | Shanumgam et al. | |
| 7,389,462 B1 | 6/2008 | Wang et al. | |
| 7,433,304 B1 | 10/2008 | Galloway et al. | |
| 7,580,996 B1 | 8/2009 | Allan et al. | |
| 7,802,234 B2 | 9/2010 | Sarukkai et al. | |
| 8,019,698 B1 * | 9/2011 | Dryer | G06F 9/451 706/45 |
| 8,102,881 B1 | 1/2012 | Vincent | |
| 8,332,688 B1 | 12/2012 | Tompkins | |
| 8,332,953 B2 | 12/2012 | Lemieux et al. | |
| 8,413,144 B1 | 4/2013 | Manmohan et al. | |
| 8,527,982 B1 | 9/2013 | Sapuntzakis et al. | |
| 8,601,471 B2 | 12/2013 | Beaty et al. | |
| 8,738,972 B1 | 5/2014 | Bakman et al. | |
| 9,176,759 B1 | 11/2015 | Sahasranaman et al. | |
| 9,239,727 B1 | 1/2016 | Panchapakesan | |
| 9,258,313 B1 | 2/2016 | Knappe et al. | |
| 9,275,172 B2 | 3/2016 | Ostermeyer et al. | |
| 9,319,286 B2 | 4/2016 | Panuganty | |
| 9,344,334 B2 | 5/2016 | Sharp et al. | |
| 9,385,959 B2 | 7/2016 | Kompella et al. | |
| 9,501,309 B2 | 11/2016 | Doherty et al. | |
| 9,552,221 B1 | 1/2017 | Pora | |
| 9,600,307 B1 | 3/2017 | Pulkayath et al. | |
| 9,641,435 B1 | 5/2017 | Sivaramakrishnan | |
| 9,817,695 B2 | 11/2017 | Clark | |
| 9,830,190 B1 | 11/2017 | Pfleger, Jr. | |
| 9,900,262 B2 | 2/2018 | Testa et al. | |
| 9,906,454 B2 | 2/2018 | Prakash et al. | |
| 9,929,962 B2 | 3/2018 | Prakash et al. | |
| 9,940,111 B2 | 4/2018 | Labocki et al. | |
| 10,044,723 B1 | 8/2018 | Fischer et al. | |
| 10,061,657 B1 | 8/2018 | Chopra et al. | |
| 10,116,574 B2 | 10/2018 | Kompella et al. | |
| 10,164,842 B2 * | 12/2018 | Rizzi | H04L 41/22 |
| 10,191,778 B1 | 1/2019 | Yang et al. | |
| 10,284,416 B2 | 5/2019 | Srinivasan | |
| 10,284,627 B2 | 5/2019 | Lang et al. | |
| 10,291,472 B2 | 5/2019 | Banka | |
| 10,355,997 B2 | 7/2019 | Kompella et al. | |
| 10,437,621 B2 | 10/2019 | Haque et al. | |
| 10,581,687 B2 | 3/2020 | Singh et al. | |
| 10,728,121 B1 | 7/2020 | Chitalia et al. | |
| 10,841,181 B2 | 11/2020 | Cote et al. | |
| 10,868,742 B2 | 12/2020 | Chitalia et al. | |
| 11,068,314 B2 | 7/2021 | Roy et al. | |
| 11,070,452 B1 * | 7/2021 | Roy | H04L 43/0876 |
| 11,106,480 B2 * | 8/2021 | Wang | G06F 9/45558 |
| 11,140,039 B2 | 10/2021 | Singh et al. | |
| 11,210,160 B1 * | 12/2021 | Dukhovny | G06F 11/0751 |
| 11,240,128 B2 | 2/2022 | Chitalia et al. | |
| 11,323,327 B1 | 5/2022 | Chitalia et al. | |
| 11,615,117 B2 * | 3/2023 | Funke | G06F 16/2455 707/831 |
| 11,658,874 B2 | 5/2023 | Banka et al. | |
| 11,740,921 B2 | 8/2023 | Olmsted-Thompson et al. | |
| 11,888,714 B2 | 1/2024 | Chitalia et al. | |
| 2002/0031088 A1 | 3/2002 | Packer | |
| 2003/0065676 A1 | 4/2003 | Gbadegesin et al. | |
| 2004/0054791 A1 | 3/2004 | Chakraborty et al. | |
| 2004/0073596 A1 | 4/2004 | Kloninger et al. | |
| 2004/0088322 A1 | 5/2004 | Elder et al. | |
| 2004/0088412 A1 | 5/2004 | John et al. | |
| 2004/0088606 A1 | 5/2004 | Robison et al. | |
| 2005/0058131 A1 | 3/2005 | Samuels et al. | |
| 2005/0091657 A1 | 4/2005 | Priem | |
| 2005/0132032 A1 | 6/2005 | Bertrand | |
| 2005/0228878 A1 | 10/2005 | Anstey et al. | |
| 2006/0101144 A1 | 5/2006 | Wiryaman et al. | |
| 2006/0259733 A1 | 11/2006 | Yamazaki et al. | |
| 2006/0271680 A1 | 11/2006 | Shalev et al. | |
| 2006/0294238 A1 | 12/2006 | Naik et al. | |
| 2007/0014246 A1 | 1/2007 | Aloni et al. | |
| 2007/0024898 A1 | 2/2007 | Uemura et al. | |
| 2007/0106769 A1 | 5/2007 | Liu | |
| 2007/0248017 A1 | 10/2007 | Hinata et al. | |
| 2007/0266136 A1 | 11/2007 | Esfabany et al. | |
| 2007/0288224 A1 | 12/2007 | Sundarrajan et al. | |
| 2008/0082977 A1 | 4/2008 | Araujo et al. | |
| 2008/0098332 A1 | 4/2008 | LaFrance-Linden et al. | |
| 2008/0140820 A1 | 6/2008 | Snyder et al. | |
| 2008/0222633 A1 | 9/2008 | Kami | |
| 2008/0250415 A1 | 10/2008 | Illikkal et al. | |
| 2008/0253325 A1 | 10/2008 | Park et al. | |
| 2008/0270199 A1 | 10/2008 | Chess et al. | |
| 2008/0320147 A1 | 12/2008 | Delima et al. | |
| 2009/0028061 A1 | 1/2009 | Zaencker | |
| 2009/0172315 A1 | 7/2009 | Ayer et al. | |
| 2009/0183173 A1 | 7/2009 | Becker et al. | |
| 2009/0199178 A1 | 8/2009 | Keller et al. | |
| 2009/0228954 A1 | 9/2009 | Hu et al. | |
| 2010/0011270 A1 | 1/2010 | Yamamoto et al. | |
| 2010/0037291 A1 | 2/2010 | Tarkhanyan et al. | |
| 2010/0095300 A1 | 4/2010 | West et al. | |
| 2010/0125477 A1 | 5/2010 | Mousseau et al. | |
| 2011/0072486 A1 | 3/2011 | Hadar et al. | |
| 2011/0128853 A1 | 6/2011 | Nishimura | |
| 2011/0149737 A1 | 6/2011 | Muthiah et al. | |
| 2011/0154131 A1 | 6/2011 | Roney et al. | |
| 2011/0219447 A1 | 9/2011 | Horovitz et al. | |
| 2011/0276699 A1 | 11/2011 | Pedersen | |
| 2011/0289204 A1 | 11/2011 | Hansson et al. | |
| 2012/0002669 A1 | 1/2012 | Dietterle et al. | |

(56) References Cited

U.S. PATENT DOCUMENTS

| | | |
|---|---|---|
| 2012/0054330 A1 | 3/2012 | Loach |
| 2012/0054763 A1 | 3/2012 | Srinivasan |
| 2012/0096167 A1 | 4/2012 | Free et al. |
| 2012/0096320 A1 | 4/2012 | Caffrey |
| 2012/0131225 A1 | 5/2012 | Chiueh et al. |
| 2012/0151061 A1 | 6/2012 | Bartfai-Walcott et al. |
| 2012/0166517 A1 | 6/2012 | Lee et al. |
| 2012/0210318 A1 | 8/2012 | Sanghvi et al. |
| 2012/0303923 A1 | 11/2012 | Behera et al. |
| 2012/0311098 A1 | 12/2012 | Inamdar et al. |
| 2012/0311138 A1 | 12/2012 | Inamdar et al. |
| 2012/0311475 A1 | 12/2012 | Wong |
| 2012/0324445 A1 | 12/2012 | Dow et al. |
| 2012/0331127 A1 | 12/2012 | Wang et al. |
| 2013/0003553 A1 | 1/2013 | Samuels et al. |
| 2013/0042003 A1 | 2/2013 | Franco et al. |
| 2013/0044629 A1 | 2/2013 | Biswas et al. |
| 2013/0066939 A1 | 3/2013 | Shao |
| 2013/0163428 A1 | 6/2013 | Lee et al. |
| 2013/0198838 A1 | 8/2013 | Schmidt et al. |
| 2013/0205037 A1 | 8/2013 | Biswas |
| 2013/0218547 A1 | 8/2013 | Ostermeyer et al. |
| 2013/0263209 A1 | 10/2013 | Panuganty |
| 2013/0297802 A1 | 11/2013 | Laribi et al. |
| 2013/0332927 A1 | 12/2013 | Tang et al. |
| 2013/0346973 A1 | 12/2013 | Oda et al. |
| 2014/0007094 A1 | 1/2014 | Jamjoom |
| 2014/0019807 A1 | 1/2014 | Harrison et al. |
| 2014/0025890 A1 | 1/2014 | Bert et al. |
| 2014/0026122 A1 | 1/2014 | Markande et al. |
| 2014/0026133 A1 | 1/2014 | Parker et al. |
| 2014/0040885 A1 | 2/2014 | Donahue |
| 2014/0067779 A1 | 3/2014 | Ojha |
| 2014/0068600 A1 | 3/2014 | Ashok et al. |
| 2014/0068703 A1 | 3/2014 | Balus et al. |
| 2014/0075013 A1 | 3/2014 | Agrawal et al. |
| 2014/0092744 A1 | 4/2014 | Sundar et al. |
| 2014/0123133 A1 | 5/2014 | Luxenberg |
| 2014/0130039 A1 | 5/2014 | Chaplik et al. |
| 2014/0143853 A1 | 5/2014 | Onodera |
| 2014/0165063 A1 | 6/2014 | Shiva et al. |
| 2014/0189684 A1 | 7/2014 | Zaslavsky et al. |
| 2014/0192639 A1 | 7/2014 | Smirnov |
| 2014/0196038 A1 | 7/2014 | Kottomtharayil et al. |
| 2014/0241159 A1 | 8/2014 | Kakadia et al. |
| 2014/0258535 A1 | 9/2014 | Zhang |
| 2014/0304320 A1 | 10/2014 | Taneja et al. |
| 2014/0313904 A1 | 10/2014 | Brunet et al. |
| 2014/0334301 A1 | 11/2014 | Billaud et al. |
| 2014/0372513 A1 | 12/2014 | Jones |
| 2015/0067404 A1 | 3/2015 | Eilam et al. |
| 2015/0085665 A1 | 3/2015 | Kompella et al. |
| 2015/0089500 A1 | 3/2015 | Kompella et al. |
| 2015/0095432 A1* | 4/2015 | Soundararajan ........ H04L 51/52 709/206 |
| 2015/0127912 A1 | 5/2015 | Solihin |
| 2015/0169306 A1 | 6/2015 | Labocki et al. |
| 2015/0193245 A1 | 7/2015 | Cropper |
| 2015/0195164 A1 | 7/2015 | Klein |
| 2015/0195182 A1 | 7/2015 | Mathur et al. |
| 2015/0215214 A1 | 7/2015 | Ng et al. |
| 2015/0215946 A1 | 7/2015 | Raleigh et al. |
| 2015/0234670 A1 | 8/2015 | Shimogawa |
| 2015/0234674 A1 | 8/2015 | Zhong |
| 2015/0242245 A1 | 8/2015 | Brown et al. |
| 2015/0277957 A1 | 10/2015 | Shigeta |
| 2015/0286470 A1* | 10/2015 | Dahan ................ G06F 11/3692 717/127 |
| 2015/0378743 A1 | 12/2015 | Zellermayer et al. |
| 2015/0381711 A1 | 12/2015 | Singh et al. |
| 2016/0055025 A1 | 2/2016 | Jul et al. |
| 2016/0080206 A1 | 3/2016 | Prakash et al. |
| 2016/0080207 A1 | 3/2016 | Prakash et al. |
| 2016/0088326 A1 | 3/2016 | Solomon et al. |
| 2016/0092257 A1 | 3/2016 | Wang et al. |
| 2016/0103669 A1 | 4/2016 | Gamage et al. |
| 2016/0103717 A1 | 4/2016 | Dettori et al. |
| 2016/0127184 A1 | 5/2016 | Bursell |
| 2016/0139948 A1 | 5/2016 | Beveridge et al. |
| 2016/0154665 A1 | 6/2016 | Iikura et al. |
| 2016/0239331 A1 | 8/2016 | Tamura et al. |
| 2016/0259941 A1 | 9/2016 | Vasudevan et al. |
| 2016/0269302 A1 | 9/2016 | Kompella et al. |
| 2016/0277249 A1 | 9/2016 | Singh et al. |
| 2016/0285783 A1 | 9/2016 | Uriel |
| 2016/0359897 A1 | 12/2016 | Yadav et al. |
| 2016/0366233 A1 | 12/2016 | Le et al. |
| 2016/0371127 A1 | 12/2016 | Antony et al. |
| 2016/0378519 A1 | 12/2016 | Gaurav et al. |
| 2017/0033995 A1 | 2/2017 | Banka et al. |
| 2017/0093918 A1 | 3/2017 | Banerjee et al. |
| 2017/0094377 A1 | 3/2017 | Herdich et al. |
| 2017/0094509 A1 | 3/2017 | Mistry et al. |
| 2017/0102979 A1 | 4/2017 | Ramirez et al. |
| 2017/0104609 A1 | 4/2017 | McNamee et al. |
| 2017/0116014 A1 | 4/2017 | Yang et al. |
| 2017/0160744 A1 | 6/2017 | Chia et al. |
| 2017/0171245 A1 | 6/2017 | Lee et al. |
| 2017/0199752 A1 | 7/2017 | Cao et al. |
| 2017/0235677 A1 | 8/2017 | Sakaniwa et al. |
| 2017/0262375 A1 | 9/2017 | Jenne et al. |
| 2017/0315836 A1 | 11/2017 | Langer et al. |
| 2018/0088997 A1 | 3/2018 | Min |
| 2018/0097728 A1 | 4/2018 | Bodi Reddy et al. |
| 2018/0101560 A1 | 4/2018 | Christidis et al. |
| 2018/0123919 A1 | 5/2018 | Naous et al. |
| 2018/0139100 A1 | 5/2018 | Nag pal et al. |
| 2018/0157511 A1 | 6/2018 | Krishnan et al. |
| 2018/0176070 A1 | 6/2018 | Shafiee et al. |
| 2018/0176088 A1 | 6/2018 | Ellappan et al. |
| 2018/0285166 A1* | 10/2018 | Roy ..................... G06F 9/5077 |
| 2018/0300182 A1 | 10/2018 | Hwang et al. |
| 2019/0268228 A1 | 8/2019 | Banka et al. |
| 2020/0195509 A1 | 6/2020 | Singh et al. |
| 2021/0099368 A1 | 4/2021 | Chitalia et al. |
| 2021/0160158 A1 | 5/2021 | Chintala et al. |
| 2022/0006701 A1 | 1/2022 | Patel et al. |
| 2022/0103431 A1 | 3/2022 | Singh et al. |
| 2022/0124013 A1 | 4/2022 | Chitalia et al. |
| 2023/0011736 A1 | 1/2023 | Chitalia et al. |
| 2023/0185866 A1 | 6/2023 | Dror et al. |
| 2024/0113950 A1* | 4/2024 | Chitalia ................ G06F 11/327 |

FOREIGN PATENT DOCUMENTS

| | | |
|---|---|---|
| CN | 102082703 A | 6/2011 |
| CN | 102202049 A | 9/2011 |
| CN | 102254021 A | 11/2011 |
| CN | 102255935 A | 11/2011 |
| CN | 102664786 A | 9/2012 |
| CN | 102981931 A | 3/2013 |
| CN | 103210618 A | 7/2013 |
| CN | 103281366 A | 9/2013 |
| CN | 103401917 A | 11/2013 |
| CN | 103744771 A | 4/2014 |
| CN | 106888254 A | 6/2014 |
| CN | 104360924 A | 2/2015 |
| CN | 104378262 A | 2/2015 |
| CN | 104468587 A | 3/2015 |
| CN | 104584484 A | 4/2015 |
| CN | 104981783 A | 10/2015 |
| CN | 105144093 A | 12/2015 |
| CN | 105897946 A | 8/2016 |
| EP | 0831617 A2 | 3/1998 |
| EP | 1331564 A1 | 7/2003 |
| EP | 2687991 A2 | 1/2014 |
| EP | 2728812 A1 | 5/2014 |
| WO | 2009089051 A2 | 7/2009 |
| WO | 2013057089 A1 | 4/2013 |
| WO | 2013101843 A2 | 7/2013 |

(56) References Cited

FOREIGN PATENT DOCUMENTS

| | | |
|---|---|---|
| WO | 2013184846 A1 | 12/2013 |
| WO | 2015048326 A1 | 4/2015 |

OTHER PUBLICATIONS

"Creating Projects in OpenStack for Configuring Tenants in Contrail," Juniper Networks, Inc., Contrail, Jan. 16, 2015, 2 pp.
"Host Aggregates," OpenStack Docs, accessed from https://docs.openstack.org/nova/latest/user/aggregates.html, accessed on Feb. 14, 2018, 3 pp.
"Improving Real-Time Performance by Utilizing Cache Allocation Technology—Enhancing Performance via Allocation of the Processor's Cache," White Paper, Intel® Corporation, Apr. 2015, 16 pp.
"OpenStack Docs: Manage projects, users, and roles," Openstack Keystone service version 12.0.1.dev19, Jul. 26, 2018, 7 pp.
"Transmission Control Protocol," RFC 793, DARPA Internet Program, Protocol Specification, Sep. 1981, 90 pp.
Baur et al., "A Model-Driven Engineering Approach for Flexible and Distributed Monitoring of Cross-Cloud Applications," 2018 IEEE/ACM 11th International Conference on Utility and Cloud Computing (UCC), Dec. 17-20, 2018, 10 pp.
Byelas et al, "Visualizing metrics on areas of interest in software architecture diagrams." 2009 IEEE Pacific Visualization Symposium, IEEE, Apr. 20-23, 2009, 8 pp.
Examination Report from counterpart European Application No. 18164113.5, dated Jun. 25, 2021, 9 pp.
Extended Search Report dated Aug. 28, 2018 from counterpart European Application No. 18164113.5, 10 pp.
Extended Search Report from counterpart European Application No. 18164113.5, dated Aug. 28, 2018, 10 pp.
Extended Search Report from counterpart European Application No. 23178135.2 dated Nov. 6, 2023, 12 pp.
Gamage et al., "Opportunistic Flooding to Improve TCP Transmit Performance in Virtualized Clouds," Proceedings of the 2nd ACM Symposim on Cloud Computing, Oct. 27-28, 2011, 14 pp.
Gamage et al., "Protocol Responsibility Offloading to Improve TCP Throughput in Virtualized Environments," ACM Transactions on Computer Systems, 31(3) Article 7, Aug. 2013, pp. 7:1-7:34.
Hauser et al., "Reviewing Cloud Monitoring: Towards Cloud Resource Profiling," 2018 IEEE 11th International Conference on Cloud Computing, Jul. 2018, pp. 678-685.
Hopps, "Analysis of an Equal-Cost Multi-Path Algorithm," RFC 2992, Network Working Group, Nov. 2000, 8 pp.
Kangarlou et al., "vSnoop: Improving TCP Throughput in Virtualized Environments via Acknowledgement Offload," International Conference for High Performance Computing, Networking, Storage and Analysis (SC), Nov. 2010, 11 pp.
Prosecution History from U.S. Appl. No. 15/846,400, dated Oct. 17, 2019 through Aug. 19, 2020, 74 pp.
Prosecution History from U.S. Appl. No. 17/120,420, now issued U.S. Pat. No. 11,240,128, dated Oct. 12, 2021 through Dec. 22, 2021, 14 pp.
Prosecution History from U.S. Appl. No. 17/645,594, dated Sep. 6, 2023 through Dec. 6, 2023, 15 pp.
Ramakrishnan et al., "The Addition of Explicit Congestion Notification (ECN) to IP," RFC 3168, Network Working Group, Sep. 2001, 63 pp.
Reexamination Request Response from counterpart Chinese Application No. 201810267159.8 filed Oct. 19, 2022, 16 pp.
Rejection Decision from counterpart Chinese Application No. 201810267159.8 dated Jul. 5, 2022, 7 pp.
Response to Examination Report dated Jun. 25, 2021, from counterpart European Application No. 18164113.5, filed Oct. 25, 2021, 23 pp.
Response to Summons to Attend Oral Proceedings pursuant to Rule 115(1) EPC dated Feb. 1, 2023, including Main Request, from European Patent Application No. 18164113.5 filed May 5, 2023, 22 pp.
Response to the Extended Search Report from counterpart European Application No. 18164113.5, dated Aug. 28, 2018, filed Apr. 3, 2019, 16 pp.
Roy, "AppFormix and Intel RDT Integration: Orchestrating Virtual Machines on OpenStack," AppFormix Blog, Apr. 1, 2016, 5 pp.
Roy, "CPU shares insufficient to meet application SLAs," AppFormix-TR-2016-1, Mar. 2016, 3 pp.
Roy, "Meet Your Noisy Neighbor, Container," AppFormix Blog, Mar. 31, 2016, 8 pp.
Second Office Action and Search Report, and translation thereof, from counterpart Chinese Application No. 201810267159.8 dated Mar. 1, 2022, 10 pp.
Shi et al., "Design of a comprehensive virtual machine monitoring system", 2014 IEEE 3rd International Conference on Cloud Computing and Intelligence Systems, IEEE, Nov. 2014, pp. 510-513.
Singh, "AppFormix: Realize The Performance Of Your Cloud Infrastructure—Solution Brief," AppFormix, Intel® Corporation, Mar. 27, 2016, 7 pp.
Summons to Attend Oral Proceedings Pursuant to Rule 115(1) EPC from counterpart European Application No. 18164113.5 dated Feb. 1, 2023, 14 pp.
Thierry et al., "Improved TCP Performance in Wireless IP Networks through Enhanced Opportunistic Scheduling Algorithms," IEEE Global Telecommunications Conference, vol. 5, Nov. 29-Dec. 3, 2004, pp. 2744-2748.
Third Office Action and Search Report from counterpart Chinese Application No. 201810267159.8 dated Apr. 11, 2023, 4 pp.
Tusa et al., "AAA in a Cloud-Based Virtual DIME Network Architecture (DNA)," 2011 20th IEEE International Workshops on Enabling Technologies: Infrastructure for Collaborative Enterprises, Jun. 27-29, 2011, pp. 110-115.
U.S. Appl. No. 17/657,595, filed Mar. 31, 2022, naming inventors Chitalia et al.
Zeb et al., "A Quantitative Security Metric Model for Security Controls: Secure Virtual Machine Migration Protocol as Target of Assessment", China Communications, vol. 15, No. 08, IEEE, Aug. 2018, pp. 126-140.
Zhang et al., "Hypernetes: Bringing Security and Multi-tenancy to Kubernetes," from https://kubernetes.io/blog/2016/05/hypernetes-securityand-multi-tenancy-in-kubernetes/, May 24, 2016, 9 pp.
Notice of Intent to Grant, in the Chinese language, from counterpart Chinese Application No. 201810267159.8 dated Jul. 6, 2023, 2 pp.
Response to Extended Search Report dated Nov. 6, 2023, from counterpart European Application No. 23178135.2 filed Jun. 5, 2024, 28 pp.

* cited by examiner

POLICY CONTROLLER FOR DISTRIBUTED VIRTUALIZATION INFRASTRUCTURE ELEMENT MONITORING

This application is a continuation application of and claims priority to U.S. patent application Ser. No. 17/645,594 filed on Dec. 22, 2021, which is a continuation application of and claims priority to U.S. patent application Ser. No. 17/120,420 filed on Dec. 14, 2020, now issued as U.S. Pat. No. 11,240,128 on Feb. 1, 2022, which is a continuation application of and claims priority to U.S. patent application Ser. No. 15/846,400 filed on Dec. 19, 2017, now issued as U.S. Pat. No. 10,868,742 on Dec. 15, 2020, which claims the benefit of U.S. Provisional Application No. 62/478,515, filed Mar. 29, 2017, U.S. Provisional Application No. 62/487,254, filed Apr. 19, 2017, and U.S. Provisional Application No. 62/487,244, filed Apr. 19, 2017. The entire content of all of these applications is hereby incorporated by reference.

TECHNICAL FIELD

This disclosure relates to monitoring and improving performance of cloud data centers and networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

This disclosure describes techniques for monitoring, scheduling, and performance management for computing environments, such as virtualization infrastructures deployed within data centers. The techniques provide visibility into operational performance and infrastructure resources. As described herein, the techniques may leverage analytics in a distributed architecture to provide real-time and historic monitoring, performance visibility and dynamic optimization to improve orchestration, security, accounting and planning within the computing environment. The techniques may provide advantages within, for example, hybrid, private, or public enterprise cloud environments. The techniques accommodate a variety of virtualization mechanisms, such as containers and virtual machines, to support multi-tenant, dynamic, and constantly evolving enterprise clouds.

Aspects of this disclosure relate to monitoring performance and usage of consumable resources shared among multiple different elements that are higher-level components of the infrastructure, the resources evaluated, at least in part, for such elements that are members of one or more groups of elements using a collection of one or more rulesets associated with the groups, respectively. For example, a user may configure a ruleset for an element and further configure the element as a member of one or more groups of elements, each group having a corresponding ruleset. A policy controller may distribute to a policy agent executing on a computing device, e.g., a server or network device, a profile for the element that is a collection of the rulesets for the element and of each group in which the element is a member. The policy agent may evaluate the profile based on the multiple rulesets and on metrics received by the policy agent indicating a performance of the resource and, at least in some cases, one or more other elements that are also members of the groups. In some cases, the policy agent may report metrics to the higher-level policy controller to enable the policy controller to evaluate profiles using metrics for resources distributed among multiple computing devices.

Upon evaluating the profile for the element, the policy agent may report a profile status to a policy controller and/or take ameliorative action, such as by acting to restrict use of resources consumed by the elements to which the profile applies. In other examples, the policy controller may oversee multiple servers that may act to restrict use of the shared resource in response to a directive from the policy controller.

Further, in some examples, information about how one or more elements are using shared resources may be analyzed. Based on such information, elements can be classified based on shared resource usage characteristics. The classifications can be used to more efficiently distribute elements across multiple physical server devices.

The techniques may provide one or more advantages. For example, the techniques may allow users to configure different rulesets for different types of groups of elements, with multiple groups overlapping with element membership and each group having a corresponding ruleset. This flexible group membership and ruleset configuration may allow the user to express, with a profile, a combination of alarms to be applied to an element or group by configuring membership of the element or group in a another group, without having to manually configure an overall profile for the element or the group. Further, the techniques may dynamically account for changes in a group membership by evaluating the group profile using the new set of elements that are members of a group without having to reconfigure the group profile.

In one example, this disclosure describes a method comprising enabling, by a controller, a plurality of policy agents to monitor usage metrics for each of a first plurality of compute nodes within a first compute cluster and to monitor usage metrics for each of a second plurality of compute nodes within a second compute cluster; receiving, by the controller and from the plurality of policy agents, information about the usage metrics for the first plurality of compute nodes and information about the usage metrics for the second plurality of compute nodes; evaluating, by the controller and based on a first ruleset applied to the information about the usage metrics for the first plurality of compute nodes, infrastructure elements for the first compute cluster; evaluating, by the controller and based on a second ruleset applied to the information about the usage metrics for the second plurality of compute nodes, infrastructure elements for the second compute cluster; generating, by the controller, health data including a first health status for the infrastructure elements for the first cluster and a second health status for the infrastructure elements for the second cluster; and outputting, by the controller, a user interface for presentation as a multi-cluster dashboard, wherein the user interface presents information about the first health status and the second health status.

In one example, a method includes obtaining, by a policy controller, a first profile for an element of a virtualization infrastructure, the first profile comprising a first ruleset having one or more alarms; obtaining, by the policy controller, a second profile for a group of one or more elements including the element, the second profile comprising a second ruleset having one or more alarms; modifying, by the policy controller based at least on the element being a member of the group, the first profile to generate a modified first profile comprising the first ruleset and the second ruleset; and outputting, by the policy controller to a computing device, the modified first profile.

In one example, a computing system includes a policy controller configured to: obtain a first profile for an element of a virtualization infrastructure, the first profile comprising a first ruleset having one or more alarms; obtain a second profile for a group of one or more elements including the element, the second profile comprising a second ruleset having one or more alarms; modify, based at least on the element being a member of the group, the first profile to generate a modified first profile comprising the first ruleset and the second ruleset; and output, to a computing device, the modified first profile. The computing system also includes the computing device comprising processing circuitry and at least one storage device that stores instructions that, when executed, configure the processing circuitry to: determine, in response to determining one or more usage metrics trigger at least one of the one or more alarms of the second ruleset, the modified first profile is active; and output an indication the modified first profile is active.

In one example, a computer readable storage medium comprising instructions that, when executed, configure one or more processors of a computing system to: obtain a first profile for an element of a virtualization infrastructure, the first profile comprising a first ruleset having one or more alarms; obtain a second profile for a group of one or more elements including the element, the second profile comprising a second ruleset having one or more alarms; modify, based at least on the element being a member of the group, the first profile to generate a modified first profile comprising the first ruleset and the second ruleset; and output, to a computing device, the modified first profile.

In another example, a computing system includes a plurality of cloud-based compute clusters, each of the cloud-based compute clusters comprising: one or more compute nodes; one or more policy agents configured to execute on the compute nodes to monitor performance and usage metrics relating to resources of the compute nodes; and a policy controller configured to deploy policies to the policy agents and receive performance and usage metrics from the policy agents. A multi-cluster dashboard software system is configured to receive data from each of the controllers of the plurality of cloud-based compute clusters. Each of the policy controllers is configured to evaluate the performance and usage metrics for respective compute cluster by application of one or more rulesets for infrastructure elements of the compute cluster. Each of the policy controllers outputs data to the multi-cluster dashboard software system indicative of a current health status for the infrastructure elements based on the evaluation of the performance and usage metrics for the cluster. The multi-cluster dashboard software system data outputs a single user interface screen presenting the current health status for each of the cloud-based compute clusters.

In another example, a method comprises executing policy agents on compute nodes of a plurality of different cloud-based compute clusters to monitor performance and usage metrics relating to resources of the compute nodes within each of the compute clusters. The method further includes receiving, with a respective policy controller for each of the compute clusters, performance and usage metrics from the policy agents executing on the compute nodes of the respective compute cluster, and evaluating, with each of the policy controllers, the performance and usage metrics for respective compute cluster by application of one or more rulesets for infrastructure elements of the respective compute cluster. The method further includes outputting, from each of the policy controllers, data to a multi-cluster dashboard software system, wherein the data is indicative of a current health status for the infrastructure elements for the cluster and is based on the evaluation of the performance and usage metrics; and outputting, with the multi-cluster dashboard software system and for display as a single user interface screen, the current health status for each of the cloud-based compute clusters.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference numerals refer to like elements throughout the figures and text.

DETAILED DESCRIPTION

Figure 1:
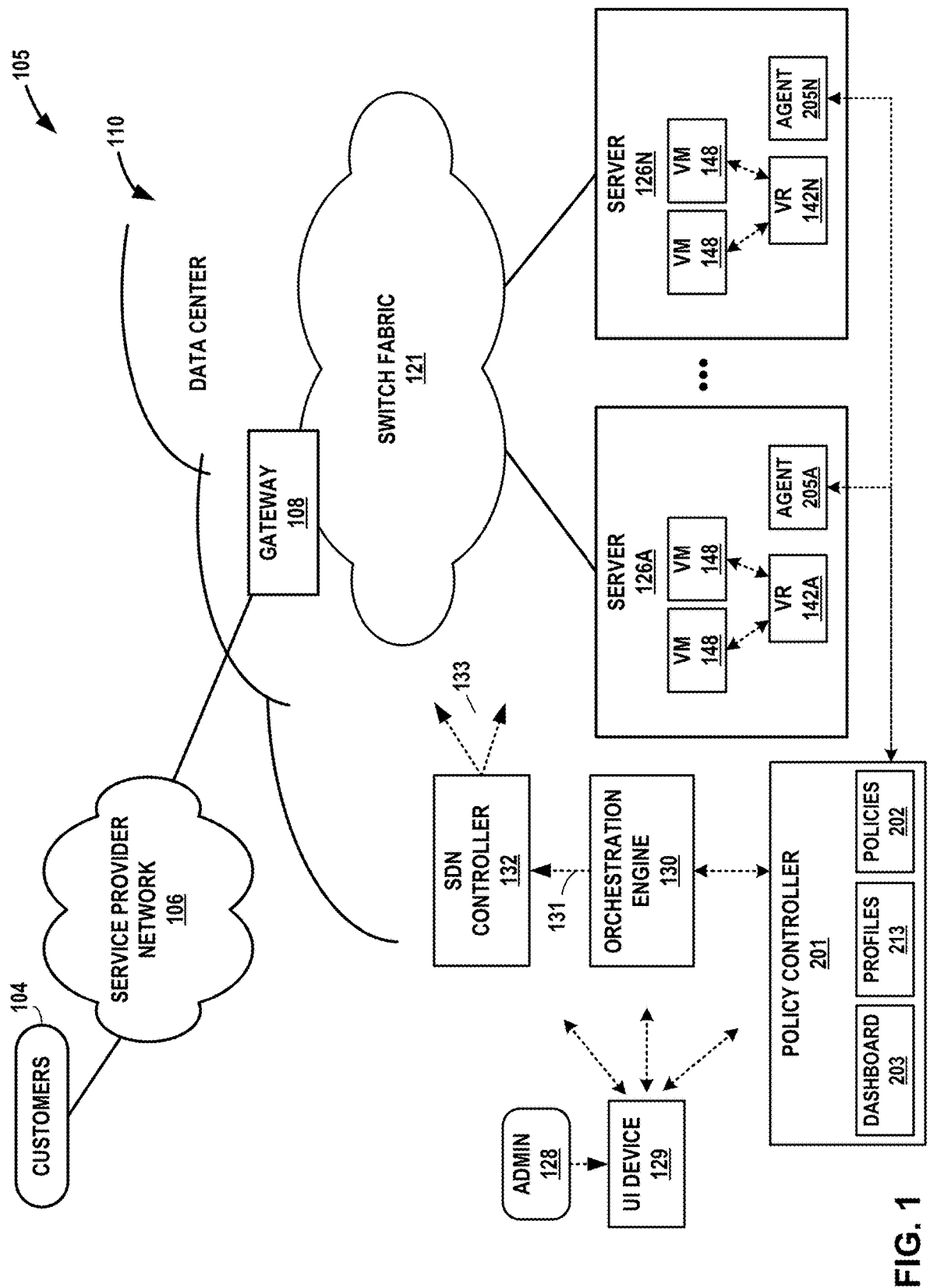
FIG. 1 is a conceptual diagram illustrating an example network that includes an example data center in which internal processor metrics relating to resources shared by multiple processes are monitored, in accordance with one or more aspects of the present disclosure.

FIG. 1 is a conceptual diagram illustrating an example network 105 that includes an example data center 110 in which performance and usage metrics for infrastructure elements for cloud-based computing environments are monitored, and optionally including internal processor metrics relating to resources shared by multiple processes, in accordance with one or more aspects of the present disclosure. FIG. 1 illustrates one example implementation of network 105 and data center 110 that hosts one or more cloud-based computing networks, computing domains or projects, generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110 may be appropriate in other instances. Such implementations may include a subset of the components included in the example of FIG. 1 and/or may include additional components not shown in FIG. 1.

In the example of FIG. 1, data center 110 provides an operating environment for applications and services for customers 104 coupled to data center 110 by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 110 may represent one of many geographically distributed network data centers. As illustrated in the example of FIG. 1, data center 110 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110 is an individual network server, a network peer, or otherwise.

In the example of FIG. 1, data center 110 includes a set of storage systems and application servers, including server 126A through server 126N (collectively "servers 126") interconnected via high-speed switch fabric 121 provided by one or more tiers of physical network switches and routers. Servers 126 function as physical compute nodes of the data center. For example, each of servers 126 may provide an operating environment for execution of one or more customer-specific virtual machines 148 ("VMs" in FIG. 1) or other virtualized instances, such as containers. Each of servers 126 may be alternatively referred to as a host computing device or, more simply, as a host. A server 126 may execute one or more virtualized instances, such as virtual machines, containers, or other virtual execution environment for running one or more services, such as virtualized network functions (VNFs).

Although not shown, switch fabric 121 may include top-of-rack (TOR) switches coupled to a distribution layer of chassis switches, and data center 110 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 110 and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 110 in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via northbound API 131, which in turn operates in response to configuration input received from an administrator 128 operating user interface device 129. Additional information regarding SDN controller 132 operating in conjunction with other devices of data center 110 or other software-defined network is found in International Application Number PCT/US 2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 110 such as compute, storage, networking, and application resources. For example, orchestration engine 130 may create a virtual network for a tenant within data center 110 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 126 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 121 or between servers 126 and customers 104 or between servers 126, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers 142 (virtual router 142A to virtual router 142N, collectively "virtual routers 142" in FIG. 1) execute multiple routing instances for corresponding virtual networks within data center 110 and routes the packets to appropriate virtual machines executing within the operating environment provided by servers 126. Each of servers 126 may include a virtual router. Packets received by virtual router 142A of server 126A, for instance, from the underlying physical network fabric may include an outer header to allow the physical network fabric to tunnel the payload or "inner packet" to a physical network address for a network interface of server 126A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 126 may receive inbound tunnel packets of a packet flow from one or more TOR switches within switch fabric 121 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 126 are described in U.S. patent application Ser. No. 14/228,844, entitled "PACKET SEGMENTATION OFFLOAD FOR VIRTUAL NETWORKS," incorporated herein by reference.

In some example implementations, virtual routers 142 executing on servers 126 steer received inbound tunnel packets among multiple processor cores to facilitate packet processing load balancing among the cores when processing the packets for routing to one or more virtual and/or physical machines. As one example, server 126A includes multiple network interface cards and multiple processor cores to execute virtual router 142A and steers received packets among multiple processor cores to facilitate packet processing load balancing among the cores. For instance, a particular network interface card of server 126A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In the example of FIG. 1, data center 110 further includes a policy controller 201 that provides monitoring, scheduling, and performance management for data center 110. Policy controller 201 interacts with monitoring agents 205 that are deployed within at least some of the respective physical servers 216 for monitoring resource usage of the physical compute nodes as well as any virtualized host, such as VM 148, executing on the physical host. In this way, monitoring agents 205 provide distributed mechanisms for collecting a wide variety of usage metrics as well as for local enforcement of policies installed by policy controller 201. In example implementations, monitoring agents 205 run on the lowest level "compute nodes" of the infrastructure of data center 110 that provide computational resources to execute application workload. A compute node may, for example, be a bare-metal host of server 126, a virtual machine 148, a container or the like.

Policy controller 201 obtains the usage metrics from monitoring agents 205 and constructs a dashboard 203 (e.g., a set of user interfaces) to provide visibility into operational performance and infrastructure resources of data center 110. Policy controller 201 may, for example, communicate dashboard 203 to UI device 129 for display to administrator 128. In addition, policy controller 201 may apply analytics and machine learning to the collected metrics to provide real-time and historic monitoring, performance visibility and dynamic optimization to improve orchestration, security, accounting and planning within data center 110.

As shown in the example of FIG. 1, Policy controller 201 may define and maintain a rule base as a set of policies 202. Policy controller 201 may administer control of each of servers 126 based on the set of policies 202 policy controller 201. Policies 202 may be created or derived in response to input by administrator 128 or in response to operations performed by policy controller 201. Policy controller 201 may, for example, observe operation of data center 110 over time and apply machine learning techniques to generate one or more policies 202. Policy controller 201 may periodically, occasionally, or continually refine policies 202 as further observations about data center 110 are made.

Policy controller 201 (e.g., an analytics engine within policy controller 201) may determine how policies are deployed, implemented, and/or triggered at one or more of servers 126. For instance, policy controller 201 may be configured to push one or more policies 202 to one or more of the policy agents 205 executing on servers 126. Policy controller 201 may receive information about internal processor metrics from one or more of policy agents 205, and determine if conditions of a rule for the one or more metrics are met. Policy controller 201 may analyze the internal processor metrics received from policy agents 205, and based on the analysis, instruct or cause one or more policy agents 205 to perform one or more actions to modify the operation of the server associated with a policy agent.

In some examples, policy controller 201 may be configured to determine and/or identify elements in the form of the virtual machines, containers, services, and/or applications executing on each of servers 126. As used herein, a resource generally refers to a consumable component of the virtualization infrastructure, i.e., a component that is used by the infrastructure, such as CPUs, memory, disk, disk I/O, network I/O, virtual CPUs, and Contrail vrouters. A resource may have one or more characteristics each associated with a metric that is analyzed by the policy agent 205 (and/or policy controller 201) and optionally reported. Lists of example raw metrics for resources are described below with respect to FIG. 2.

In general, an infrastructure element, also referred to herein as an element, is a component of the infrastructure that includes or consumes consumable resources in order to operate. Example elements includes hosts, physical or virtual network devices, instances (e.g., virtual machines, containers, or other virtual operating environment instances), and services. In some cases, an entity may be a resource for another entity. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Policy controller 201 may also analyze internal processor metrics received from policy agents 205, and classify one or more virtual machines 148 based on the extent to which each virtual machine uses shared resources of servers 126 (e.g., classifications could be CPU-bound, cache-bound, memory-bound). Policy controller 201 may interact with orchestration engine 130 to cause orchestration engine 130 to adjust, based on the classifications of virtual machines 148 executing on servers 126, the deployment of one or more virtual machines 148 on servers 126.

Policy controller 201 may be further configured to report information about whether the conditions of a rule are met to a client interface associated with user interface device 129. Alternatively, or in addition, policy controller 201 may be further configured to report information about whether the conditions of a rule are met to one or more policy agents 205 and/or orchestration engine 130.

Policy controller 201 may be implemented as or within any suitable computing device, or across multiple computing devices. Policy controller 201, or components of policy controller 201, may be implemented as one or more modules of a computing device. In some examples, policy controller 201 may include a number of modules executing on a class of compute nodes (e.g., "infrastructure nodes") included within data center 110. Such nodes may be OpenStack infrastructure service nodes or Kubernetes master nodes, and/or may be implemented as virtual machines. In some examples, policy controller 201 may have network connectivity to some or all other compute nodes within data center 110, and may also have network connectivity to other infrastructure services that manage data center 110.

One or more policies 202 may include instructions to cause one or more policy agents 205 to monitor one or more metrics associated with servers 126. One or more policies 202 may include instructions to cause one or more policy agents 205 to analyze one or more metrics associated with servers 126 to determine whether the conditions of a rule are met. One or more policies 202 may alternatively, or in addition, include instructions to cause policy agents 205 to report one or more metrics to policy controller 201, including whether those metrics satisfy the conditions of a rule associated with one or more policies 202. The reported information may include raw data, summary data, and sampling data as specified or required by one or more policies 202.

Dashboard 203 may represent a collection of user interfaces presenting information about metrics, alarms, notifications, reports, and other information about data center 110. Dashboard 203 may include one or more user interfaces that are presented by user interface device 129. User interface device 129 may detect interactions with dashboard 203 as user input (e.g., from administrator 128). Dashboard 203 may, in response to user input, cause configurations to be made to aspects of data center 110 or projects executing on one or more virtual machines 148 of data center 110 relating to network resources, data transfer limitations or costs, storage limitations or costs, and/or accounting reports.

Dashboard 203 may include a graphical view that provides a quick, visual overview of resource utilization by instance using histograms. The bins of such histograms may represent the number of instances that used a given percentage of a resource, such CPU utilization. By presenting data using histograms, dashboard 203 presents information in a way that allows administrator 128, if dashboard 203 is presented at user interface device 129, to quickly identify patterns that indicate under-provisioned or over-provisioned instances. In some examples, dashboard 203 may highlight resource utilization by instances on a particular project or host, or total resource utilization across all hosts or projects, so that administrator 128 may understand the resource utilization in context of the entire infrastructure.

Dashboard 203 may include information relating to costs for use of compute, network, and/or storage resources, as well as costs incurred by a project. Dashboard 203 may also present information about the health and risk for one or more virtual machines 148 or other resources within data center 110. In some examples, "health" may correspond to an indicator that reflects a current state of one or more virtual machines 148. For example, an example virtual machine that exhibits a health problem may be currently operating outside of user-specified performance policy. "Risk" may correspond to an indicator that reflects a predicted future state of one or more virtual machines 148, such that an example virtual machine that exhibits a risk problem may be may be unhealthy in the future. Health and risk indicators may be determined based on monitored metrics and/or alarms corresponding to those metrics. For example, if policy agent 205 is not receiving heartbeats from a host, then policy agent 205 may characterize that host and all of its instances as unhealthy. Policy controller 201 may update dashboard 203 to reflect the health of the relevant hosts, and may indicate that reason for the unhealthy state is one or more "missed heartbeats.".

One or more policy agents 205 may execute on one or more of servers 126 to monitor some or all of the performance metrics associated with servers 126 and/or virtual machines 148 executing on servers 126. Policy agents 205 may analyze monitored information and/or metrics and generate operational information and/or intelligence associated with an operational state of servers 126 and/or one or more virtual machines 148 executing on such servers 126. Policy agents 205 may interact with a kernel operating one or more servers 126 to determine, extract, or receive internal processor metrics associated with use of shared resources by one or more processes and/or virtual machines 148 executing at servers 126. Policy agents 205 may perform monitoring and analysis locally at each of servers 126. In some examples, policy agents 205 may perform monitoring and/or analysis in a near and/or seemingly real-time manner.

In the example of FIG. 1, and in accordance with one or more aspects of the present disclosure, policy agents 205 may monitor servers 126. For example, policy agent 205A of server 126A may interact with components, modules, or other elements of server 126A and/or one or more virtual machines 148 executing on servers 126. Policy agent 205A may, as a result of such interactions, collect information about one or more metrics associated with servers 126 and/or virtual machines 148. Such metrics may be raw metrics, which may be based directly or read directly from servers 126, virtual machines 148, and/or other components of data center 110. In other examples, one or more of such metrics may be calculated metrics, which include those derived from raw metrics. In some examples, metrics may correspond to a percentage of total capacity relating to a particular resource, such as a percentage of CPU utilization, or CPU consumption, or Level 3 cache usage. However, metrics may correspond to other types of measures, such as how frequent one or more virtual machines 148 are reading and writing to memory.

Policy controller 201 may configure policy agents 205 to monitor for conditions that trigger an alarm. For example, policy controller 201 may detect input from user interface device 129 that policy controller 201 determines corresponds to user input. Policy controller 201 may further determine that the user input corresponds to information sufficient to configure a user-specified alarm that is based on values for one or more metrics. Policy controller 201 may process the input and generate one or more policies 202 that implements the alarm settings. In some examples, such policies 202 may be configured so that the alarm is triggered when values of one or more metrics collected by policy agents 205 at servers 126 exceed a certain threshold. Policy controller 201 may communicate information about the generated policies 202 to one or more policy agents 205 executing on servers 126. Policy agents 205 may monitor servers 126 for conditions on which the alarm is based, as specified by the policies 202 received from policy controller 201.

For instance, policy agent 205A may monitor one or more metrics at server 126A. Such metrics may involve server 126A, all virtual machines 148 executing on server 126A, and/or specific instances of virtual machines 148. Policy agent 205A may determine, based on the monitored metrics, that one or more values exceed a threshold set by or more policies 202 received from policy controller 201. For instance, policy agent 205A may determine whether CPU usage exceeds a threshold set by a policy (e.g., server 126A CPU usage>50%). In other examples policy agent 205A may evaluate whether one or more metrics is less than a threshold value (e.g., if server 126A available disk space<20%, then raise an alert), or is equal to a threshold value (e.g., if the number of instances of virtual machines 148 equals 20, then raise an alert). If policy agent 205A determines that the monitored metric triggers the threshold value, policy agent 205A may raise an alarm condition and communicate information about the alarm to policy controller 201. Policy controller 201 and/or policy agent 205A may act on the alarm, such as by generating a notification. Policy controller 201 may update dashboard 203 to include the notification. Policy controller 201 may cause updated dashboard 203 to be presented at user interface device 129, thereby notifying administrator 128 of the alarm condition.

In some examples, policy controller 201 may generate policies and establish alarm conditions without user input. For example, policy controller 201 may apply analytics and machine learning to metrics collected by policy agents 205. Policy controller 201 may analyze the metrics collected by policy agents 205 over various time periods. Policy controller 201 may determine, based on such analysis, information sufficient to configure an alarm for one or more metrics. Policy controller 201 may process the information and generate one or more policies 202 that implements the alarm settings. Policy controller 201 may communicate information about the policy to one or more policy agents 205 executing on servers 126. Each of policy agents 205 may thereafter monitor conditions and respond to conditions that trigger an alarm pursuant to the corresponding policies 202 generated without user input.

In accordance with techniques described herein, policy controller 201 generates profiles 213 for elements of data center 110. A profile is associated with an element or group of elements and is a collection of alarms to be evaluated against corresponding metrics for the alarms to determine whether the associated element or group of elements is "active" or "inactive."

For example, policy controller 201, in response to input received via UI device 126, may generate profiles 213 for respective hosts, instances (e.g., VMs 148), network devices, groups thereof, and resources thereof (e.g., CPU, memory, disk, network interface, etc.). Moreover, a user or administrator configures elements of data center 110 to be members of one or more groups of elements such that the elements and groups and have a "member-of" relationship. As examples, an OpenStack host (e.g., any of servers 126) can be a member of one or more "host aggregates" that are each groups of one or more hosts. A Kubernetes container can be a member of (1) a pod, (2) a replication controller, (3) a namespace, and (4) several different services. A virtual machine 148A can be configured as a member of one or more "instance aggregates" that are each groups of one or more instances. A network device can be configured as a member of one or more "network device aggregates" that are each groups of one or more network devices. In each of the above examples, a user or agent may define profiles 213 for each element and group of elements.

Figure 2:
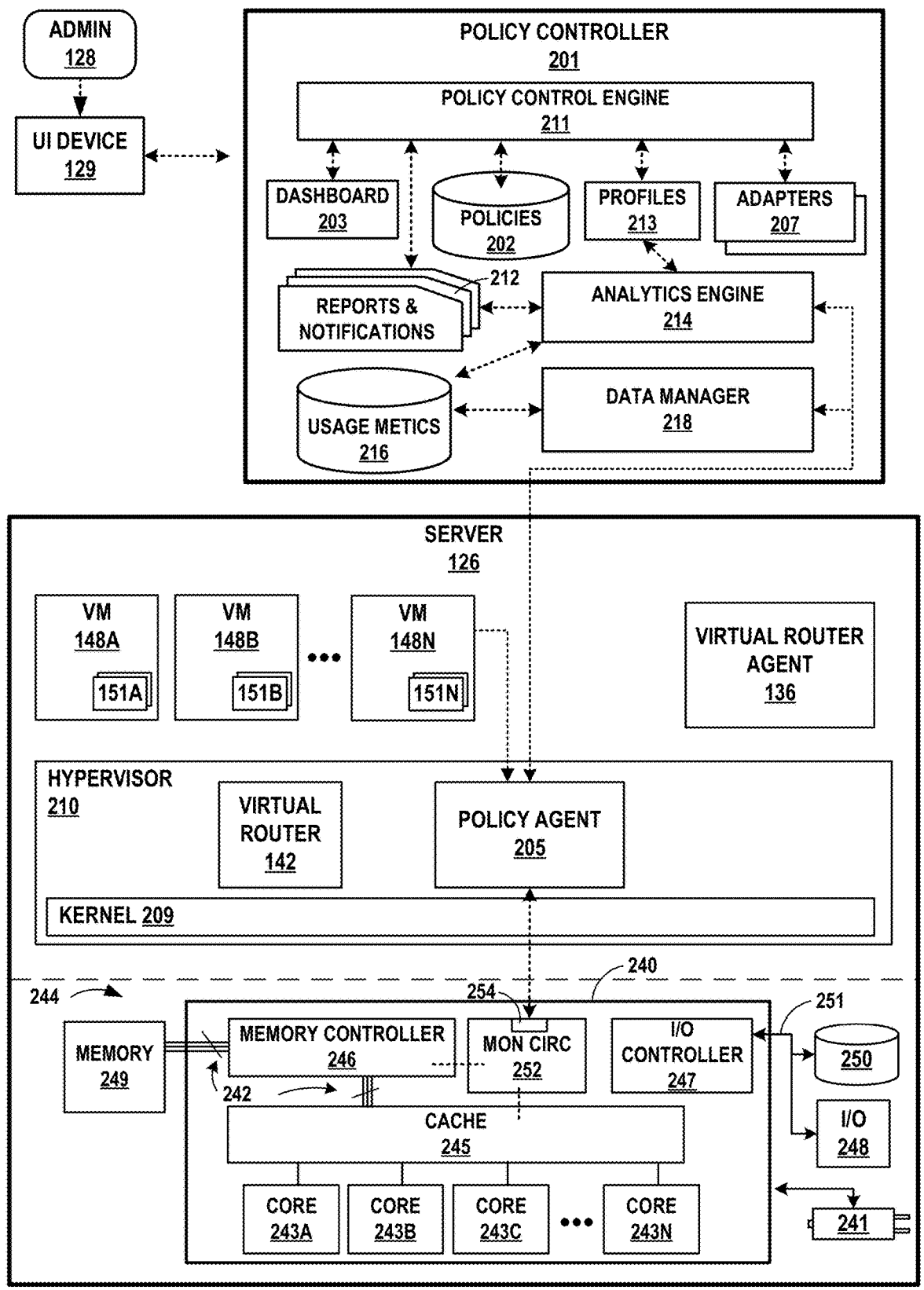
FIG. 2 is a block diagram illustrating a portion of the example data center of FIG. 1 in further detail, and in which internal processor metrics relating to resources shared by multiple processes executing on an example server are monitored, in accordance with one or more aspects of the present disclosure.

In general, and as further described herein in connection with FIG. 2, the techniques make use of certain internal processor metrics relating to resources that are shared inside of a physical processor, such as metrics relating to a an internal cache of the processor that is shared by software executing one or more cores within the processor or memory bus bandwidth that is consumed by the cores within the physical processor. Such metrics relating to resources shared inside a physical microprocessor may provide insights as to how virtual machines 148 (or processes within virtual machines 148) executing on each of servers 126 are contending for or otherwise using shared resources internal to the processors. Such information may be used to pinpoint bottlenecks, instances of resource contention, and performance issues that might not otherwise be apparent from other metrics, such as CPU utilization or CPU load metrics.

In some examples, the manner in which one or more virtual machines 148 operate and/or use such shared resources (such as a shared cache or memory bus) on a given server may adversely affect the operation of other virtual machines 148 on that same server. However, by monitoring only CPU usage, for example, it may be difficult to identify which particular virtual machine is causing performance problems for other virtual machines 148. Yet by monitoring metrics of resources internal to the processor of each of servers 126, it may be possible not only to identify which virtual machine may be causing performance problems for other virtual machines 148 on a given processor, but to also take steps to improve the policy control of all virtual machines 148 executing the processors of one or more servers 126. If appropriate policy control is applied across data center 110, it may be possible to improve the operation, efficiency, and consistent performance of data center 110 in the aggregate, and more effectively comply with service level agreements and performance guarantees.

By monitoring internal processor metrics to identify resources shared within the processor of a server as consumed by elements including software processes executing on hardware cores internal to the processor, policy controller 201 of data center 110 may identify virtual machines 148, containers, and/or processes that are consuming shared resources in manner that may adversely affect the performance of other virtual machines 148, containers, and/or processes executing on that server. By identifying processes that may be adversely affecting the operation of other processes, policy controller 201 of data center 110 may take steps to address how such processes operate or use shared resources, and as a result, improve the aggregate performance of virtual machines, containers, and/or processes executing on any given server, and/or improve the operation of all servers 126 collectively. Accordingly, as a result of identifying processes adversely affecting the operation of other processes and taking appropriate responsive actions, virtual machines 148 may perform computing operations on servers 126 more efficiently, and more efficiently use shared resources of servers 126. By performing computing operations more efficiently and more efficiently using shared resources of servers 126, data center 110 may perform computing tasks more quickly and with less latency. Therefore, aspects of this disclosure may improve the function of servers 126 and data center 110, because identifying and addressing any virtual machines 148 that are adversely affecting the operation of other virtual machines 148 may have the effect of enabling servers 126 and data center 110 to perform computing tasks more quickly and with less latency.

Further, assessment of metrics or conditions that may trigger an alarm may be implemented locally at each of servers 126 (e.g., by policy agents 205). By performing such assessments locally, performance metrics associated with the assessment can be accessed at a higher frequency, which can permit or otherwise facilitate performing the assessment faster. Implementing the assessment locally may, in some cases, avoid the transmission of information indicative of performance metrics associated with assessment to another computing device (e.g., policy controller 201) for analysis. As such, latency related to the transmission of such information can be mitigated or avoided entirely, which can result in substantial performance improvement in scenarios in which the number of performance metrics included in the assessment increases. In another example, the amount of information that is sent from the computing device can be significantly reduced when information indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

Various components, functional units, and/or modules illustrated in FIG. 1 (e.g., user interface device 129, orchestration engine 130, SDN controller 132, and policy controller 201, policy agent 205) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Alarms included in a profile 213, when triggered or 'active,' determine whether the profile 213 is active. In addition, alarms for groups of element of which an element is a member may also determine whether the profile 213 for the element is active. Because an element may be a member of multiple groups that overlap at least with respect to the element, policy controller 201 that generates and in some cases distributes profiles 213 to policy agents 205 may allow users and administrators of virtualization infrastructure of data center 110 to express, with a profile 213, a combination of alarms to be applied to an element or group by configuring membership of the element or group in a another group, without having to manually configure an overall profile 213 for the element or the group. Further, the techniques may dynamically account for changes in a group membership by evaluating the profile 213 for the group using the new set of elements that are members of a group without having to reconfigure the profile 213 for the group.

Policy controller 201 may distribute profiles 213 to policy agents 205 executing on computing devices, e.g., server 126 or network devices of data center 110. A policy agent 205 evaluates each of the received profiles 213 based on the one or more alarms included therein and on metrics received by the policy agent 205 indicating a performance of the element and, at least in some cases where the element is a member of a group, one or more other elements that are also members of the group.

Further example techniques by of policy controller 201 are described in U.S. patent application Ser. No. 15/797,098, entitled "MICRO-LEVEL MONITORING, VISIBILITY AND CONTROL OF SHARED RESOURCES INTERNAL TO A PROCESSOR OF A HOST MACHINE FOR A VIRTUAL ENVIRONMENT," incorporated herein by reference.

FIG. 2 is a block diagram illustrating a portion of the example data center 110 of FIG. 1 in further detail, and in which internal processor metrics relating to resources shared by multiple processes executing on an example server 126 are monitored, in accordance with one or more aspects of the present disclosure. Illustrated in FIG. 2 are user interface device 129 (operated by administrator 128), policy controller 201, and server 126.

Policy controller 201 may represent a collection of tools, systems, devices, and modules that perform operations in accordance with one or more aspects of the present disclosure. Policy controller 201 may perform cloud service optimization services, which may include advanced monitoring, scheduling, and performance management for software-defined infrastructure, where containers and virtual machines (VMs) can have life cycles much shorter than in traditional development environments. Policy controller 201 may leverage big-data analytics and machine learning in a distributed architecture (e.g., data center 110). Policy controller 201 may provide near real-time and historic monitoring, performance visibility and dynamic optimization. Policy controller 201 of FIG. 2 may be implemented in a manner consistent with the description of policy controller 201 provided in connection with FIG. 1.

In FIG. 2, policy controller 201 includes policies 202 and dashboard 203, as illustrated in FIG. 1. Policies 202 and dashboard 203 may also be implemented in a manner consistent with the description of policies 202 and dashboard 203 provided in connection with FIG. 1. In some examples, as illustrated in FIG. 2, policies 202 may be implemented as a data store. In such an example, policies 202 may represent any suitable data structure or storage medium for storing policies 202 and/or information relating to policies 202. Policies 202 may be primarily maintained by policy control engine 211, and policies 202 may, in some examples, be implemented through a NoSQL database.

In this example, policy controller 201 of FIG. 2 further includes policy control engine 211, adapter 207, reports and notifications 212, analytics engine 214, usage metrics data store 216, and data manager 218.

Policy control engine 211 may be configured to control interaction between one or more components of policy controller 201, in accordance with one or more aspects of the present disclosure. For example, policy control engine 211 may create and/or update dashboard 203, administer policies 202, and control adapters 207. Policy control engine 211 may also cause analytics engine 214 to generate reports and notifications 212 based on data from usage metrics data store 216, and may deliver one or more reports and notifications 212 to user interface device 129 and/or other systems or components of data center 110.

In one example, policy control engine 211 invokes one or more adapters 207 to discover platform-specific resources and interact with platform-specific resources and/or other cloud computing platforms. For instance, one or more adapters 207 may include an OpenStack adapter configured to communicate with an OpenStack cloud operating system operating on servers 126. One or more adapters 207 may include a Kubernetes adapter configured to communicate with a Kubernetes platform on servers 126. Adapters 207 may further include an Amazon Web Services adapter, Microsoft Azure adapter, and/or a Google Compute Engine adapter. Such adapters may enable policy controller 201 to learn and map the infrastructure utilized by servers 126. Policy controller 201 may use multiple adapters 207 at the same time.

Reports and notifications 212 may be created, maintained, and/or updated via one or more components of policy controller 201. In some examples, reports and notifications 212 may include information presented within dashboard 203, and may include information illustrating how infrastructure resources are consumed by instances over time. Notifications may be based on alarms, as further described below, and notifications may be presented through dashboard 203 or through other means.

One or more reports may be generated for a specified time period, organized by different scopes: project, host or department. In some examples, such a report may show the resource utilization by each instance that is in a project or scheduled on a host. Dashboard 203 may include information presenting a report in both graphical or tabular formats. Dashboard 203 may further enable report data to be downloaded as an HTML-formatted report, a raw comma-separated value (CSV) file, or an JSON-formatted data for further analysis.

Reports and notifications 212 may include a variety of reports, including a project report, a host report, and/or a department report, each of which may be included within dashboard 203. A project report may be generated for a single project or for all projects (provided administrator 128 is authorized to access the project or all projects). A project report may show resource allocations, actual usage, and charges. Resource allocations may include static allocations of resources, such as vCPUs, floating IP addresses, and storage volumes. Actual resource usage may be displayed within dashboard 203 for each instance in the project, and as the aggregate sum of usage by all instances in the project. Resource usage may show the actual physical resources consumed by an instance, such as CPU usage percentage, memory usage percentage, network I/O, and disk I/O. The cost charged for resource usage may be shown for each instance in the project. In addition, a cost breakdown by flavor type, and by resource type (Compute, Network, Storage) may be shown for the project as a whole.

As one example, policy control engine 211 may direct analytics engine 214 to generate a host report for all hosts or the set of hosts in a host aggregate, such as a cloud computing environment. In some examples, only users with an administrator role may generate a host report. A host report may show the aggregate resource usage of a host, and a breakdown of resource usage by each instance scheduled on a host. A host report may also show the cost charged for each instance on a host, as well as the total cost and total cost per flavor type. This provides an indication of the revenue generated by a host.

As another example, a department report shows total cost charged to a department. In some examples, administrator 128 may divide project costs among multiple departments, and a project may host applications and services that are used by multiple Departments. In such an example, each department may be wholly or partially responsible for the costs associated with one or more projects. Dashboard 203 may provide support for dividing project costs among multiple departments through a department report presented in dashboard 203.

In some examples, policy controller 201 may configure an alarm, and may generate an alarm notification when a condition is met by one or more servers 126 and/or one or virtual machines 148 (or containers) executing on one or more servers 126. Policy agent 205 may monitor metrics at servers 126 and virtual machines 148, and analyze the raw data corresponding to the metrics for conditions of alarms that apply to those servers 126 and/or virtual machines 148, and/or instances running on each such servers 126 and/or servers 126. In some examples, alarms may apply to a specified "scope" that identifies the type of element to monitor for a condition. Such element may be a "host," "instance," or "service," for example. An alarm may apply to one or more of such element. For instance, an alarm may apply to all hosts within data center 110, or to all hosts within a specified host aggregate (i.e. clusters of servers 126 or virtual machines 148, groups or pools of hypervisor hosts).

Policy agent 205 may continuously collect measurements of metrics for a host, e.g., a particular VM 148 of server 126, and its instances. For a particular alarm, policy agent 205 may aggregate samples according to a user-specified function (average, standard deviation, min, max, sum) and produce a single measurement for each user-specified interval. Policy agent 205 may compare each same and/or measurement to a threshold. In some examples, a threshold evaluated by an alarm or a policy that includes conditions for an alarm may be either a static threshold or a dynamic threshold. For a static threshold, policy agent 205 may compare metrics or raw data corresponding to metrics to a fixed value. For instance, policy agent 205 may compare metrics to a fixed value using a user-specified comparison function (above, below, equal). For a dynamic threshold, policy agent 205 may compare metrics or raw data correspond to metrics to a historical trend value or historical baseline for a set of resources. For instance, policy agent 205 may compare metrics or other measurements with a value learned by policy agent 205 over time.

In some example implementations, policy controller 201 is configured to apply dynamic thresholds, which enable outlier detection in resource consumption based on historical trends. For example, resource consumption may vary significantly at various hours of the day and days of the week. This may make it difficult to set a static threshold for a metric. For example, 70% CPU usage may be considered normal for Monday mornings between 10:00 AM and 12:00 PM, but the same amount of CPU usage may be considered abnormally high for Saturday nights between 9:00 PM and 10:00 PM. With dynamic thresholds, policy agent 205 may learn trends in metrics across all resources in scope to which an alarm applies. For example, if an alarm is configured for a host aggregate, policy agent 205 may learn a baseline from metric values collected for hosts in that aggregate. Similarly, policy agent 205 may, for an alarm with a dynamic threshold configured for a project, learn a baseline from metric values collected for instances in that project. Then, policy agent 205 may generate an alarm when a measurement deviates from the baseline value learned for a particular time period. Alarms having a dynamic threshold may be configured by metric, period of time over which to establish a baseline, and sensitivity. Policy agent 205 may apply the sensitivity setting to measurements that deviate from a baseline, and may be configured as "high," "medium," or "low" sensitivity. An alarm configured with "high" sensitivity may result in policy agent 205 reporting to policy controller 201 smaller deviations from a baseline value than an alarm configured with "low" sensitivity.

In some example implementations, an alarm may be characterized by its mode, such as an "alert mode," or an "event mode." When an alarm is configured as an alert, policy agent 205 may send a notification to policy controller 201 or otherwise notify policy controller 201 and/or other components of data center 110 whenever the state of the alert changes. In some examples, such an alert may initially be in a "learning" state until policy agent 205 has collected enough data to evaluate the conditions of the alert. An alert may be "active" when conditions of the alarm are met, and "inactive" when the conditions are not met.

When an alarm is configured as an event, policy agent 205 may send a notification to policy controller 201 or otherwise notify policy controller 201 (and/or other components of data center 110) for each interval in which the conditions of the alarm are met. As an example, consider an alarm for average CPU usage above 90% over an interval of 60 seconds. If the alarm mode is 'alert', then policy agent 205 may send a notification to policy controller 201 when the alarm becomes 'active' at time T1. When the CPU drops below 90% at time T5, policy agent 205 may send a notification that the alert is 'inactive'. If the same alarm is configured in 'event' mode, then policy agent 205 may send a notification to policy controller 201 for each of the five intervals in which the CPU load exceeds 90%.

In some examples, each alarm may be included within policies 202 maintained by policy controller 201 and apply to certain resources within data center 110. An alarm may, in response to input from a user or in response to other settings, apply to a particular scope: "host," "instance," and "service." Further, for a particular scope type, an alarm may apply to a subset of the resources of that scope type. When the scope of an alarm is configured as "host," for example, an alarm may apply to all hosts or hosts that belong to a specified host aggregate. When the scope of an alarm is configured as "instance," the alarm may be configured for and apply to one or more specific projects. Policy controller 201 may automatically configure an alarm for any new resource that matches the scope. For example, policy controller 201 may configure an alarm with "instance" scope for a given project (e.g., performed by one or more virtual machines 148) in response to user input. Thereafter, when one or more servers 126 creates an instance in that project, policy controller 201 may configure the alarm for the new instance.

Accordingly, in some examples, basic configuration settings for an alarm may include a name that identifies the alarm, a scope (type of resource to which an alarm applies: "host" or "instance"), an aggregate (a set of resources to which the alarm applies), a mode ("alert" or "event"), a metric (e.g., the metric that will be monitored by policy agents 205), an aggregation function (e.g., how policy agents 205 may combine samples during each measurement interval—examples include average, maximum, minimum, sum, and standard deviation functions), a comparison function (e.g., how to compare a measurement to the threshold, such as whether a measurement is above, below, or equal to a threshold), a threshold (the value to which a metric measurement is compared), a unit type (determined by the metric type), and an interval (duration of the measurement interval in seconds or other unit of time).

An alarm may define a policy that applies to a set of elements that are monitored, such as virtual machines in a project. A notification is generated when the condition of an alarm is observed for a given element. A user may configure an alarm to post notifications to an external HTTP endpoint. Policy controller 201 and/or policy agent 205 may POST a JSON payload to the endpoint for each notification. The schema of the payload may be represented by the following, where "string" and 0 are generic placeholders to indicate type of value; string and number, respectively:

```
{
    "apiVersion": "v1",
    "kind": "Alarm",
    "spec": {
        "name": "string",
        "eventRuleId": "string",
        "severity": "string",
        "metricType": "string",
        "mode": "string",
        "module": "string",
        "aggregationFunction": "string",
        "comparisonFunction": "string",
        "threshold": 0,
        "intervalDuration": 0,
        "intervalCount": 0,
        "intervalsWithException": 0,
    },
    "status": {
        "timestamp": 0,
        "state": "string",
        "elementType": "string",
        "elementId": "string",
        "elementDetails": {}
    }
}
```

In some examples, the "spec" object describes the alarm configuration for which this notification is generated. In some examples, the "status" object describes the temporal event information for this particular notification, such as the time when the condition was observed and the element on which the condition was observed.

The schema represented above may have the following values for each field:
severity: "critical", "error", "warning", "information", "none"
metricType: refer to Metrics.
mode: "alert", "event"
module: the Analytics modules that generated the alarm. One of "alarms", "health/risk", "service_alarms".
state: state of the alarm. For "alert" mode alarms, valid values are "active", "inactive", "learning".
For "event" mode alarms, the state is always "triggered".
threshold: units of threshold correspond to metricType.
elementType: type of the entity. One of "instance", "host", "service".
elementId: UUID of the entity.
elementDetails: supplemental details about an entity. The contents of this object depend on the elementType. For a "host" or "service", the object is empty. For an "instance", the object will contain hostId and projectId.

```
{
    "elementDetails": {
        "hostId": "uuid",
        "projectId": "uuid"
```

-continued

```
    }
}
```

Analytics engine 214 may perform analysis, machine learning, and other functions on or relating to data stored within usage metrics data store 216. Analytics engine 214 may further generate reports, notifications, and alarms based on such information. For instance, analytics engine 214 may analyze information stored in usage metrics data store 216 and identify, based on information about internal processor metrics, one or more virtual machines 148 that are operating in a manner that may adversely affect the operation of other virtual machines 148 executing on server 126. Analytics engine 214 may, in response to identifying one or more virtual machines 148 operating in a manner that may adversely affect the operation of other virtual machines 148, generate one or more reports and notifications 212. Analytics engine 214 may alternatively, or in addition, raise an alarm and/or cause or instruct policy agent 205 to take actions to address the operation of the identified virtual machines 148. Analytics engine 214 may also analyze the metrics for one or more virtual machines 148, and based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Usage metrics data store 216 may represent any suitable data structure or storage medium for storing information related to metrics collected by policy agents 205. For instance, usage metrics data store 216 may be implemented using a NoSQL database. The information stored in usage metrics data store 216 may be searchable and/or categorized such that analytics engine 214, data manager 218, or another component or module of policy controller 201 may provide an input requesting information from usage metrics data store 216, and in response to the input, receive information stored within usage metrics data store 216. Usage metrics data store 216 may be primarily maintained by data manager 218.

In some examples, a "metric" is a measured value for a resource in the infrastructure. Policy agent 205 may collect and calculate metrics for resources utilized by hosts and instances. Metrics may be organized into hierarchical categories based on the type of metric. Some metrics are percentages of total capacity. In such cases, the category of the metric determines the total capacity by which the percentage is computed. For instance, host.cpu.usage indicates the percentage of CPU consumed relative to the total CPU available on a host. In contrast, instance.cpu.usage is the percentage of CPU consumed relative to the total CPU available to an instance. As an example, consider an instance that is using 50% of one core on a host with 20 cores. The instance's host.cpu.usage will be 2.5%. If the instance has been allocated 2 cores, then its instance.cpu.usage will be 25%.

An alarm may be configured for any metric. Many metrics may also be displayed in user interfaces within dashboard 203, in, for example, a chart-based form. When an alarm triggers for a metric, the alarm may be plotted on a chart at the time of the event. In this way, metrics that might not be plotted directly as a chart may still visually correlated in time with other metrics. In the following examples, a host may use one or more resources, e.g., CPU ("cpu") and network ("network"), that each have one or more associated metrics, e.g., memory bandwidth ("mem_bw") and usage ("usage"). Similarly, an instance may use one or more resources, e.g., virtual CPU ("cpu") and network ("network"), that each have one or more associated metrics, e.g., memory bandwidth ("mem_bw") and usage ("usage"). An instance may itself be a resource of a host or an instance aggregate, a host may itself be a resource of a host aggregate, and so forth.

In some examples, raw metrics available for hosts may include: host.cpu.io_wait, host.cpu.ipc, host.cpu.l3_cache.miss, host.cpu.l3_cache.usage, host.cpu.mem_bw.local, host.cpu.mem_bw.remote, host.cpu.mem_bw.total, host.cpu.usage, host.disk.io.read, host.disk.io.write, host.disk.response_time, host.disk.read_response_time, host.disk.write_response_time, host.disk.smart.hdd.command_timeout, host.disk.smart.hdd.current_pending_sector_count, host.disk.smart.hdd.offline_uncorrectable, host.disk.smart.hdd.reallocated_sector_count, host.disk.smart.hdd.reported_uncorrectable_errors, host.disk.smart.ssd.available_reserved_space, host.disk.smart.ssd.media_wearout_indicator, host.disk.smart.ssd.reallocated_sector_count, host.disk.smart.ssd.wear_leveling_count, host.disk.usage.bytes, host.disk.usage.percent, host.memory.usage, host.memory.swap.usage, host.memory.dirty.rate, host.memory.page_fault.rate, host.memory.page_in_out.rate, host.network.egress.bit_rate, host.network.egress.drops, host.network.egress.errors, host.network.egress.packet_rate, host.network.ingress.bit_rate, host.network.ingress.drops, host.network.ingress.errors, host.network.ingress.packet_rate, host.network.ipv4Tables.rule_count, host.network.ipv6Tables.rule_count, openstack.host.disk_allocated, openstack.host.memory_allocated, and openstack.host.vcpus_allocated.

In some examples, calculated metrics available for hosts include: host.cpu.normalized_load_1M, host.cpu.normalized_load_5M, host.cpu.normalized_load_15M, host.cpu.temperature, host.disk.smart.predict_failure, and host.heartbeat.

For example, host.cpu.normalized_load is a normalized load value that may be calculated as a ratio of the number of running and ready-to-run threads to the number of CPU cores. This family of metrics may indicate the level of demand for CPU. If the value exceeds 1, then more threads are ready to run than exists CPU cores to perform the execution. Normalized load may be a provided as an average over 1-minute, 5-minute, and 15-minute intervals.

The metric host.cpu.temperature is a CPU temperature value that may be derived from multiple temperature sensors in the processor(s) and chassis. This temperature provides a general indicator of temperature in degrees Celsius inside a physical host.

The metric host.disk.smart.predict_failure is a value that one or more policy agents 205 may calculate using multiple S.M.A.R.T. counters provided by disk hardware. Policy agent 205 may set predict_failure to true (value=1) when it determines from a combination of S.M.A.R.T. counters that a disk is likely to fail. An alarm triggered for this metric may contain the disk identifier in the metadata.

The metric host.heartbeat is a value that may indicate if policy agent 205 is functioning on a host. policy controller 201 may periodically check the status of each host by making a status request to each of policy agents 205. The host.heartbeat metric is incremented for each successful response. Alarms may be configured to detect missed heartbeats over a given interval.

In some examples, the following raw metrics may be available for instances: instance.cpu.usage, instance.cpu.ipc, instance.cpu.l3_cache.miss, instance.cpu.l3_cache.usage, instance.cpu.mem_bw.local, instance.cpu.mem_bw.remote, instance.cpu.mem_bw.total, instance.disk.io.read, instance.disk.io.write, instance.disk.usage, instance.disk.usage.gb, instance.memory.usage, instance.network.egress.bit_rate, instance.network.egress.drops, instance.network.egress.errors, instance.network.egress.packet_rate, instance.network.egress.total_bytes, instance.network.egress.total_packets, instance.network.ingress.bit_rate, instance.network.ingress.drops, instance.network.ingress.errors, instance.network.ingress.packet_rate, and instance.network.ingress.total_bytes, and instance.network.ingress.total_packets.

In some examples, the following calculated metrics may be available for instances: instance.heartbeat.

In some examples, the following raw metrics may be available for virtual router 142: host.contrail.vrouter.aged_flows, host.contrail.vrouter.total_flows, host.contrail.vrouter.exception_packets, host.contrail.vrouter.drop_stats_flow_queue_limit_exceeded, host.contrail.vrouter.drop_stats_flow_table_full, host.contrail.vrouter.drop_stats_vlan_fwd_enq, host.contrail.vrouter.drop_stats_vlan_fwd_tx, host.contrail.vrouter.flow_export_drops, host.contrail.vrouter.flow_export_sampling_drops, host.contrail.vrouter.flow_rate_active_flows, host.contrail.vrouter.flow_rate_added_flows, and host.contrail.vrouter.flow_rate_deleted_flows.

In some examples, the following raw metrics may be available within in a OpenStack Project Chart View included within dashboard 203: openstack.project.active_instances, openstack.project.vcpus_allocated, openstack.project.volume_storage_allocated, openstack.project.memory_allocated, openstack.project.floating_ip_count, openstack.project.security_group_count, and openstack.project.volume_count.

In some examples, the following raw metrics may be available in a Kubernetes Pod Chart View included within dashboard 203: pod.memory_allocated, pod.vcpus_allocated.

Data manager 218 provides a messaging mechanism for communicating with policy agents 205 deployed in servers 126. Data manager 218 may, for example, issue messages to configured and program policy agent, and may manage metrics and other data received from policy agents 205, and store some or all of such data within usage metrics data store 216. Data manager 218 may receive, for example, raw metrics from one or more policy agents 205. Data manager 218 may, alternatively or in addition, receive results of analysis performed by policy agent 205 on raw metrics. Data manager 218 may, alternatively or in addition, receive information relating to patterns of usage of one or more input/output devices 248 that may be used to classify one or more input/output devices 248. Data manager 218 may store some or all of such information within usage metrics data store 216.

In the example of FIG. 2, server 126 represents a physical computing node that provides an execution environment for virtual hosts, such as VMs 148. That is, server 126 includes an underlying physical compute hardware 244 including one or more physical microprocessors 240, memory 249 such as DRAM, power source 241, one or more input/output devices 248, and one or more storage devices 250. As shown in FIG. 2, physical compute hardware 244 provides an environment of execution for hypervisor 210, which is a software and/or firmware layer that provides a light weight kernel 209 and operates to provide a virtualized operating environments for virtual machines 148, containers, and/or other types of virtual hosts. Server 126 may represent one of servers 126 (e.g., server 126A through server 126N) illustrated in FIG. 1

In the example shown, processor 240 is an integrated circuit having one or more internal processor cores 243 for executing instructions, one or more internal caches or cache devices 245, memory controller 246, and input/output controller 247. Although in the example of FIG. 2 server 126 is illustrated with only one processor 240, in other examples, server 126 may include multiple processors 240, each of which may include multiple processor cores.

One or more of the devices, modules, storage areas, or other components of server 126 may be interconnected to enable inter-component communications (physically, communicatively, and/or operatively). For instance, cores 243 may read and write data to/from memory 249 via memory controller 246, which provides a shared interface to memory bus 242. Input/output controller 247 may communicate with one or more input/output devices 248, and/or one or more storage devices 250 over input/output bus 251. In some examples, certain aspects of such connectivity may be provided through communication channels that include a system bus, a network connection, an inter-process communication data structure, or any other method for communicating data or control signals.

Within processor 240, each of processor cores 243A-243N (collectively "processor cores 243") provides an independent execution unit to perform instructions that conform to an instruction set architecture for the processor core. Server 126 may include any number of physical processors and any number of internal processor cores 243. Typically, each of processor cores 243 are combined as multi-core processors (or "many-core" processors) using a single IC (i.e., a chip multiprocessor).

In some instances, a physical address space for a computer-readable storage medium may be shared among one or more processor cores 243 (i.e., a shared memory). For example, processor cores 243 may be connected via a memory bus 242 to one or more DRAM packages, modules, and/or chips (also not shown) that present a physical address space accessible by processor cores 243. While this physical address space may offer the lowest memory access time to processor cores 243 of any of portions of memory 249, at least some of the remaining portions of memory 249 may be directly accessible to processor cores 243.

Memory controller 246 may include hardware and/or firmware for enabling processor cores 243 to communicate with memory 249 over memory bus 242. In the example shown, memory controller 246 is an integrated memory controller, and may be physically implemented (e.g., as hardware) on processor 240. In other examples, however, memory controller 246 may be implemented separately or in a different manner, and might not be integrated into processor 240.

Input/output controller 247 may include hardware, software, and/or firmware for enabling processor cores 243 to communicate with and/or interact with one or more components connected to input/output bus 251. In the example shown, input/output controller 247 is an integrated input/output controller, and may be physically implemented (e.g., as hardware) on processor 240. In other examples, however, memory controller 246 may also be implemented separately and/or in a different manner, and might not be integrated into processor 240.

Cache 245 represents a memory resource internal to processor 240 that is shared among processor cores 243. In some examples, cache 245 may include a Level 1, Level 2, or Level 3 cache, or a combination thereof, and may offer the lowest-latency memory access of any of the storage media accessible by processor cores 243. In most examples described herein, however, cache 245 represents a Level 3 cache, which, unlike a Level 1 cache and/or Level 2 cache, is often shared among multiple processor cores in a modern multi-core processor chip. However, in accordance with one or more aspects of the present disclosure, at least some of the techniques described herein may, in some examples, apply to other shared resources, including other shared memory spaces beyond the Level 3 cache.

Power source 241 provides power to one or more components of server 126. Power source 241 typically receives power from the primary alternative current (AC) power supply in a data center, building, or other location. Power source 241 may be shared among numerous servers 126 and/or other network devices or infrastructure systems within data center 110. Power source 241 may have intelligent power management or consumption capabilities, and such features may be controlled, accessed, or adjusted by one or more modules of server 126 and/or by one or more processor cores 243 to intelligently consume, allocate, supply, or otherwise manage power.

One or more storage devices 250 may represent computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor cores 243.

One or more input/output devices 248 may represent any input or output devices of server 126. In such examples, input/output devices 248 may generate, receive, and/or process input from any type of device capable of detecting input from a human or machine. For example, one or more input/output devices 248 may generate, receive, and/or process input in the form of physical, audio, image, and/or visual input (e.g., keyboard, microphone, camera). One or more input/output devices 248 may generate, present, and/or process output through any type of device capable of producing output. For example, one or more input/output devices 248 may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

Memory 249 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 249 provides a physical address space composed of addressable memory locations. Memory 249 may in some examples present a non-uniform memory access (NUMA) architecture to processor cores 243. That is, processor cores 243 might not have equal memory access time to the various storage media that constitute memory 249. Processor cores 243 may be configured in some instances to use the portions of memory 249 that offer the lower memory latency for the cores to reduce overall memory latency.

Kernel 209 may be an operating system kernel that executes in kernel space and may include, for example, a Linux, Berkeley Software Distribution (BSD), or another Unix-variant kernel, or a Windows server operating system kernel, available from Microsoft Corp. In general, processor cores 243, storage devices (e.g., cache 245, memory 249, and/or storage device 250), and kernel 209 may store instructions and/or data and may provide an operating environment for execution of such instructions and/or modules of server 126. Such modules may be implemented as software, but may in some examples include any combination of hardware, firmware, and software. The combination of processor cores 243, storage devices within server 126 (e.g., cache 245, memory 249, and/or storage device 250), and kernel 209 may retrieve, store, and/or execute the instructions and/or data of one or more applications, modules, or software. Processor cores 243 and/or such storage devices may also be operably coupled to one or more other software and/or hardware components, including, but not limited to, one or more of the components of server 126 and/or one or more devices or systems illustrated as being connected to server 126.

Hypervisor 210 is an operating system-level component that executes on hardware platform 244 to create and runs one or more virtual machines 148. In the example of FIG. 2, hypervisor 210 may incorporate the functionality of kernel 209 (e.g., a "type 1 hypervisor"). In other examples, hypervisor 210 may execute on kernel 209 (e.g., a "type 2 hypervisor"). In some situations, hypervisor 210 may be referred to as a virtual machine manager (VMM). Example hypervisors include Kernel-based Virtual Machine (KVM) for the Linux kernel, Xen, ESXi available from VMware, Windows Hyper-V available from Microsoft, and other opensource and proprietary hypervisors.

In this particular example, server 126 includes a virtual router 142 that executes within hypervisor 210, and may operate in a manner consistent with the description provided in connection with FIG. 1. In the example of FIG. 2, virtual router 142 may manage one or more virtual networks, each of which may provide a network environment for execution of virtual machines 148 on top of the virtualization platform provided by hypervisor 210. Each of the virtual machines 148 may be associated with one of the virtual networks.

Policy agent 205 may execute as part of hypervisor 210, or may execute within kernel space or as part of kernel 209. Policy agent 205 may monitor some or all of the performance metrics associated with server 126. According to the techniques described herein, among other metrics for server 126, policy agent 205 is configured to monitor metrics that relate to or describe usage of resources shared internal to processor 240 by each of processes 151 executing on processor cores 243 within multi-core processor 240 of server 126. In some examples, such internal processor metrics relate to usage of cache 245 (e.g., a L3 cache) or usage of bandwidth on memory bus 242. Policy agent 205 may also be capable of generating and maintaining a mapping that associates processor metrics for processes 151 to one or more virtual machines 148, such as by correlation with process identifiers (PIDs) or other information maintained by kernel 209. In other examples, policy agent 205 may be capable of assisting policy controller 201 in generating and maintaining such a mapping. Policy agent 205 may, at the direction of policy controller 201, enforce one or more policies 202 at server 126 responsive to usage metrics obtained for resources shared internal to a physical processor 240 and/or further based on other usage metrics for resources external to processor 240.

Virtual router agent 136 is included within server 126 in the example of FIG. 2. With reference to FIG. 1, virtual router agents 136 may be included within each of servers 126 (although not shown in FIG. 1). In the example of FIG. 2, virtual router agent 136 communicates with SDN controller 132 and, responsive thereto, directs virtual router 142 so as to control the overlay of virtual networks and coordinate the routing of data packets within server 126. In general, virtual router agent 136 communicates with SDN controller 132, which generates commands to control routing of packets through data center 110. Virtual router agent 136 may execute in user space and operate as a proxy for control plane messages between virtual machines 148 and SDN controller 132. For example, virtual machine 148A may request to send a message using its virtual address via virtual router agent 136, and virtual router agent 136A may in turn send the message and request that a response to the message be received for the virtual address of virtual machine 148A, which originated the first message. In some cases, virtual machine 148A may invoke a procedure or function call presented by an application programming interface of virtual router agent 136, and virtual router agent 136 handles encapsulation of the message as well, including addressing.

In some example implementations, server 126 may include an orchestration agent (not shown in FIG. 2) that communicates directly with orchestration engine 130. For example, responsive to instructions from orchestration engine 130, the orchestration agent communicates attributes of the particular virtual machines 148 executing on each of the respective servers 126, and may create or terminate individual virtual machines.

Virtual machine 148A, virtual machine 148B, through virtual machine 148N (collectively "virtual machines 148") may represent example instances of virtual machines 148. Server 126 may partition the virtual and/or physical address space provided by memory 249 and/or provided by storage device 250 into user space for running user processes. Server 126 may also partition virtual and/or physical address space provided by memory 249 and/or storage device 250 into kernel space, which is protected and may be inaccessible by user processes.

In general, each of virtual machines 148 may be any type of software application and each may be assigned a virtual address for use within a corresponding virtual network, where each of the virtual networks may be a different virtual subnet provided by virtual router 142. Each of virtual machines 148 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., server 126A in the example of FIG. 1.

Each of virtual machines 148 may represent a tenant virtual machine running customer applications such as Web servers, database servers, enterprise applications, or hosting virtualized services used to create service chains. In some cases, any one or more of servers 126 (see FIG. 1) or another computing device hosts customer applications directly, i.e., not as virtual machines. Virtual machines as referenced herein (e.g., virtual machines 148), servers 126, or a separate computing device that hosts a customer application may be referred to alternatively as "hosts." Further, although one or more aspects of the present disclosure are described in terms of virtual machines or virtual hosts, techniques in accordance with one or more aspects of the present disclosure that are described herein with respect to such virtual machines or virtual hosts may also apply to containers, applications, processes, or other units of execution (virtualized or non-virtualized) executing on servers 126.

Processes 151A, processes 151B, through processes 151N (collectively "processes 151") may each execute within one or more virtual machines 148. For example, one or more processes 151A may correspond to virtual machine 148A, or may correspond to an application or a thread of an application executed within virtual machine 148A. Similarly, a different set of processes 151B may correspond to virtual machine 148B, or to an application or a thread of an application executed within virtual machine 148B. In some examples, each of processes 151 may be a thread of execution or other execution unit controlled and/or created by an application associated with one of virtual machines 148. Each of processes 151 may be associated with a process identifier that is used by processor cores 243 to identify each of processes 151 when reporting one or more metrics, such as internal processor metrics collected by policy agent 205.

In operation, hypervisor 210 of server 126 may create a number of processes that share resources of server 126. For example, hypervisor 210 may (e.g., at the direction of orchestration engine 130) instantiate or start one or more virtual machines 148 on server 126. Each of virtual machines 148 may execute one or more processes 151, and each of those software processes may execute on one or more processor cores 243 within hardware processor 240 of server 126. For instance, virtual machine 148A may execute processes 151A, virtual machine 148B may execute processes 151B, and virtual machines 148N may execute processes 151N. In the example of FIG. 2, processes 151A, processes 151B, and processes 151N (collectively "processes 151") all execute on the same physical host (e.g., server 126) and may share certain resources while executing on server 126. For instance, processes executing on processor cores 243 may share memory bus 242, memory 249, input/output devices 248, storage device 250, cache 245, memory controller 246, input/output controller 247, and/or other resources.

Kernel 209 (or a hypervisor 210 that implements kernel 209) may schedule processes to execute on processor cores 243. For example, kernel 209 may schedule, for execution on processor cores 243, processes 151 belonging to one or more virtual machines 148. One or more processes 151 may execute on one or more processor cores 243, and kernel 209 may periodically preempt one or more processes 151 to schedule another of the processes 151. Accordingly, kernel 209 may periodically perform a context switch to begin or resume execution of a different one of the processes 151. Kernel 209 may maintain a queue that it uses to identify the next process to schedule for execution, and kernel 209 may place the previous process back in the queue for later execution. In some examples, kernel 209 may schedule processes on a round-robin or other basis. When the next process in the queue begins executing, that next process has access to shared resources used by the previous processes, including, for example, cache 245, memory bus 242, and/or memory 249.

As described herein, the manner in which processes 151 within each of virtual machines 148 uses a resource shared internally within a given physical processor 240 is often difficult to detect and manage, and therefore, may cause performance issues for processes 151 within a different one of virtual machines 148 that is similarly executing within the same physical processor. For example, a first process (e.g., one of processes 151A within virtual machine 148A) executing on processor core 243A may perform a memory operation that results in data from memory 249 being loaded into cache 245. Kernel 209 may, after that data has been loaded into cache 245, perform a context switch so that a second process (e.g., one of processes 151B) begins executing on processor core 243A (or another of processor cores 243). That second process (one of processes 151B within virtual machine 148B) may perform memory access operations that also cause data to be loaded into shared cache 245. If the second process performs operations that occupy or consume a significant amount of cache space, the data stored in the cache by the first process may be overwritten. After the data stored in the cache by the first process is overwritten by the second process, kernel 209 may eventually perform a context switch to resume execution of the first process (i.e., from processes 151A). That first process may attempt to access the same data that would otherwise be quickly available from cache 245, but since that data was cleared from cache 245 as a result of operations performed by the second process (i.e., from processes 151B), the first process will experience a page fault and/or a cache miss. Processor 240 will then re-retrieve the data from memory 249, but accessing the data from memory 249 is likely to be significantly slower than accessing the data from cache 245. Therefore, the performance of the first process may be adversely affected as a result of the cache-related operations performed by the second process. In other words, even when a given software application of a virtual machine is allocated an otherwise sufficient share of memory 249 and CPU time of processor 240 and/or a processor core 243 therein, utilization of cache 245 internal to processor 240 (and therefore not typically visible) by another software application can lead poor and unpredictable performance by both applications. As such, techniques are described herein by which policy agent is configured to interrogate processor 240 to obtain metrics for resources, such as cache 245, that are shared internal to the processor and, therefore, would otherwise not be visible external to the processor. Moreover, the techniques leverage the internal processor metrics within the performance monitoring and policy enforcement mechanism provided by policy controller 201, thereby providing improved fine-grain control over the computing environment.

As another example, the manner in which one or more processes 151 within one of virtual machines 148 use other shared resources internal to processor 240 may also cause performance issues for other processes. For example, a first process (e.g., one of processes 151A within virtual machine 148A) executing on processor cores 243 may periodically read to and write from memory 249. A second process (e.g., one of processes 151B within virtual machine 148B) that also executes on processor cores 243 may also read and write from memory 249. As such, the first and second processes each consume a portion of the bandwidth available by memory bus 242 internal to processor 240. However, the second process may be a highly memory-intensive process that performs many operations involving memory bus 242. By performing many operations involving memory bus 242, the second process may consume so much of the bandwidth of memory bus 242 that the ability of the first process to read to and write from memory 249 may be adversely affected. Accordingly, as a result of operations of the second process involving shared memory bus 242, the performance of the second process may be adversely affected.

In the examples just described, the processes may be executing in different virtual machines or on the same virtual machine. In any case, situations arise where, regardless of policies designed to allocate fair amounts of utilization of memory 249 and processor 240 and/or cores 243, utilization resources that are shared by the software processes internal the processor 240 may affect, in some way, the performance of virtual machine 148A, and correspondingly, computing resources consumed by virtual machine 148A may affect, in some way, the performance of virtual machine 148B. In that sense, virtual machine 148A and virtual machine 148B must coexist on the same server 126, and therefore, must coexist in what might be considered the same "neighborhood." And further, where one of the virtual machines 148 consumes a significant amount of shared resources, particularly where that consumption affects other virtual machines 148, that resource-consuming process might be considered to be disrupting the neighborhood, and as a result, labeled a "noisy" neighbor.

When performance issues arise for one of virtual machines 148 executing on server 126, such issues may be the result of a noisy neighbor (e.g., a resource-intensive different virtual machine) on server 126. Yet some typical or common usage and/or performance metrics, such as CPU utilization or CPU load associated with processor cores 243, might not pinpoint or otherwise identify which virtual machine can be implicated as the noisy neighbor. In other words, where one of virtual machines 148 is consuming resources shared internal to processor 240 and in a way that affects other virtual machines 148, that consumption might not be reflected in a metric such as CPU utilization or CPU load. Accordingly, other resource metrics might be needed in order to identify and act on any virtual machines 148, containers, and/or processes 151 that may be consuming shared resources in a manner that is—or will be—affecting the performance of other virtual machines 148, containers, and/or processes 151.

In the example of FIG. 2, and in accordance with one or more aspects of the present disclosure, policy agent 205 monitors the operation of server 126 to identify virtual machines 148 that use shared resource internal to processor 240 of server 126 in such a way that may affect operation of other virtual machines 148. For example, policy agent 205 may monitor internal processor metrics that relate to or describe usage of cache 245 by each of processes 151 executing on processor cores 243 within server 126. Policy agent 205 may alternatively, or in addition, monitor internal processor metrics that relate to or describe consumption of memory bandwidth for memory bus 242 by each of processes 151 executing on processor cores 243 within server 126. Policy agent 205 may alternatively, or in addition, monitor internal processor metrics that relate to or describe use and/or consumption of other shared resources by each of processes 151 executing on processor cores 243 within server 126.

To access and monitor the internal processor metrics, policy agent 205 may interrogate processor 240 through a specialized hardware interface 254 that is exposed by APIs of kernel 209. For example, policy agent 205 may access or manipulate one or more hardware registers of processor cores 243 to program monitoring circuit ("MON CIRC") 252 of processor 240 for internally monitoring shared resources and for reporting, via the interface, usage metrics for those resources. Policy agent 205 may access and manipulate the hardware interface of processor 240 by invoking kernel, operating system, and/or hypervisor calls. For example, the hardware interface of processor 240 may be memory mapped via kernel 209 such that the programmable registers of processor 240 for monitoring internal resources of the processor may be read and written by memory access instructions directed to particular memory addresses. In response to such direction by policy agent 205, monitoring circuity 252 internal to processor 240 may monitor execution of processor cores 243, and communicate to policy agent 205 or otherwise make available to policy agent 205 information about internal processor metrics for each of the processes 151.

Policy agent 205 may maintain a mapping that associates processor metrics to each of processes 151 executing within virtual machines 148. For example, policy agent 205 may interrogate kernel 209 to identify process identifiers associated with each of the software processes executing on the virtual machines 148. Policy agent 205 may use the process identifiers for each of processes 151 associated with virtual machines 148 to correlate processor metrics reported by processor cores 243 for each of processes 151 with one of virtual machines 148. Policy agent 205 may use this information to extrapolate, from the processor metrics associated with each of processes 151, processor metrics associated with each of virtual machines 148. Policy agent 205 may use the extrapolated processor metrics associated with each of virtual machines 148 to identify how each of virtual machines 148 are using shared resources of servers 126. Policy agent 205 may evaluate the internal processor metrics and determine whether one or more virtual machines 148 are using shared resources in a manner that may adversely affect operation of other virtual machines 148.

Policy agent 205 may, in response to identifying one or more virtual machines 148 that are using shared resources in a manner that may adversely affect operation of other virtual machines 148, raise an alarm. For example, policy agent 205 may analyze internal processor metrics for virtual machine 148B, or one or more processes 151B executing within virtual machine 148B. Policy agent 205 may compare one or more metrics to an alarm threshold. The alarm threshold may be based on one or more policies 202 that policy agent 205 receives from policy controller 201 or that are otherwise expressed by policy controller 201 (or from one or more components of policy controller 201). Policy agent 205 may evaluate internal processor metrics for a number of intervals, and evaluate statistics for the processor metrics (e.g., average, maximum, standard deviation) in light of one or more policies 202. In some examples, policy agent 205 may evaluate internal processor metrics for virtual machine 148B over a period of time (e.g., five minutes) and/or over numerous intervals to determine a representative set of internal processor metrics for virtual machine 148B. Policy agent 205 may filter out any aberrations in the collected internal processor metrics that are not representative of the normal operation of virtual machine 148B and/or that are not likely to affect operation of virtual machines 148 that neighbor virtual machine 148B within server 126. Policy agent 205 may determine, based on such an evaluation, that the internal processor metrics for virtual machine 148B exceeds an alarm threshold expressed in one or more policies 202, or that the internal processor metrics associated with virtual machine 148B otherwise triggers an alarm.

Policy agent 205 may, in response to the alarm, take one or more actions to prevent detrimental effects on the performance of other virtual machines 148. For example, the alarm or the metrics on which the alarm is based may indicate that virtual machine 148B may be using cache 245 in such a way that may affect the performance of one or more other virtual machines 148. Policy agent 205 may act on such an alarm by restricting use of cache 245 by virtual machine 148B, by carving up cache 245 so that each of virtual machines 148 only has access to a portion of cache 245, by allocating a smaller portion to virtual machine 148B, by assigning overlapped or isolated cache lines to one or more virtual machines 148 or processes 151, or by otherwise restricting use of cache 245 by virtual machine 148B executing within virtual machine 148B. In another example, the alarm or the metrics on which the alarm is based may indicate that virtual machine 148B may be consuming memory bandwidth to such an extent that it is affecting the performance of other virtual machines 148 that seek to use memory bandwidth. Policy agent 205 may act on such an alarm by restricting use of memory bandwidth by virtual machine 148B.

In some examples, policy agent 205 may restrict use of shared resources by one or more virtual machines by restricting use of shared resources used by one or more processes executing within a particular virtual machine. For instance, the alarm or the metrics on which an alarm is based may indicate that a particular identified process within virtual machine 148B is using a shared resource in such a way that may affect not only the performance of one or more other virtual machines 148, but also one or more other processes 151 executing within that same virtual machine 148B. Policy agent 205 may act on such an alarm by restricting use of one or more shared resources by the identified process within virtual machine 148B. Policy agent 205 may apply the restriction to only the identified process within virtual machine 148B, rather than to all processes within virtual machine 148B. In some examples, virtual machine 148B may itself instantiate one or more virtual machines within virtual machine 148B. If this "second level" virtual machine itself becomes "noisy," policy agent 205 may apply the restrictions to only the noisy virtual machine within virtual machine 148, and avoid restricting other processes within virtual machine 148B where such restrictions might not be warranted or necessary.

In some examples, policy agent 205 may, alternatively or in addition, report to policy controller 201 information about the internal processor metrics. For example, policy agent 205 may collect processor metrics from processor cores 243. Policy agent 205 may identify the virtual machines 148 that are associated with some or all of the collected processor metrics. Policy agent 205 may communicate to data manager 218 information about the collected processor metrics. Data manager 218 may store some or all of the received information in usage metrics data store 216.

Policy controller 201 may act on the information received from policy agent 205 about internal processor metrics. For example, analytics engine 214 may analyze information stored in usage metrics data store 216 and identify, based on information about internal processor metrics, identify one or more virtual machines 148 that are operating in a manner that may adversely affect the operation of other virtual machines 148 executing on server 126. Analytics engine 214 may, in response to identifying one or more virtual machines 148, generate one or more reports and notifications 212.

Analytics engine 214 may alternatively, or in addition, cause or instruct policy agent 205 to take actions to address the operation of the identified virtual machines 148.

In some examples, policy agent 205 may, alternatively or in addition, report to policy controller 201 information derived from internal processor metrics of processor cores 243. In other words, rather than simply reporting internal processor metrics to policy controller 201, policy agent 205 may perform some analysis on the collected metrics, and report the results of such analysis to policy controller 201. For example, policy agent 205 may collect processor metrics and identify one or more virtual machines 148 that are operating in a manner that may adversely affect the operation of other virtual machines 148 executing on server 126. Policy agent 205 may communicate to data manager 218 information about the results of its analysis, which may identify one or more virtual machines 148 and/or the shared resources that may be involved. Analytics engine 214 may, in response to such information, instruct policy agent 205 to take action to address the operation of the identified virtual machines 148. Accordingly, the processing and/or analysis of various metrics, including internal processor metrics from processor cores 243, may be performed by policy agent 205, by policy controller 201 (e.g., analytics engine 214), by a combination of policy agent 205 and policy controller 201, or by another module or component of server 126.

In some examples, policy agent 205 and/or policy controller 201 may monitor internal processor metrics associated with processor cores 243 using Intel's Resource Directory Technology (RDT) available in some Intel® Xeon® processors as one example of monitoring circuitry 252 of processor 240. Intel's RDT enables resource monitoring and control features designed to improve visibility into and control over how shared platform resources are used. For instance, by using RDT's Cache Monitoring Technology (CMT) of monitoring circuitry 252, policy agent 205 may determine last level cache utilization of individual threads that are executing on server 126. Policy agent 205 and/or policy controller 201 may use this information to derive usage of cache 245 by one or more virtual machines 148 (or processes 151). In another example, policy agent 205 may use RDT's Memory Bandwidth Monitoring (MBM) of monitoring circuitry 252 to identify local memory bandwidth usage for individual threads executing within virtual machines 148 on server 126. In RDT, MBM is an extension of CMT which provides monitoring per thread for its remote and local memory bandwidth usage. In another example, policy agent 205 may use RDT's Cache Allocation Technology (CAT) of monitoring circuitry 252 to prioritize different virtual machines 148 or processes executing on server 126. Hypervisor 210, policy controller 201 and/or policy agent 205 may use CAT to carve out cache 245 to different virtual machines 148 executing on server 126. In another example, policy agent 205 may also use RDT's Code and Data Prioritization (CDP) to allocate code and data segments in cache 245.

To access information made available through RDT, policy agent 205 may access CPU identifier information and information of monitoring circuitry 252 as exposed by kernel 209 to verify if processor cores 243 implements some or all of the RDT capabilities. Policy agent 205 may interact with the Intel processor and the kernel running on the Intel processor. For instance, if processor cores 243 implements RDT or a similar technology, policy agent 205 may, by invoking the appropriate kernel APIs or function calls, configure a model specific register (MSR) and program a specific item identifier that corresponds to the desired internal processor metrics associated with processor cores 243. In response, processor cores 243 may periodically publish or write the requested internal processor metrics to the specified MSR. Policy agent 205 may thereafter collect internal processor metrics by reading from the specified MSR. In some examples, such as when hypervisor 210 implements or is implemented on top of a Linux kernel, the Linux kernel memory maps the internal processor metrics, and controls how policy agent 205 or other processes read and write from the specified MSRs. Policy agent 205 may invoke the appropriate Linux calls to direct processor cores 243 to monitor specific metrics, and policy agent 205 may read the appropriate MSRs in order to extract the desired internal processor metrics.

Policy controller 201 may establish one or more policies 202 indicating that when orchestration engine 130 directs hypervisor 210 to spin up, instantiate, or otherwise start a new virtual machine, hypervisor 210 will specify how the new virtual machine may use one or more shared resources. For example, policy control engine 211 of policy controller 201 may establish one or more policies 202 indicating that new virtual machines 148 are given an equal share of cache 245. Or that high priority virtual machines 148, containers, or processes 151 are given a larger share of cache 245. Policy control engine 211 may cause policy controller 201 to communicate one or more policies 202 to orchestration engine 130 (or to hypervisor 210) so that when orchestration engine 130 directs hypervisor 210 to create a new virtual machine, the new virtual machine is created with an equal share of cache 245. In another example, policy controller 201 may establish one or more policies 202 indicating that new virtual machines 148 are given a specific percentage share of cache 245. In such an example, policy control engine 211 may cause policy controller 201 to communicate one or more corresponding policies 202 to orchestration engine 130 and/or to hypervisor 210 so that when orchestration engine 130 directs hypervisor 210 to create a new virtual machine, the new virtual machine is created with a specific percentage share of cache 245. Orchestration engine 130 may implement such policies by carving up cache 245 using RDT's CAT functionality or similar functionality made available by other processors.

In such examples, policy agent 205 and/or policy controller 201 may still respond to alerts by further restricting use of cache 245 or other shared resource, and/or generate one or more reports and notifications 212. A REST interface may be used to dynamically update the allocation of cache 245 associated with virtual machines 148 and/or processes 151. For example:

```
curl -i \
  -H 'Content-Type: application/json' \
  -X PUT \
  -d '{ "InstanceCacheAllocationPercentage": 5 }' \
  http://<host-ip-address>:7000/appformix/v1.0/instance_definition/<instance-id>
```

In the example above, parameters that can be set for the instance definition include InstanceCacheAllocationMB, InstanceCacheAllocationPercentage, and InstanceCacheAllocationEqual Share. Policy controller 201 and/or policy agent 205 may provide isolated cache lines to virtual machines 148, to instances of virtual machines 148, or to applications. Alternatively, or in addition, policy controller 201 and/or policy agent 205 may allocate shared portions of cache 245 based on a priority class of the instance, classification of the instance, or based on application workload. In some examples, the cache may be allocated on a per-CPU socket basis (e.g., per processor 240 basis). Policy agent 205 may perform allocations based on usage, current scheduling pattern of the set of processes, and CPU core pinning attributes of the instance, the virtual machine, or the application.

Policy agent 205 and/or policy controller 201 may classify one or more virtual machines 148 based on the manner in which each virtual machine consumes shared resources. For example, policy agent 205 may monitor metrics, including internal processor metrics for each of virtual machines 148 over a period of time. Policy agent 205 may, for each of virtual machines 148, determine patterns of usage of cache 245, memory bandwidth usage, instructions retired per second, and other metrics associated with the operation of each of virtual machines 148. Policy agent 205 may communicate information about the patterns of usage to data manager 218 of policy controller 201. Data manager 218 may store the information in usage metrics data store 216. Analytics engine 214 of policy controller 201 may analyze the metrics for each of virtual machines 148, such as by performing a linear regression across each of the monitored metrics. Analytics engine 214 may, based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Policy controller 201 may establish one or more policies 202 to limit the number of virtual machines 148 having the same or similar classifications on server 126. For example, policy control engine 211 of policy controller 201 may establish one or more policies 202 that are based on the classifications of virtual machines 148 describe above. Such policies 202 may be designed to avoid having too many virtual machines 148 that are consuming shared resources of server 126 in similar ways. In one example, policy control engine 211 and/or analytics engine 214 may determine that if a given number of virtual machines 148 can be characterized as CPU bound, and orchestration engine 130 (or hypervisor 210) seeks to instantiate or start a new CPU bound virtual machine, one or more policies 202 may ensure that the new virtual machine is not instantiated or started on server 126, but rather, is instantiated or started on a different physical host within data center 110. Specifically, in such an example, policy control engine 211 may establish one or more policies 202 that limit the number of CPU bound virtual machines 148 to the number of cores associated with processor cores 243. If there are 16 cores within processor cores 243, policy control engine 211 may establish one or more policies 202 indicating that no more than 16 CPU bound virtual machines 148 should be executing on server 126. In a different example, if a given number of virtual machines 148 can be characterized as cache bound, and orchestration engine 130 seeks to instantiate or start a new cache bound virtual machine, one or more policies 202 may ensure that the new virtual machine is not instantiated or started on server 126, but rather, is instantiated or started on a different physical host within data center 110.

Policy controller 201 may cause orchestration engine 130 to choose or adjust, based on classifications of virtual machines 148, the physical host on which one or more virtual machines 148 are executing. For example, with reference to FIG. 1 and FIG. 2, policy control engine 211 of policy controller 201 may determine that 50 CPU bound virtual machines 148 and no memory bound virtual machines 148 are executing on server 126A. Policy control engine 211 may further determine that no CPU bound virtual machines 148 and 40 memory bound virtual machines 148 are executing on server 126B. Policy control engine 211 may determine that server 126A and server 126B may each perform better if some of the 50 CPU bound virtual machines 148 executing on server 126A were instead executing on server 126B, and some of the 40 memory bound virtual machines 148 executing on server 126B were instead executing on server 126A. Accordingly, policy control engine 211 may cause policy controller 201 to communicate with orchestration engine 130, instructing orchestration engine 130 to reallocate one or more virtual machines 148. For instance, policy controller 201 may instruct orchestration engine 130 to move some of the virtual machines 148 executing on server 126A to server 126B, and move some of the virtual machines 148 executing on server 126B to server 126A. Data center 110 may, as a result of allocating virtual machines 148 across servers 126 in this manner, exhibit improved performance.

Policy controller 201 may also establish policies to improve NUMA locality using memory bandwidth metrics (e.g., RDT's MBM metric). In such an example, policy agent 205 may collect from processor cores 243 metrics relating to unoptimized NUMA if remote memory bandwidth is greater than local memory bandwidth. Policy agent 205 may use such metrics to repurpose or reimplement one or more virtual machines 148 for NUMA locality. The latencies for accessing remote memory may be much higher than for local memory.

Analytics engine 214 evaluates alarms included in each of profiles 213 by comparing the alarm thresholds to usage metrics 216 for the corresponding resource using any of the aforementioned techniques for static or dynamic thresholding, immediate or historic usage data, for instance. Based on evaluating the multiple alarms within a profile 213 for an element by virtue of direct association with the element or indirect association with the element because the element is configured by policy control engine 211 as a member of a group associated with a profile that includes one or more alarms, analytics engine 214 sets the profile to active or inactive and may perform any of the aforementioned ameliorative, reporting, and or notification operations. In some examples, analytics engine 214 may distribute profiles 213 among policy agents 205 to evaluate alarms and profiles 213 in a distributed, local manner on servers 126.

Figure 3A:
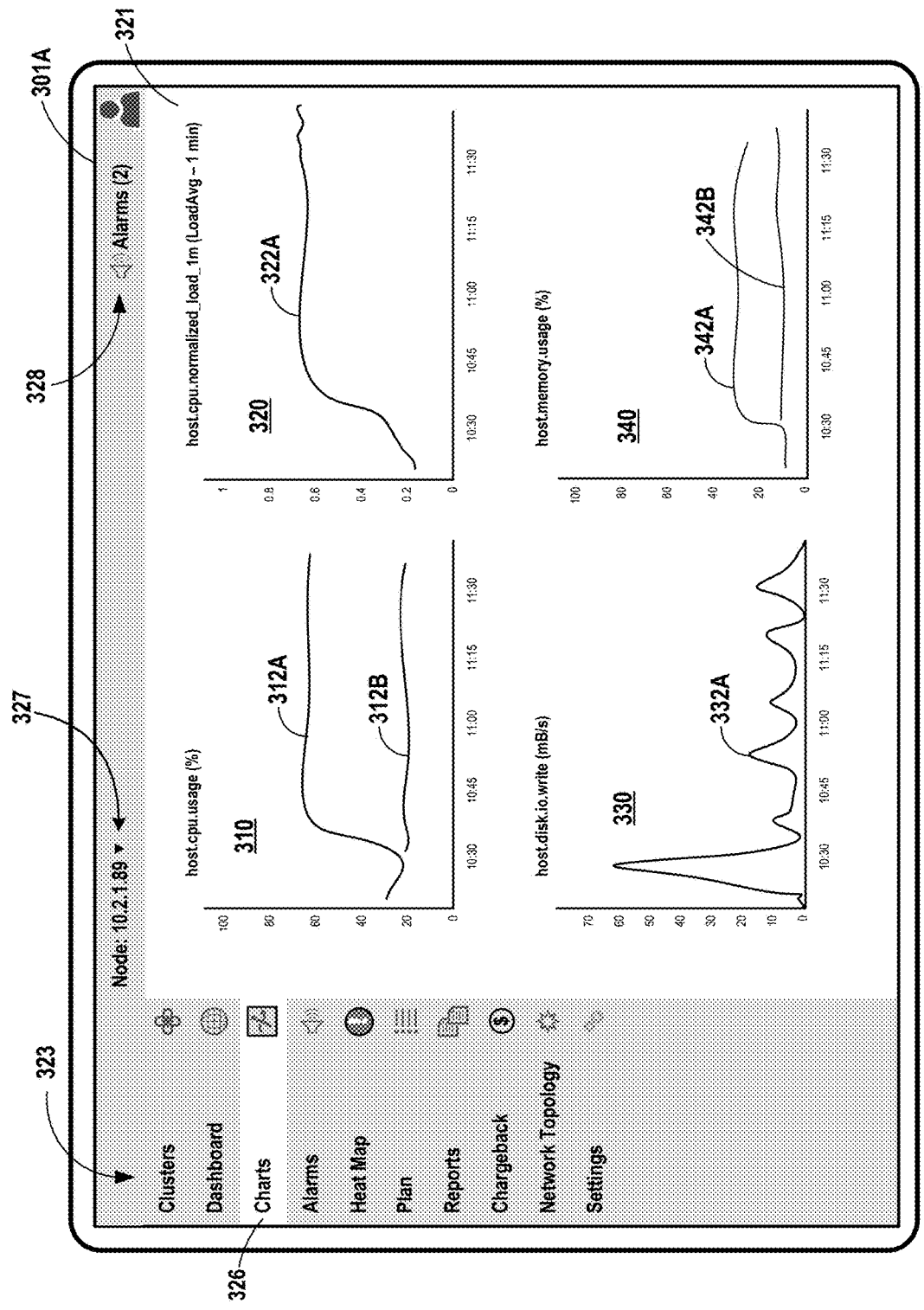
FIG. 3A and FIG. 3B are conceptual diagrams illustrating an example user interfaces presented by an example user interface device in accordance with one or more aspects of the present disclosure.
Figure 3B:
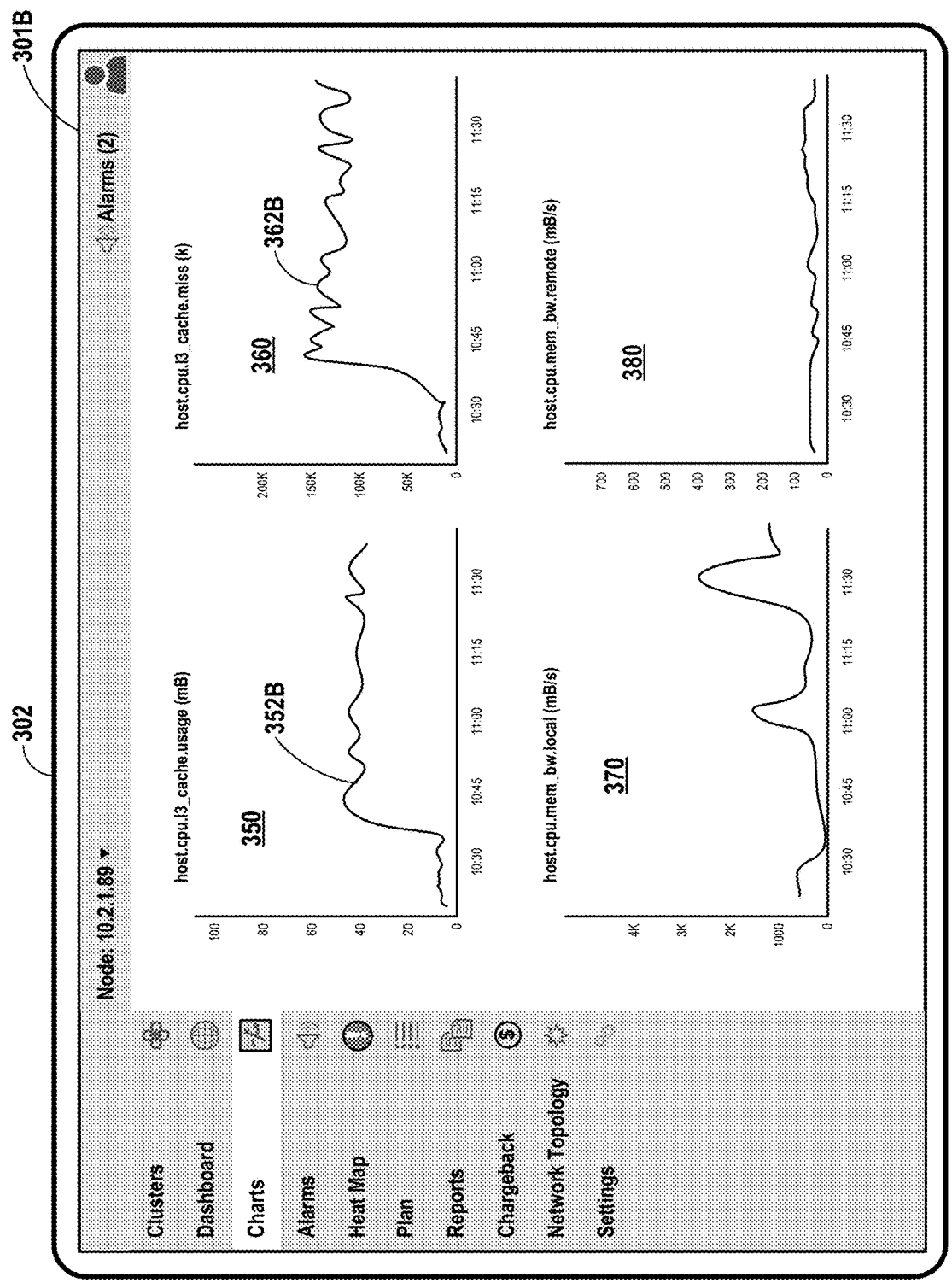

FIG. 3A and FIG. 3B are conceptual diagrams illustrating an example user interfaces presented by an example user interface device in accordance with one or more aspects of the present disclosure. User interface 301A illustrated in FIG. 3A and user interface 301B illustrated in FIG. 3B may each correspond to a user interface presented by user interface device 129, and may be example user interfaces corresponding to or included within dashboard 203 described in connection with FIG. 1 and FIG. 2. Although the user interfaces illustrated in FIG. 3A and FIG. 3B are shown as graphical user interfaces, other types of interfaces may be presented by user interface device 129, including a text-based user interface, a console or command-based user interface, a voice prompt user interface, or any other appropriate user interface. One or more aspects of user interface 301A and/or user interface 301B may be described herein within the context of data center 110 of FIG. 1 and FIG. 2.

With reference to FIG. 2, FIG. 3A, and FIG. 3B, and in accordance with one or more aspects of the present disclosure, user interface device 129 may present user interface 301A and user interface 301B. For example, user interface device 129 may detect input that it determines corresponds to a request, by a user, to present metrics associated with server 126 of FIG. 2. User interface device 129 may output to policy controller 201 an indication of input. Policy control engine 211 of policy controller 201 may detect input and determine that the input corresponds to a request for information about metrics associated with server 126. Policy control engine 211 may, in response to the input, generate dashboard 203, which may include information underlying user interface 301A and user interface 301B. Policy control engine 211 may cause policy controller 201 to send information to user interface device 129. User interface device 129 may receive the information, and determine that the information includes information sufficient to generate a user interface. User interface device 129 may, in response to the information received from policy controller 201, create user interface 301A and present the user interface at a display associated with user interface device 129 in the manner illustrated in FIG. 3A. Similarly, user interface device 129 may, also in response to the information received from policy controller 201, create user interface 301B and present it at the display associated with user interface device 129 in the manner illustrated in FIG. 3B.

In the example of FIG. 3A, user interface 301A includes CPU usage metrics graph 310, CPU load metrics graph 320, disk usage metrics graph 330, and memory usage metrics graph 340. Each graph in FIG. 3A may represent metrics values, over time (along the x-axis), associated with multiple virtual machines 148 executing on server 126, and as detected or determined by policy controller 201 and/or policy agent 205 of FIG. 2. In particular, in FIG. 3A, metrics associated with virtual machine 148A are shown as CPU usage 312A, CPU load 322A, disk usage 332A, and memory usage 342A. In addition, metrics for virtual machine 148B in FIG. 3A include CPU usage 312B and memory usage 342B.

In the example of FIG. 3B, user interface 301B includes cache usage graph 350, cache miss frequency graph 360, local memory bandwidth graph 370, and remote memory bandwidth graph 380. Again, each graph in FIG. 3B may represent time series metrics values, associated with multiple virtual machines 148 executing on server 126, and as detected or determined by policy controller 201 and/or policy agent 205 of FIG. 2. In FIG. 3B, metrics associated with virtual machine include cache usage 352B and cache miss frequency 362B.

The information illustrated in FIG. 3A suggests that virtual machine 148A experienced a significant increase in CPU usage (see CPU usage 312A on CPU usage metrics graph 310) and CPU load (see CPU load 322A on CPU load metrics graph 320) starting at approximately 10:35. Further, virtual machine 148A experienced a significant increase in memory usage at about the same time (see memory usage 342A on memory usage metrics graph 340). The cause of those changes in performance metrics for virtual machine 148A might not be apparent from the graphs presented in user interface 301A of FIG. 3A. In particular, note that the metrics for virtual machine 148B in FIG. 3A (e.g., CPU usage 312B) remain relatively constant after 10:35, and do not suggest that virtual machine 148B is operating in a manner that is degrading the performance of virtual machine 148A.

User interface 301B of FIG. 3B presents information and graphs derived from internal processor metrics. Unlike FIG. 3A, FIG. 3B provides information that may be helpful in identifying which of virtual machines 148 is affecting the performance of virtual machine 148A. For instance, although virtual machine 148B has relatively constant 20% CPU utilization after 10:35 (as illustrated by CPU usage 312B in FIG. 3A), it is apparent from cache usage graph 350 (specifically, cache usage 352B) in FIG. 3B that virtual machine 148B has increased its cache usage to approximately 40 MB at approximately 10:35. Further, virtual machine 148B starts generating a significant number of cache misses at 10:35 (see cache miss frequency 362B of cache miss frequency graph 360). Based on this information, policy agent 205, policy controller 201, and/or an administrator operating user interface device 129 may determine that the cause of the change in performance metrics for virtual machine 148A is virtual machine 148B, which may be using cache 245 in a manner that affects the performance of virtual machine 148A.

Accordingly, and as illustrated by FIG. 3A and FIG. 3B, by monitoring internal processor metrics to identify shared resources consumed by virtual machine 148B within the processor, it may be possible to identify one or more virtual machines that are consuming shared resources within the processor of server 126 in a manner that may adversely affect the performance of other virtual machines that contend for those same resources within the processor. Without monitoring such internal processor metrics, debugging or otherwise identifying the cause of the change in performance metrics for virtual machines 148 may be difficult or impossible.

Figure 4:
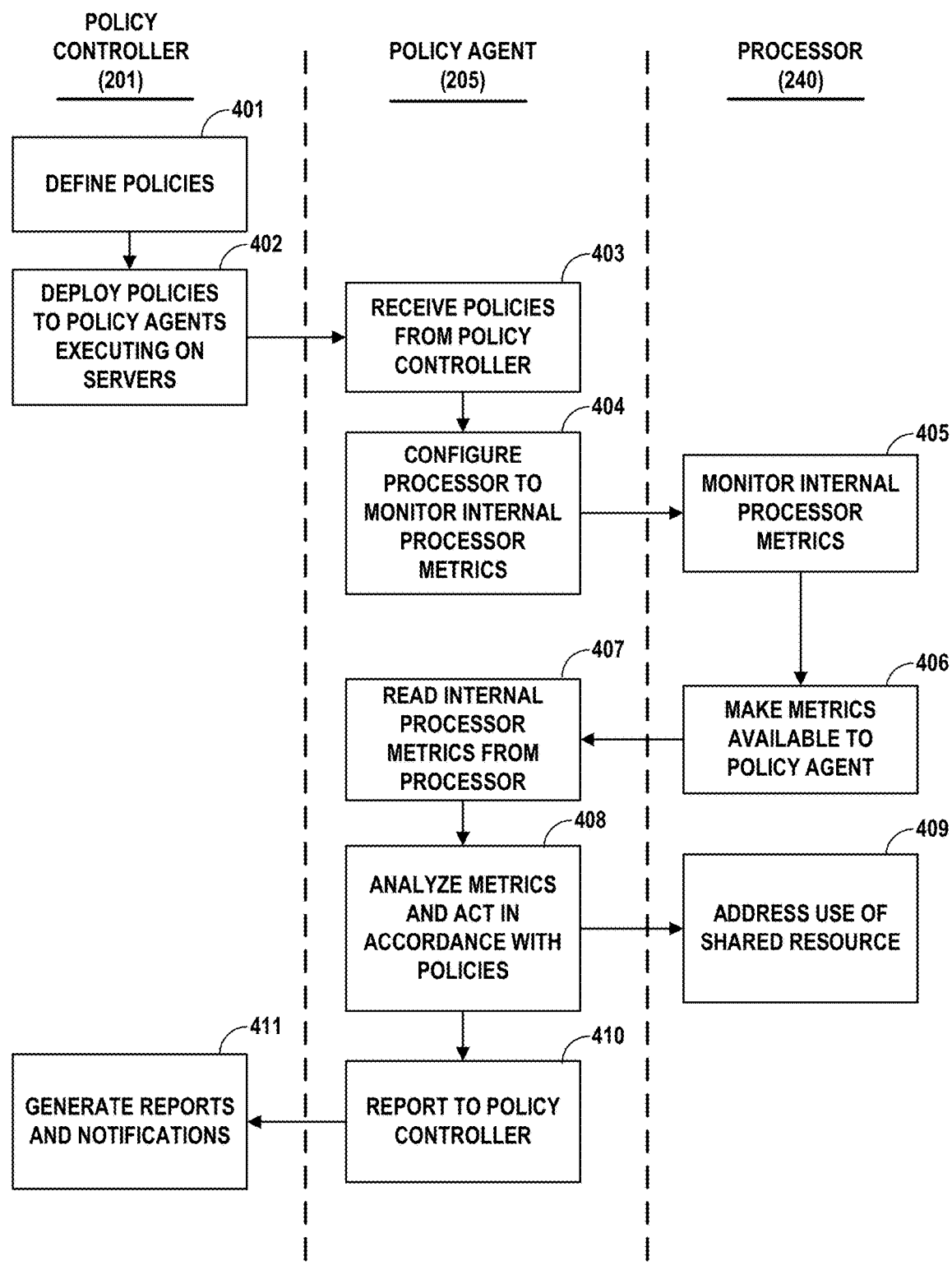
FIG. 4 is a flow diagram illustrating operations performed by an example server in accordance with one or more aspects of the present disclosure.

FIG. 4 is a flow diagram illustrating operations performed by an example server in accordance with one or more aspects of the present disclosure. FIG. 4 is described below within the context of server 126 of FIG. 2. In other examples, operations described in FIG. 4 may be performed by one or more other components, modules, systems, or devices. Further, in other examples, operations described in connection with FIG. 4 may be merged, performed in a difference sequence, or omitted.

In the example of FIG. 4, and in accordance with one or more aspects of the present disclosure, policy controller 201 may define one or more policies (401). For example, user interface device 129 may detect input, and output to policy controller 201 an indication of input. Policy control engine 211 of policy controller 201 may determine that the input corresponds to information sufficient to define one or more policies. Policy control engine 211 may define and store one or more policies in policies data store 202.

Policy controller 201 may deploy one or more policies to one or more policy agents 205 executing on one or more servers 126 (402). For example, policy control engine 211 may cause data manager 218 of policy controller 201 to output information to policy agent 205. Policy agent 205 may receive the information from policy controller 201 and determine that the information corresponds to one or more policies to be deployed at policy agent 205 (403).

Policy agent 205 may configure processor 240 to monitor internal processor metrics (404). For example, policy agent 205 may interact with and/or configure monitoring circuit 252 to enable monitoring of processor metrics. In some examples, policy agent may configure monitoring circuit 252 to collect metrics pursuant to Resource Directory Technology.

Processor 240 may, in response to interactions and/or configurations by policy agent 205, monitor internal processor metrics relating to resources shared within the processor 240 of server 126 (405). Processor 240 may make such metrics available to other devices or processes, such as policy agent 205 (406). In some examples, processor 240 makes such metrics available by publishing such metrics in a designated area of memory or within a register of processor 240.

Policy agent 205 may read internal processor metrics from processor 240 (407). For example, policy agent 205 may read from a register (e.g., a model specific register) to access information about internal processor metrics relating to processor 240.

Policy agent 205 may analyze the metrics and act in accordance with policies in place for server 126 (408). For example, policy agent 205 may determine, based on the internal processor metrics, that one or more virtual machines deployed on server 126 is using a cache shared internal to processor 240 in a manner that may adversely affect the performance of other virtual machines 148 executing on server 126. In some examples, policy agent 205 may determine that one or more virtual machines deployed on server 126 is using memory bandwidth in a manner that may adversely affect the performance of other virtual machines 148. Policy agent 205 may, in response to such a determination, instruct processor 240 to restrict the offending virtual machine's use of the shared cache, such as by allocating a smaller portion of the cache to that virtual machine. Processor 240 may receive such instructions and restrict the offending virtual machine's use of the shared cache in accordance with instructions received from policy agent 205 (409).

In some examples, policy agent 205 may report information to policy controller 201 (410). For example, policy agent 205 may report internal processor metrics to data manager 218 of policy controller 201. Alternatively, or in addition, policy agent 205 may report to data manager 218 results of analysis performed by policy agent 205 based on internal processor metrics.

In response to receiving information reported by policy agent 205, policy controller 201 may generate one or more reports and/or notifications (411). For example, analytics engine 214 of policy controller 201 may generate one or more reports and cause user interface device 129 to present such reports as a user interface. Alternatively, or in addition, analytics engine 214 may generate one or more alerts that may be included or reported in dashboard 203 presented by policy controller 201 via user interface device 129.

Figure 5A:
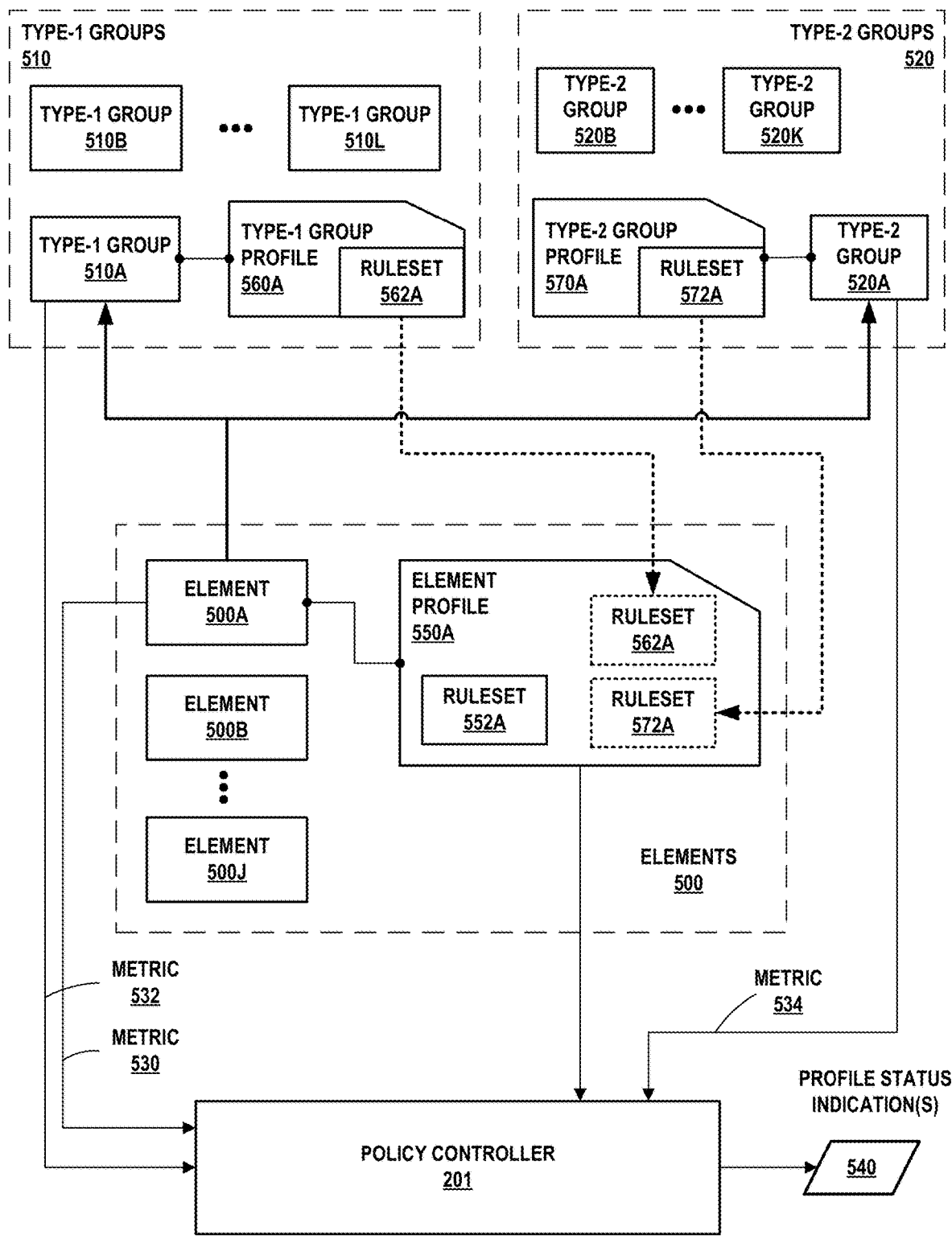
FIGS. 5A-5B are block diagrams illustrating an example profile hierarchy for multiple element and group profiles for multiple types of groups, according to techniques of this disclosure.
Figure 5B:
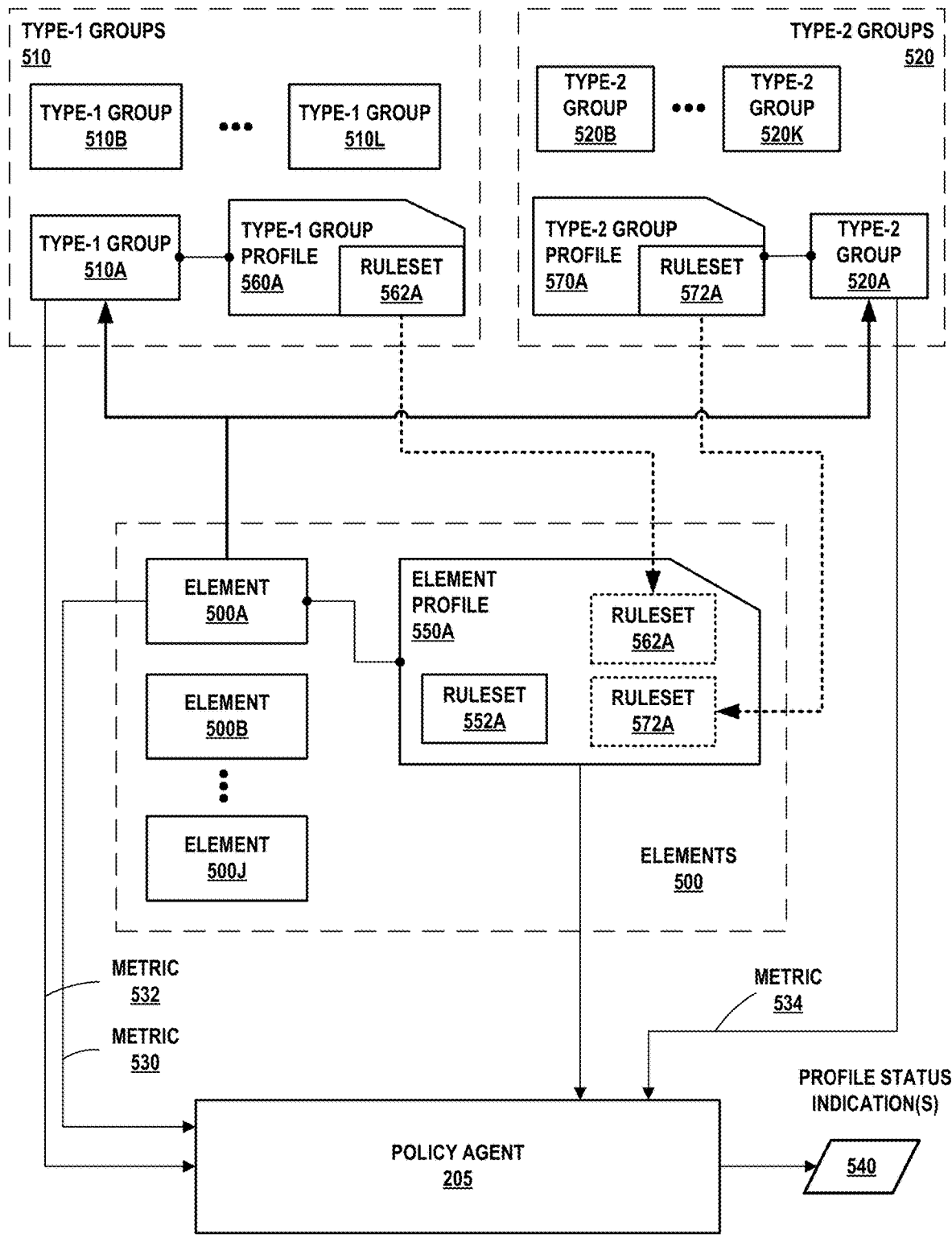

FIGS. 5A-5B are block diagrams illustrating an example profile hierarchy for multiple element and group profiles for multiple types of groups, according to techniques of this disclosure. Elements 500A-500J ("elements 500") consumes resources that are sources for alarm data. Example elements may include hosts, network devices, instances, and services. Each of elements 500 is associated with an element profile configured by a user or administrator for the element. The illustrated example depicts an element profile 550A for element 500A. An element profile 550 may represent an example instance of any of profiles 213 and is a collection of monitoring alarms that are evaluated to determine whether the performance of the corresponding element 500 meets criteria defined for the alarms.

Type-1 Groups 510A-510L ("Type-1 Groups 510") are each a data structure that associates one or more elements 500. Type-2 Groups 520A-520L ("Type-2 Groups 520") are each a data structure that associates one or more elements 500. A single element 500 may be a member of one or more Type-1 Groups 510 and one or more Type-2 Groups 520. Type-1 and Type-2 denote different types of groups that elements may be members of. Types of groups may include aggregates (e.g., host aggregate, instance aggregate, network device aggregate, network device interface aggregates), a virtual network, a virtualized network function (VNF) or collections of VNFs, a network service chain. Other type of groups may include an OpenStack or other project that is assigned a collection of instances, a Kubernetes Pod, a Kubernetes namespace, a Kubernetes replication controller, a Kubernetes service. Other types of groups may include a group of one or more services executing by an OpenStack instance, such services including for example RabbitMq, MySQL, Nova, and Neutron services. Type-1 and Type-2 may be any different, combination selected from the above examples, or other examples not specifically mentioned herein.

Examples of OpenStack style systems projects may include:
1. A specific application example Database Project assigned 10 virtual machines, with some users having access to the project. Eight of the virtual machines may have one functionality, e.g., maintain the data read/writes for the Database Project and two of the virtual machine may have another functionality, e.g., metadata or backup related tasks.
2. A VNF Pool to provide a virtualized networking service such as a Virtual Firewall service.
3. A combination of applications, e.g., a Database may be assigned 10 virtual machines, a MessageBus may be assigned 10 virtual machines owned by a team.
4. A hybrid model of instance use case in which a single virtual machine can be used by different applications, such as a collocated tier of ten virtual machines which have both the Database and MessageBus application running.

Different entities may configure the different Type-1 Groups 510 and Type-2 Groups 520. For example, a data center 110 administrator may configure Type-1 Groups 510 and a user(s) may configure Type-2 Groups 520.

One or more Type-1 Groups 510 may have corresponding Type-1 Group profiles 560. Type-1 Group profile 560A is a profile for Type-1 Group 510A. One or more Type-2 Groups 520 may have corresponding Type-2 Group profiles 570. Type-2 Group profile 570A is a profile for Type-2 Group 520A. Only one Type-1 Group profile 560 and one Type-2 Group 570 is illustrated for clarity.

Each profile 550, 560, 570 is a collection of alarms that are evaluated to determine whether the corresponding element or group meets user-defined criteria for the resource metrics monitored by the alarms. Alarms of a profile may be organized into groups called rulesets. A profile may have one or more rulesets. A ruleset contains a set of one or more alarms and respective assigned weights for the alarms. The ruleset also includes a threshold value. To determine if a ruleset of a profile is active, policy controller 201 or policy agent 205 computes a weighted sum over all of the active alarms in the ruleset. If the weighted sum is greater than or equal to the threshold, the ruleset is active. A profile is considered active if any of its constituent rulesets is active. FIG. 5A depicts an example in which the policy controller 201 evaluates profiles, while FIG. 5B depicts an example in one or more policy agents 205 evaluate profiles. In some cases, both policy controller 201 and policy agents 205 may evaluate profiles are different levels of the profile hierarchy.

In some examples, a profile is a data structure (such as a bag, set, or table) that has a scope, type, unique profile identifier, and or more rulesets. An example schema for a profile is as follows:

```
Profile:
    Scope: <string>
    Type: <string>
    UniqueId: <uuid>
    Rulesets: <list of ruleset objects>
```

Scope is defined above and denotes the type of element or group to which the profile applies, e.g., a host, host aggregate, or instance. Type denotes the purpose of the profile, such as for defining and monitoring the health of the corresponding element or group. UniqueId is a unique identifier for looking up and distinguishing profiles. Rulesets and a list of ruleset objects, which are described below.

As noted above, a ruleset contains a set of one or more alarms and respective assigned weights for the alarms. The ruleset also includes a threshold value. An example schema for a ruleset object is as follows:

```
Ruleset:
    RuleList: <list of alarms>
    WeightList: <list of weights>
    Threshold: <value between 0 and 1>
    RulesetId: <uuid>
```

RuleList is a list of alarms for the ruleset. WeightList is list of weights that corresponds to the list of alarms in a 1:1 relationship. Threshold is the threshold value used to determine whether the Ruleset is active, which in this example is between 0 and 1 inclusive, but in other examples may be any value. RulesetId is a unique identifier for looking up and distinguishing rulesets.

Policy controller 201 or policy agent 205 may evaluate a ruleset by determining whether each alarm in the ruleset RuleList is active. If an alarm is active, its corresponding weight is added to a sum of the weights for the active alarms in the RuleList. In other words, the weighted sum is a sum of all weights corresponding to active alarms in the RuleList. If the weighted sum is greater than or equal to the threshold, then the Ruleset is active. A profile is active if any of the rulesets of the profile is active.

For example, a Ruleset R1 may be defined as:

```
Ruleset_R1:
    RuleList: [A1, A2, A3, A4]
    WeightList: [0.1, 0.3, 0.4, 0.2]
    Threshold: 0.3
    RulesetObjectId: host1
```

The RuleList includes 4 alarms—A1, A2, A3 and A4 that are each defined on the element 'host1', as indicated by the RulesetObjectId. Each alarm is assigned a weight as defined in WeightList. The Ruleset has a Threshold of 0.3.

Case 1: At time t1, alarms A1 and A3 are active on element 'host1'. To determine whether ruleset R1 is active, policy controller 201 or policy agent 205 determines:

$R1\_score = \text{sum}(\text{weight of } A1, \text{weight of } A3) = \text{sum}(0.1, 0.4) = 0.5$ $R1\_active = (R1\_score >= \text{threshold}) = (0.5 >= 0.3) = \text{True}$ Thus ruleset R1 is considered active at time t1. All profiles containing ruleset R1 are also considered active at time t1.

Case 2: At time t2, alarm A4 is the only active alarm on element 'host1'. To determine whether ruleset R1 is active, policy controller 201 or policy agent 205 determines:

$R1\_score = \text{sum}(\text{weight of } A4) = 0.2$ $R1\_active = (R1\_score >= \text{threshold}) = (0.2 >= 0.3) = \text{False}$ Thus ruleset R1 is considered inactive at time t2. All profiles containing ruleset R1 may or may not be active at time t2, depending on the status of other rulesets of the profiles.

In a typical cloud environment, an element has 'member-of' relationships with one or more groups of elements (alternatively referred to as 'parent' elements). For example, an OpenStack host can be a member of several host aggregates. A Kubernetes container can be a member of a pod, a replication controller, a namespace, and several different services. An element that is a member of multiple groups has a profile that is a combination of the profiles of all groups in which it is a member, which policy controller 201 achieves using rulesets.

In response to a user configuring an element as a new member of a group, the policy controller 201 modifies the profile for the element to add all rulesets that are included in the profile for the group. The RulesetId fields in the added Rulesets contains unique identifiers for the group and maintain a distinction between the different rulesets in the element's profile. Thus, in response to a user configuring an element to no longer be a member of the group, policy controller 201 is able to identify the rulesets of the group from the element's profile and removes the identified rulesets.

In the illustrated example, for instance, element 500A may represent a virtual machine "V1" having an element profile 550A that includes ruleset 552A:

```
Profile_V1:
    Scope: instance
    Type: health
    ObjectId: V1
    Rulesets:
        { /* 552A */
        RuleList: [VA1, VA2, VA3]
        WeightList: [0.3, 0.3, 0.4]
        Threshold: 0.3
        RulesetObjectId: V1
        }
```

A user may cause user device UI device 129 to output configuration data to policy controller 201 to add virtual machine V1 as a member to a project "P1" and an aggregate "A1". Project P1 may be a group of Type-1 and Type-1 Group 510A may represent project P1. Aggregate A1 may be a group of Type-2 and Type-2 Group 520A may represent aggregate A1.

Project P1 as Type-1 Group 510A has the following Type-1 Group profile 560A, including ruleset 562A:

```
Profile_P1:
    Scope: project
    Type: health
    ObjectId: P1
    Rulesets:
        { /* 562A */
        RuleList: [PA1, PA2]
        WeightList: [0.5, 0.5]
        Threshold: 1.0
        RulesetObjectId: P1
        }
```

Aggregate A1 as Type-2 Group 520A has the following Type-2 Group profile 570A, including ruleset 572A:

```
Profile_A1:
    Scope: aggregate
    Type: health
    ObjectId: A1
    Rulesets:
        { /* 572A */
            RuleList: [AA1]
            WeightList: [1.0]
            Threshold: 1.0
            RulesetObjectId: A1
        }
```

Policy controller 201, in response to element 500A being added as a member of both Type-1 Group 510A and Type-2 Group 520A, modifies the element profile 550A to additionally include the rulesets 562A and 572A from profiles 560A and 570A, respectively. The modified profile 550A is, accordingly:

```
Profile_V1:
    Scope: instance
    Type: health
    ObjectId: V1
    Rulesets:
        { /* 552A */
            RuleList: [VA1, VA2, VA3]
            WeightList: [0.3, 0.3, 0.4]
            Threshold: 0.3
            RulesetObjectId: V1
        }
        { /* 562A */
            RuleList: [PA1, PA2],
            WeightList: [0.5, 0.5]
            Threshold: 1.0
            RulesetObjectId: P1
        }
        { /* 572A */
            RuleList: [AA1]
            WeightList: [1.0]
            Threshold: 1.0
            RulesetObjectId: A1
        }
```

Policy controller 201 may distribute profile 550A to policy agents 205. Policy controller 201 or policy agent 205 evaluates the alarms of the rulesets 552A, 562A, and 572A, and determine profile 550A to be active if any one of the rulesets 552A, 562A, and 572A is active. Additionally, policy controller 201 or policy agent 205 evaluates the alarms of the rulesets of Type-1 Group profile 560A and Type-2 Group profile 570A to determine whether profiles 560A, 570A are also active. For example, if ruleset 562A is active, then both profiles 550A and 560A are active. More specifically, if alarms PA1 and PA2 of ruleset 562A are active, Type-1 Group profile 560A is active as well as profile 550A for element 500A. The Type-2 Group profile 570A is not active at least due to ruleset 562A, for ruleset 562A is not included in Type-2 Group profile 570A.

Rulesets 562A, 572A added to an element profile may include alarms to be applied to usage metrics of one or more resources consumed by the element. For example, ruleset 562A may include alarms having conditions based on cpu.usage and memory.usage for an instance. In evaluating ruleset 562A for element 500A that is an instance of a virtual machine, policy controller 201 or policy agent 205 evaluates the alarms based on the cpu.usage and memory.usage for the virtual machine represented by element 500A. This applies to all elements that are members of Type-1 Group profile 560A.

Policy controller 201 may evaluate alarms of the rulesets 552A, 562A, 572A using usage metrics for the corresponding element or group. For example, alarms of element 500A may be configured for evaluation based on usage metrics 530, alarms of Type-1 Group 510A may be configured for evaluation based on usage metrics 532, and alarms of Type-2 Group 520A may be configured for evaluation based on usage metrics 534. Usage metrics 532 may include metrics for resources consumed by elements that are members of Type-1 Group 510A, and metrics 534 may include metrics for resources consumed by elements that are members of Type-2 Group 520A. In some cases, a group may have a single element 500.

The user may subsequently cause user device UI device 129 to output configuration data to policy controller 201 to remove virtual machine V1 as element 500A from aggregate A1 as Type-2 Group 520A. In response to the removal of element 500A from Type-2 Group 520A, policy controller 201 modifies element profile 550A to remove ruleset 572A of Type-2 Group profile 570A for Type-2 Group 520A. The modified element profile 550A is:

```
Profile_V1:
    Scope: instance
    Type: health
    ObjectId: V1
    Rulesets:
        { /* 552A */
            RuleList: [VA1, VA2, VA3]
            WeightList: [0.3, 0.3, 0.4]
            Threshold: 0.3
            RulesetObjectId: V1
        }
        { /* 562A */
            RuleList: [PA1, PA2],
            WeightList: [0.5, 0.5]
            Threshold: 1.0
            RulesetObjectId: P1
        }
```

Policy controller 201 outputs profile status indications 540 to UI device 129, which may display the profile status indications 540 to a user. Policy controller 201 may output profile status indications 540 over a network using a protocol. The profile status indication may indicate the active ruleset(s) and the one or more active alarms that caused the profile to become active.

As described above, the source of the metric collection and the source and alarming for any given rule of the ruleset may be distributed and may not affect the evaluation of the state of a ruleset. The thresholds and values on the metrics can be alarmed based on static or dynamically learnt global thresholds. Thus, user is provided with the flexibility to express various combinations of useful disaggregated rules that can make up the profile for an element or group. For instance, a VNF Pool made up of an instance aggregate or project can set rules based on separate elements to affect its service level. For example, policy controller 201 may receive notification that a profile has been activated and deploy new instances and apply the profile to the new instances. As a result, the profile becomes deactivated because of the additional elements providing additional resources for the alarms.

A profile for an instance aggregate may specify that if a specified percentage of instances in the instance aggregate are unhealthy then an action must be taken based on contextual state transition. Pruning on false alarms or correlations can be made by developing custom services on top of the rulesets providing transition information at the leaves of the profile structure. For example, a user may determine that a profile is activating based on a first ruleset of the profile. However, this first ruleset may be a poor correlation to performance. A policy conditioned on the profile being active may therefore be set to take action only if the profile status indication indicates the profile is active because a second ruleset of the profile is active.

A user may define plugins to policy agent 205 to provide custom metrics for host services that support a VNF Pool; hosts where instances physically run can provide additional information about the state and functionality of a VNF Pool. As a result, custom services may take fine-grained actions based on contextual alarms from the ruleset meant for custom aggregates such that global actions can be applied.

Figure 6:
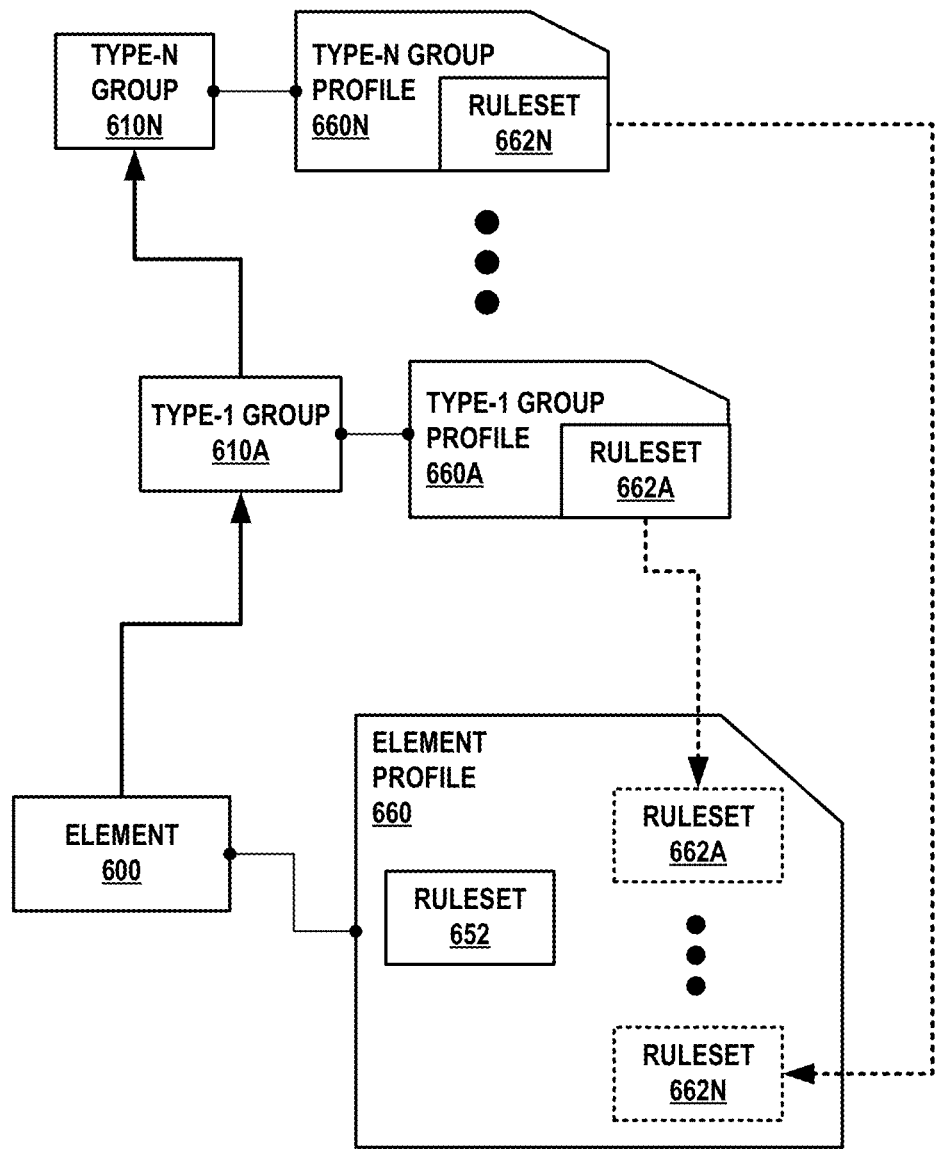
FIG. 6 is a block diagram illustrating an example profile hierarchy for multiple element and group profiles for multiple types of groups, according to techniques of this disclosure.

FIG. 6 is a block diagram illustrating an example profile hierarchy for multiple element and group profiles for multiple types of groups, according to techniques of this disclosure. Element 600 has element profile 660 that includes ruleset 652. Element 600 is a member of Type-1 Group 610A having Type-1 Group profile 660A that includes ruleset 662A. Type-1 Group 610A is a member of Type-N Group 610N having Type-N Group profile 660N that includes 662N. Although only 2 levels of a group hierarchy are illustrated, example hierarchies may include additional levels.

Because Type-1 Group 610A is a member of Type-N Group 610N, either directly or transitively by membership in another group that is a member of Type-N Group 610N, policy controller 201 modifies Type-1 Group profile 660A to include ruleset 662N. Because element 600 is a member of Type-1 Group 610A, policy controller 201 modifies element profile 660 to include the rulesets of Type-1 Group profile 660A, which include rulesets 662A and 662N. Element profile 660 consequently incudes rulesets 652, 662A and 662N. In some cases, policy controller 201 may modify "intermediate" profiles to include rulesets from higher-level groups. In the illustrated example, in such cases, policy controller 201 modifies Type-1 Group profile 660A to include ruleset 662N and any other intermediate rulesets from profiles for higher-level groups.

Policy controller 201 or policy agent 205 evaluates whether profile 660 is active based on alarms included in rulesets 652, 662A, and 662N. For example, any of the rulesets may be determined to be active based on usage metrics for element 600 or any other elements that are members of Type-1 Group 610A and Type-N Group 610N.

Policy controller 201 may offer Application Programming Interfaces (APIs) by which a device may access profiles to create, read, update, or delete the profiles. The APIs may be HTTP endpoints accessible at specified URIs to which a user may POST, GET, PATCH, or DELETE HTTP payloads in the form of JSON or XML objects, for instance.

As one example, a user may locally create element profile 660 and store the profile to a device, then POST the created element profile 660 to an HTTP endpoint served by policy controller 201 to remotely create the element profile 660. The following commands perform these operations to create an element profile 660 with multiple rulesets and store the element profile to policy controller 201:

```
$ cat create_profile.json
{
    "AnalyticsScope": "project",
    "AnalyticsType": "health",
    "ObjectId": "eeaa1bef3e09494e81a5883b908e8d05",
    "Rulesets": [
        {
            "RuleList": ["c1be0d70-1bad-11e7-ba0c-0242ac120006",
            "abeee74e-1bad-11e7-8a67-0242ac120006"],
            "WeightList": [0.5, 0.5],
            "Threshold": 1.0,
            "RulesetObjectId": "eeaa1bef3e09494e81a5883b908e8d05"
        },
        {
            "RuleList": ["35dfd4a4-1bae-11e7-8a67-0242ac120006"],
            "WeightList": [1.0],
            "Threshold": 1.0,
            "RulesetObjectId": "eeaa1bef3e09494e81a5883b908e8d05"
        }
    ]
}
$ curl -X POST -H "X-Auth-Token: <token>" -H "Content-type: application/json" -d @create_profile.json
http://localhost:9000/appformix/v1.0/analytics_profile
```

The following command performs an operation to obtain an existing profile having multiple rulesets from different parents:

```
$ curl -X GET -H "X-Auth-Token: <token>"
http://localhost:9000/appformix/v1.0/analytics_profile/d0149212-1bae-11e7-86b4-0242ac120006
    "AnalyticsProfile": {
    "AnalyticsScope": "instance",
    "AnalyticsId": "d0149212-1bae-11e7-86b4-0242ac120006",
    "AnalyticsType": "health",
    "ObjectId": "308f0251-f912-456b-b514-e067fc708e23",
    "Rulesets": [
        {
            "Threshold": 1,
            "WeightList": [1],
            "RuleList": ["EI_Heartbeat_Health"],
            "RulesetObjectId": "308f0251-f912-456b-b514-e067fc708e23"
        },
        {
            "Threshold": 1,
            "WeightList": [0.5, 0.5],
            "RuleList": [
                "c1be0d70-1bad-11e7-ba0c-0242ac120006",
                "abeee74e-1bad-11e7-8a67-0242ac120006"
            ],
            "RulesetObjectId": "eeaa1bef3e09494e81a5883b908e8d05"
        },
        {
            "Threshold": 1,
            "WeightList": [1],
            "RuleList": ["35dfd4a4-1bae-11e7-8a67-0242ac120006"],
            "RulesetObjectId": "eeaa1bef3e09494e81a5883b908e8d05"
        }
    ]
}
```

In general, APIs for profiles are able to accept a profile definition once. However, as users modify membership of the corresponding elements or groups in other groups, policy controller 201 dynamically modifies the profiles. For instance, a user may delete 2 instances and add 4 new instances to an aggregate or project. The profile, more specifically rulesets, for the aggregate or project are applied to the profiles for the 4 new instance and evaluated.

The source of the metric generation, the alarming condition identification, the capability to dynamically learn the baseline are taken care of prior to evaluating the ruleset and rulelist for profiles. This may provide an advantage over other systems that centrally aggregate metrics and process policy and membership using a central data store, which may require allocating a large amount of resources to get the required signals needed for generating the same service level signals needed for health and risk that are provided using the monitoring alarm and profile techniques described herein.

Figure 7A:
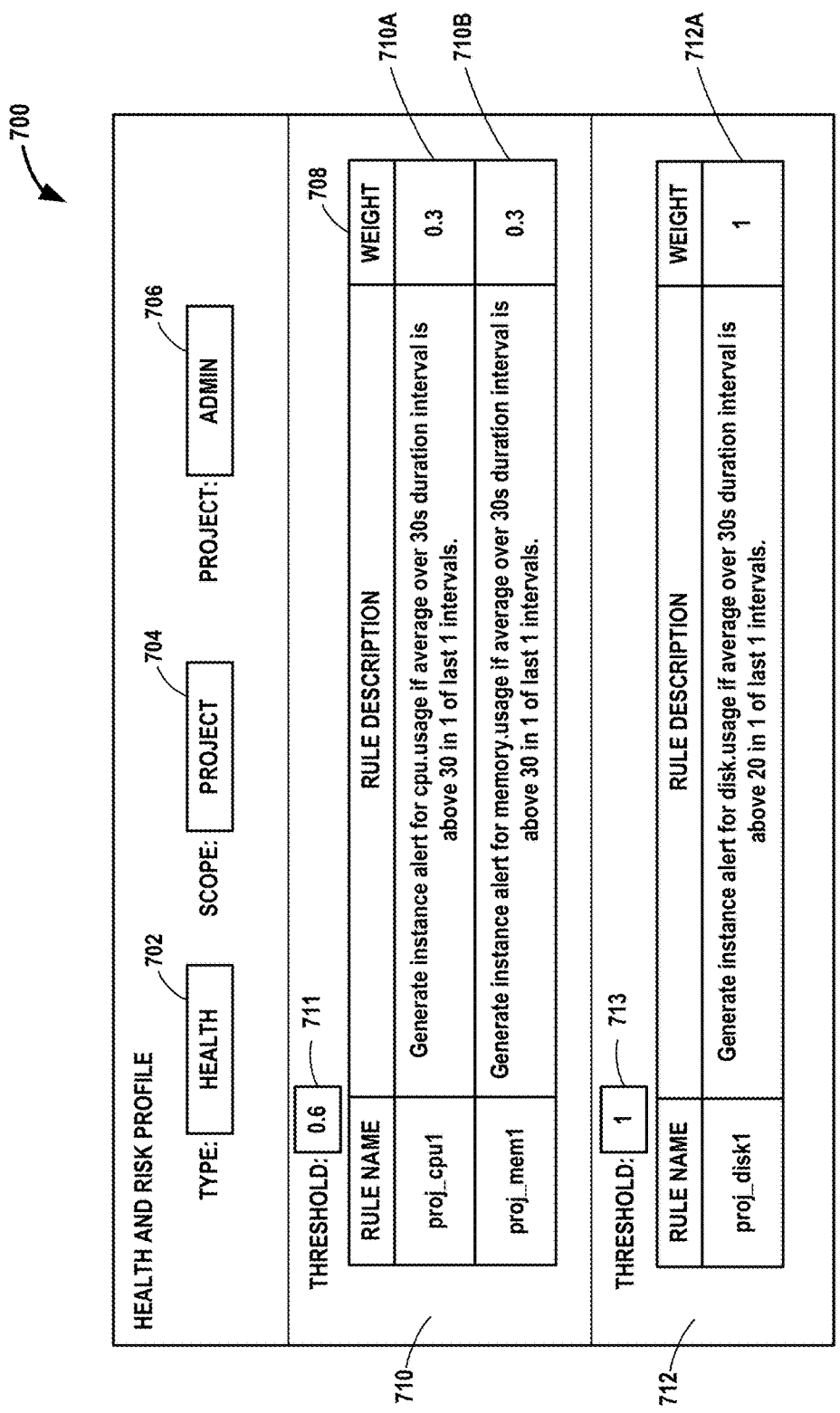
FIGS. 7A-7B depict example user interfaces output for display by a user interface device, according to techniques of this disclosure.

FIG. 7A is an example user interface output by a user interface device, for receiving and displaying a profile, according to techniques described in this disclosure. A user interface device 129 may output, to a display device, user interface 700 for display to a user. User interface 700 in this example displays a profile for a group having a project type. User interface elements 702, 704, and 706 indicate that profile is for monitoring a health of the project, has a project level scope, and is named "ADMIN", respectively.

The displayed profile has two rulesets 710 and 712 indicated in respective user interface areas of the user interface 700. Ruleset 710 has two rules 710A-710B each having a corresponding weight 708. Ruleset 710 has a threshold indicated by user interface element 711. Ruleset 712 has one rule 712A having a corresponding weight 708. Ruleset 712 has a threshold indicated by user interface element 713.

A user of user interface device 129 interacts with user interface 700 to modify the profile to add, remove, or modify rulesets of the profile.

Figure 7B:
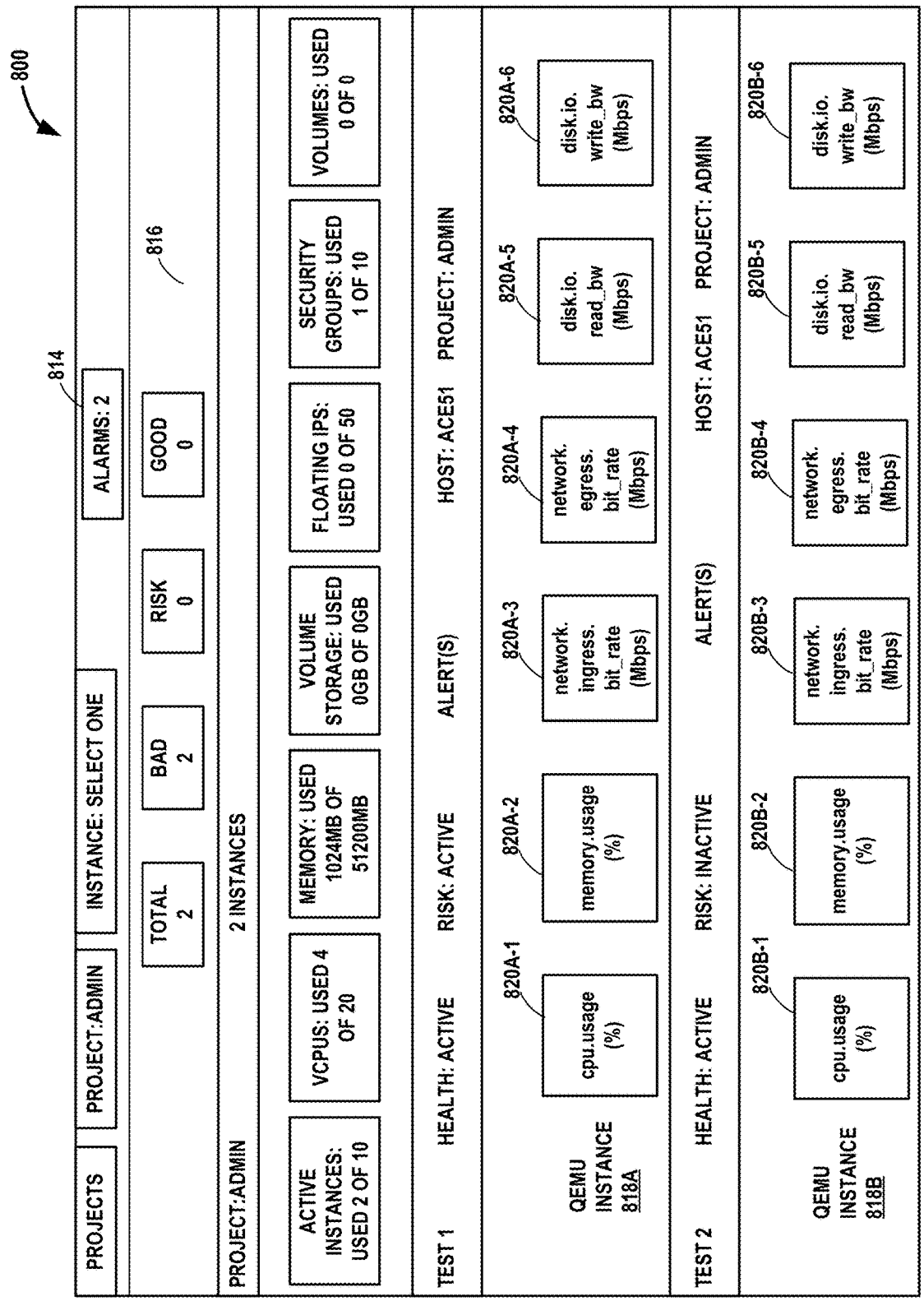

FIG. 7B is an example user interface output by a user interface device to display profile status indications, according to techniques of this disclosure. A user interface device 129 may output, to a display device, user interface 800 for display to a user. User interface 800 displays usage metrics for two instances 818A-818B. User interface elements 820A-1-820A-6 display usage metrics for instance 818A and user interface elements 820B-1-820B-6 display usage metrics for instance 818B.

User interface 800 indicates an overall health of project "ADMIN" and the health of the project's members, instances 818A-818B. Instances 818 may be considered elements and added by a user to a group for the project. The project has an associated profile that includes a ruleset with alarms for each of the resource metrics cpu.usage, memory.usage, network.ingress.bit_rate, disk.io.read_bw, and disk.io.write_bw. Because instances 818 are members of the project, the respective profiles "Test1" and "Test2" for instances 818A-818B each includes the ruleset of the project and displays the metrics via user interface elements 820, at least in some cases in real time. In addition, user interface 800 displays an indication of whether the profiles are active or inactive. In this example, a health profile and risk profile for "Test1" are indicated as active. A health profile for "Test2" is indicated as active and a risk profile for "Test2" in indicated as inactive. User elements 816 display a number of members (herein, instances) of the project that exist ("total"), are active ("bad"), are at risk ("risk"), and are inactive ("good"). Here, both instances 818 are active and thus there are 2 "bad" or unhealthy instances.

Figure 8:
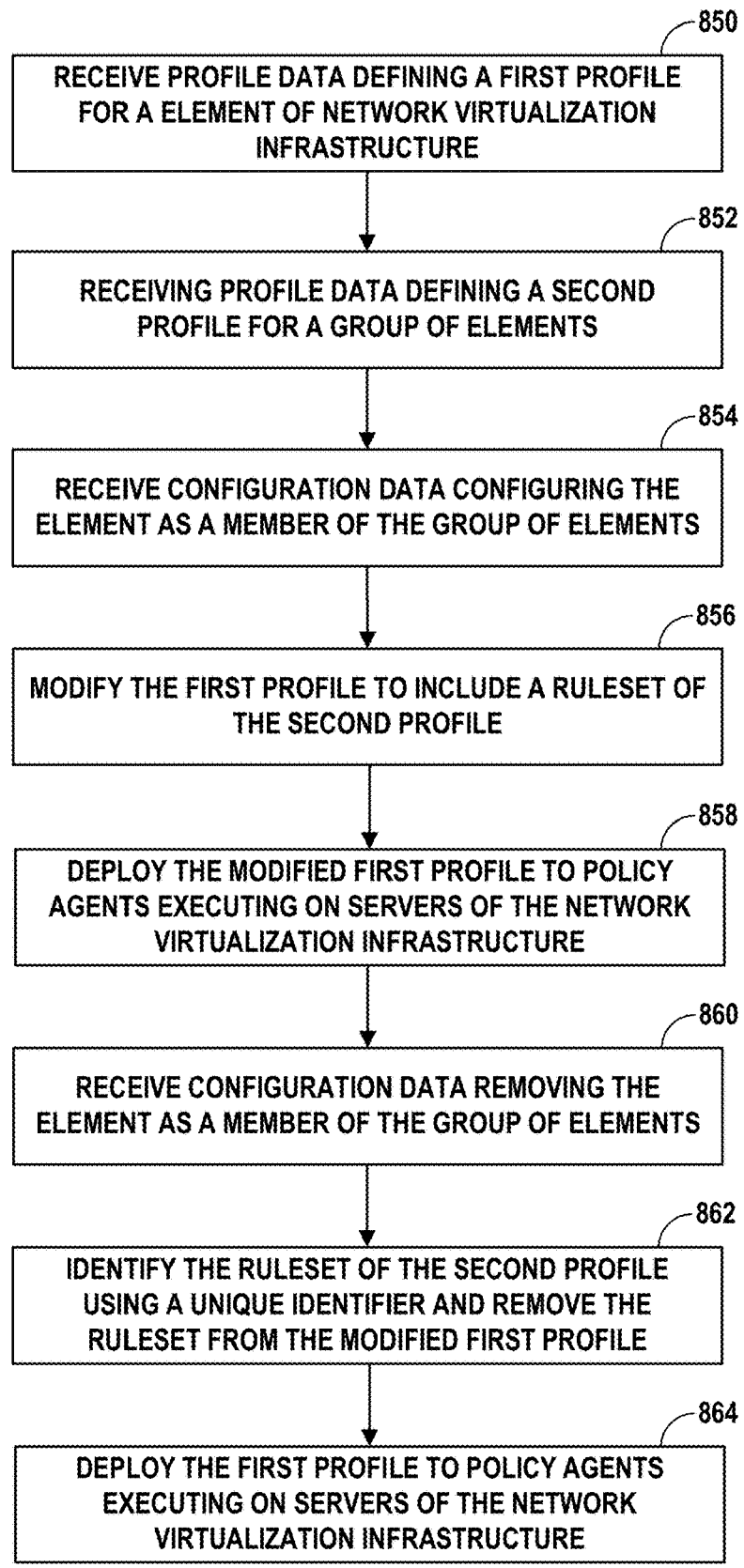
FIG. 8 is a flowchart illustrating an example mode of operation for a computing system, according to techniques of this disclosure.

FIG. 8 is a flowchart illustrating an example mode of operation for a computing system, according to techniques of this disclosure. Policy controller 201 receives or otherwise obtains profile data from a user interface device 129, the profile data defining a first profile for an element of virtualization infrastructure (850). The first profile includes a ruleset having one or more alarms. Policy controller 201 further receives or otherwise obtains profile data from a user interface device 129, the profile data defining a second profile for a group of elements (854). In response to receiving configuration data, from a user interface device 129, configuring the element as a member of the group (854), the policy controller 201 modifies the first profile to include the ruleset from the second profile and thereby generates a modified first profile (856). Policy controller 201 deploys the modified first profile to policy agents 205 of servers 126, which apply the modified first profile (856) to usage metrics associated with resources consumed by the element (858).

Policy controller 201 subsequently receives, from a user interface device 129, configuration data removing the element as a member of the group (860). The ruleset from the second profile includes a unique identifier among rulesets of profiles 213. The unique identifier is included in the ruleset added to the first profile in step 856. Using the unique identifier from the ruleset from the second profile and in response to the configuration data removing the element as a member of the group, policy controller 201 identifies the ruleset in the modified first profile and removes the ruleset to revert to the first profile (862). Policy controller 201 deploys the modified first profile to policy agents 205 of servers 126, which apply the first profile to usage metrics associated with resources consumed by the element (864).

Figure 9A:
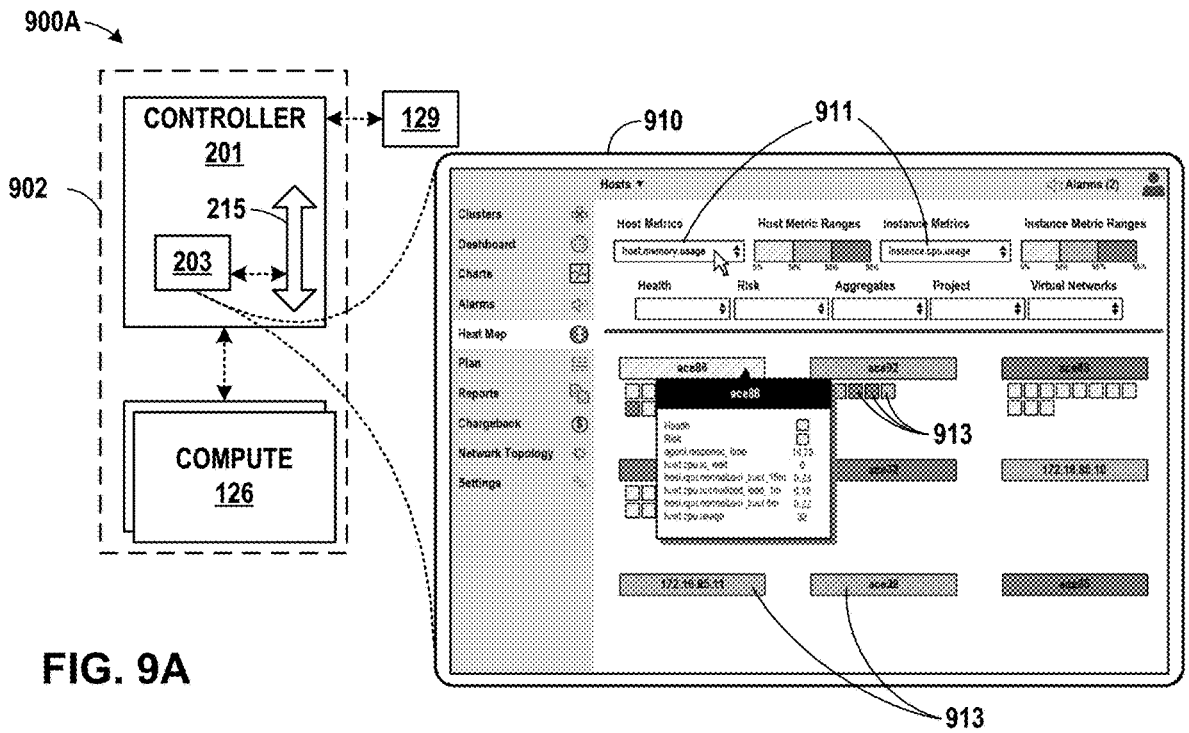
FIG. 9A is a block diagram of an example network in which single-cluster controller manages servers or compute nodes and provides a visualization through a dashboard.

FIG. 9A is a block diagram of an example network 900A in which single-cluster controller 201 manages servers or compute nodes 126 and provides a visualization, through dashboard 203, for cluster 902. In the example illustrated in FIG. 9A, controller 201 is shown as part of cluster 902. In other examples, however, controller 201 is not part of cluster 902, and in such an example, "cluster 902" refers to the nodes but not the controller. Cluster 902 of FIG. 9A may represent a cloud-based computing network and/or a computing domain or project, or other types of computing clusters. Where cluster 902 of FIG. 9A represents a cloud environment, such a cloud environment may be an OpenStack cloud environment or a Kubernetes cloud environment. Cluster 902 may be distributed across multiple environments, such as different data centers.

Controller 201 may operate in the manner described and illustrated in connection with FIG. 1 and/or FIG. 2. For instance, in some examples, controller 201 may interact with monitoring agents (not shown in FIG. 9A) that are deployed within one or more of servers 126 (i.e., hosts or compute nodes 126) for monitoring resource usage of the servers or physical compute nodes as well as any virtualized host or instance, such as VMs or containers, implemented on one or more compute nodes 126. As described herein, the monitoring agents within cluster 902 may publish information about such resource usage, such as in the form of utilization metrics, on message bus 215. The monitoring agents provide distributed mechanisms for collecting a wide variety of usage metrics as well as for local enforcement of policies installed by controller 201.

Dashboard 203 may be implemented in the manner described and illustrated in connection with FIG. 1, FIG. 2, and/or FIG. 3. As described in connection with FIG. 1, dashboard 203 may be created, updated, and/or maintained primarily by controller 201 or by a dashboard module executing on policy controller 201. As illustrated in FIG. 9A, controller 201 may generate dashboard 203, which may represent a collection of user interfaces (e.g., including user interface 910) that provide information about topology, structure, hierarchy, utilization, and/or metrics associated with infrastructure elements. In the example of FIG. 9A, infrastructure element representations 913 in user interface 910 correspond to infrastructure elements (e.g., hosts, instances, projects, virtual or physical network devices) within network 900A, and may be arranged within user interface 910 to illustrate network topology, hierarchy, parent/child relationships, or other relationships or configurations. In addition, one or more of infrastructure element representations 913 may include an indicator (e.g., a color or other visual indicator) that provides information about utilization, metrics, health, condition, and/or other status information relating to infrastructure of network 900A represented by infrastructure element representations 913 within user interface 910. For instance, in some examples, an indicator that is red might represent a high utilization, an indicator that is green might represent a low utilization, and an indicator that falls into neither category might be represented in another way or with a different color (e.g., yellow, orange, or no color).

In some examples, controller 201 may, in response to input from a user (e.g., interactions with metric selection user interface components 911 within user interface 910), generate or update user interfaces within dashboard 203 so that infrastructure elements are filtered by health, risk, aggregate, project, network (virtual or physical), type, and/or in other ways. In such examples, a filter may cause some infrastructure elements to be hidden within dashboard 203 or a user interface of dashboard 203, while presenting other infrastructure elements within dashboard 203. Filters may be applied using functional paradigms. For example, each filter may correspond to a function, so that for a given set of "x" resources, elements, or other items to be filtered, and filter functions "f" and "g," application of the filter may compute f(g(x)). Where filters follow functional paradigms, applying filters in a different order (e.g., g(f(x))) will have the same result. In some examples, some or all of filter functions are pure, so that no state information outside of the function's context is changed. Every time a filter value (or other user interface component 911) is changed, controller 201 may apply an appropriate filter to all the resources in a resource hash table, and then reassign the resource array to the resultant array. Filters may be applied and/or reapplied when an interaction with user interface components 911 is detected, when one or more infrastructure element representations 913 are selected or changed, when metric data is received by controller 201, and/or in other situations.

In some examples, data from the monitoring agents may be communicated over message bus 215 to controller 201 in near and/or seemingly near real-time using a push-based model. Controller 201 may, in maintaining dashboard 203, subscribe to a subset of the information available on message bus 215; and the monitoring agents, or a separate module collecting metrics from the monitoring agents, may push a delta (diff) specifying only changes that have occurred in a last interval of time. For example, the delta may specify a net change in config state for network 900A and/or cluster 902, such as an increase or decrease in the count for a given element, e.g., an increase or decrease in the number of hosts. As another example, the delta may specify changes to operational state, such as the number of infrastructure elements for the cluster transitioning from one state to another, such as the number that transitioned from a healthy state to an at-risk state or vice versa. This may reduce or minimize overhead required to maintain dashboard 203 and allow the dashboard to scale as the size of the network increases.

Figure 9B:
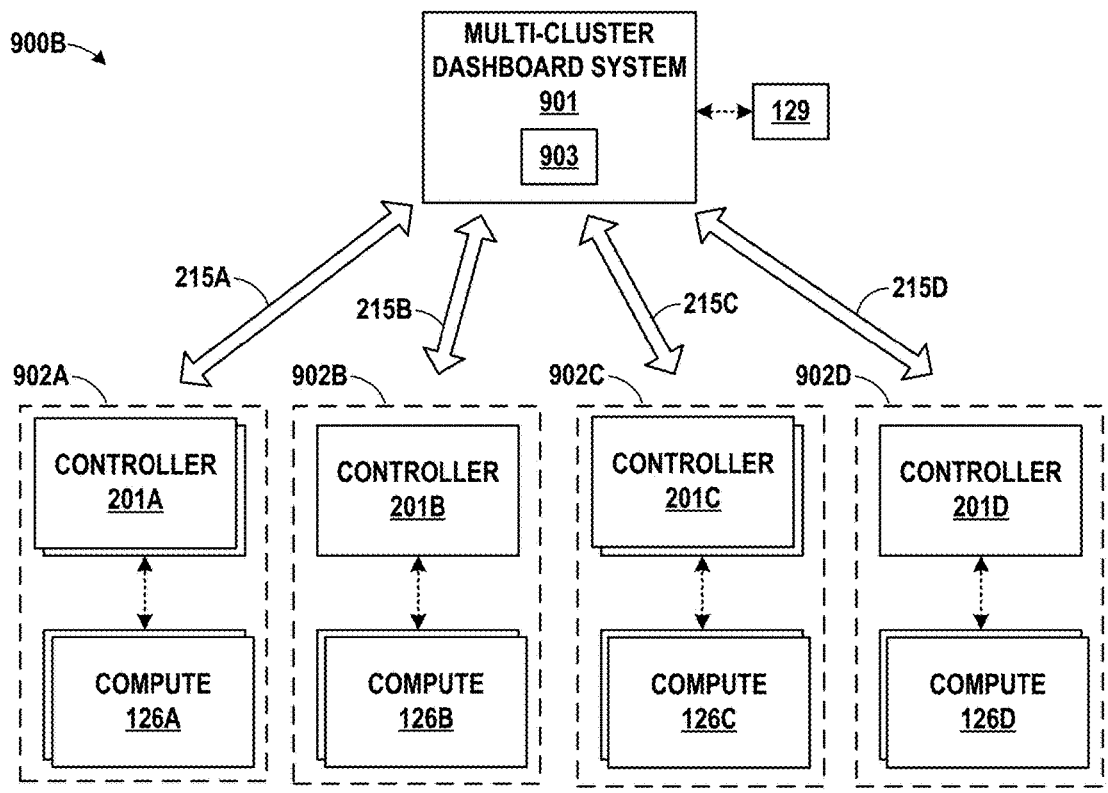
FIG. 9B is a block diagram of an example network in which a multi-cluster dashboard provides a visualization for a plurality of policy controllers that manage respective compute clusters.

FIG. 9B is a block diagram of an example network 900B in which multi-cluster dashboard system 901 provides a visualization, through dashboard 903, for controller 201A through controller 201N ("controllers 201") that manage respective cloud-based network compute cluster 902A through cluster 902N ("clusters 902"). Clusters 902 may be separate cloud-based computing networks, computing domains or projects, and may be co-located in a common overall computing environment or located in different environments, such as different data centers. Clusters 902 may, for example, be different cloud environments, such as various combinations of OpenStack cloud environments, Kubernetes cloud environments or other computing clusters, domains, networks and the like.

Each of policy controllers 201 may, for example, operate according to the example policy controllers described herein, such as policy controller 201 of FIG. 1 and FIG. 2. For example, each of policy controllers 201 may be a component of a separate software installation of a monitoring system, such as the example system shown in FIG. 2, and each of controllers 201 may be a separate instance of any of the policy controllers described herein so as to provide monitoring, scheduling, and performance management for respective clusters 902. Each of controllers 201 interacts with a set of monitoring agents (not shown in FIG. 9B) that are deployed within at least some of the physical servers and/or other devices of the respective clusters 902 for monitoring resource usage of the physical compute nodes as well as any virtualized host or instance, such as VMs or containers, implemented on the physical host. As described herein, the monitoring agents within each of compute clusters 902 provide distributed mechanisms for collecting a wide variety of usage metrics as well as for local enforcement of policies installed by respective controllers 201 of each of clusters 902. In the example of FIG. 9B, controller 201A and controller 201C are high-availability (HA) controllers having multiple redundant controllers for the respective cluster. Controller 201B and controller 201N are single controllers.

As further described below, multi-cluster dashboard system 901 may generate, create, and/or configure dashboard 903 to provide a unified view, referred to as a "single pane of glass," in which a single user interface screen presents a near and/or seemingly near real-time visual representation of metrics, alarms, notifications, reports, and other information related to the health of the infrastructure elements for the multiple clusters 902.

Dashboard 903 may operate or be implemented in a manner similar to other dashboards described herein, such as dashboard 203, and therefore dashboard 903 may represent a collection of user interfaces presenting information about network 900B and/or one or more clusters 902. Dashboard 903 may differ from dashboard 203 in that dashboard 903 can be designed or configured for a multi-cluster deployment. Dashboard 903 may include one or more user interfaces that are presented by a user interface device (not shown in FIG. 9B). As shown in FIG. 9B, multi-cluster dashboard system 901 is a software component or set of software components that communicates with each of controllers 201 deployed within clusters 902, such as by way of a message bus which, in one example, is a web socket messaging infrastructure.

Like the other dashboards shown herein, dashboard 903 may include a graphical view that provides a quick, visual overview of resource utilization by instance using various charts, widgets, histograms or other U/I objects. In one example, multi-cluster dashboard system 901 is configured in association with a designated master controller and performs monitoring and alerting across all of the underlying clusters 902. In such example, dashboard system 901 may operate or execute as a module (e.g., similar to dashboard module 233) on one or more controllers 201. Further, any of controllers 201 may be designated a master cluster, e.g., by an administrator, and any of the controllers may serve as a member cluster for outputting metric information to dashboard 903 for display, thereby potentially making multi-cluster dashboard system 901 unnecessary. Alternatively, multi-cluster dashboard system 901 need not be associated with a particular master cluster and may be a software component or set of components instantiated, and executing within, process space independent of any specific controller installation for the set of monitored cloud-based compute clusters (e.g., cloud domains).

In some multi-cluster examples, each other member clusters 902 is configured with messaging infrastructure information such that each of the controllers can push performance and metric usage data directly to a computing device or module managing dashboard 903, which in turn renders a user interface for presenting the information. As one example, controller 201A, as the designated master controller, instantiates a module managing multi-cluster dashboard 903, and uses configuration information from the master controller to open a websocket handle to each of the member clusters cluster 902B to cluster 902N, thereby forming a message bus for conveying performance and usage data from each of the controllers to the module managing multi-cluster dashboard 903.

In one example, multi-cluster dashboard 903 (i.e., user interfaces therein) displays information for all of the member clusters in a single pane of glass including overall performance, health and status information for each respective cluster. In example implementations, health, risk, and counts of the resources (e.g., hosts, projects, instances) are shown for each cluster in this single visualization. This way, at a first glance, a user can view and determine the state of all of clusters 902 and can determine which of the cluster to dive deeper into its current health and risk assessment for more detailed information. Any clusters that need attention (e.g., those having resources that are in bad health or at risk) can be filtered to the top of the view.

In one example implementation, all data can be provided from controllers 201 to multi-cluster dashboard system 901 in near and/or seemingly near real-time using a push-based model. Multi-cluster dashboard system 901 joins the respective message bus 215A through message bus 215N ("message busses 215") for each of clusters 902, and each of controllers 201 of clusters 902 may push a delta (diff) specifying only changes that have occurred in a last interval of time. For example, the delta may specify a net change in config state, such as an increase or decrease in the count for a given element, e.g., an increase or decrease in the number of hosts. As another example, the delta may specify changes to operational state, such as the number of infrastructure elements for the cluster transitioning from one state to another, such as the number that transitioned from a healthy state to an at-risk state or vice versa. This may reduce or minimize overhead on dashboard system 901 and/or overhead required to maintain dashboard 903, thereby enabling the dashboard to scale as the number of clusters increases.

For example, assume a cluster C1 has N resources of which k are in a healthy state and m are in an unhealthy status at interval t1. At interval t2, cluster C1 can be in a different state, such as N' resources, k' are healthy and m' are unhealthy. In this example, dashboard 903 will receive only a difference conveyance indicating N'-N resources were added or deleted, k-k' are good, and m-m' are unhealthy. As such, the amount of data needed to be communicated through the message busses to multi-cluster dashboard 903 can be drastically reduced since similar information is not repeated each time interval. Since the number of resources can be immense in this multi-cluster view, this approach may provide significant performance benefits.

In one example implementation, data usage burden on multi-cluster dashboard system 901 and dashboard 903 is additionally reduced or minimized by configuring multi-cluster dashboard system 901 and/or dashboard 903 to maintain and output for display only integer counts of total elements within each group of monitored elements along with an indicator (e.g., color or graphical widget) for elements groups that have bad health and elements that are at risk. As such, a data object, the multi-cluster dashboard need not consume memory and computing resources, resulting in a reduced time and resource expenditure for multi-cluster dashboard system 901 and dashboard 903.

Although message busses 215 are illustrated external to each of clusters 902 in FIG. 9B, in other examples, each of message busses 215 may be implemented internal to controllers 201 (e.g., as shown in FIG. 9A). In such an example, multi-cluster dashboard system 901 may be provided access to each of message busses 215, such as through an appropriate API.

Figure 10:
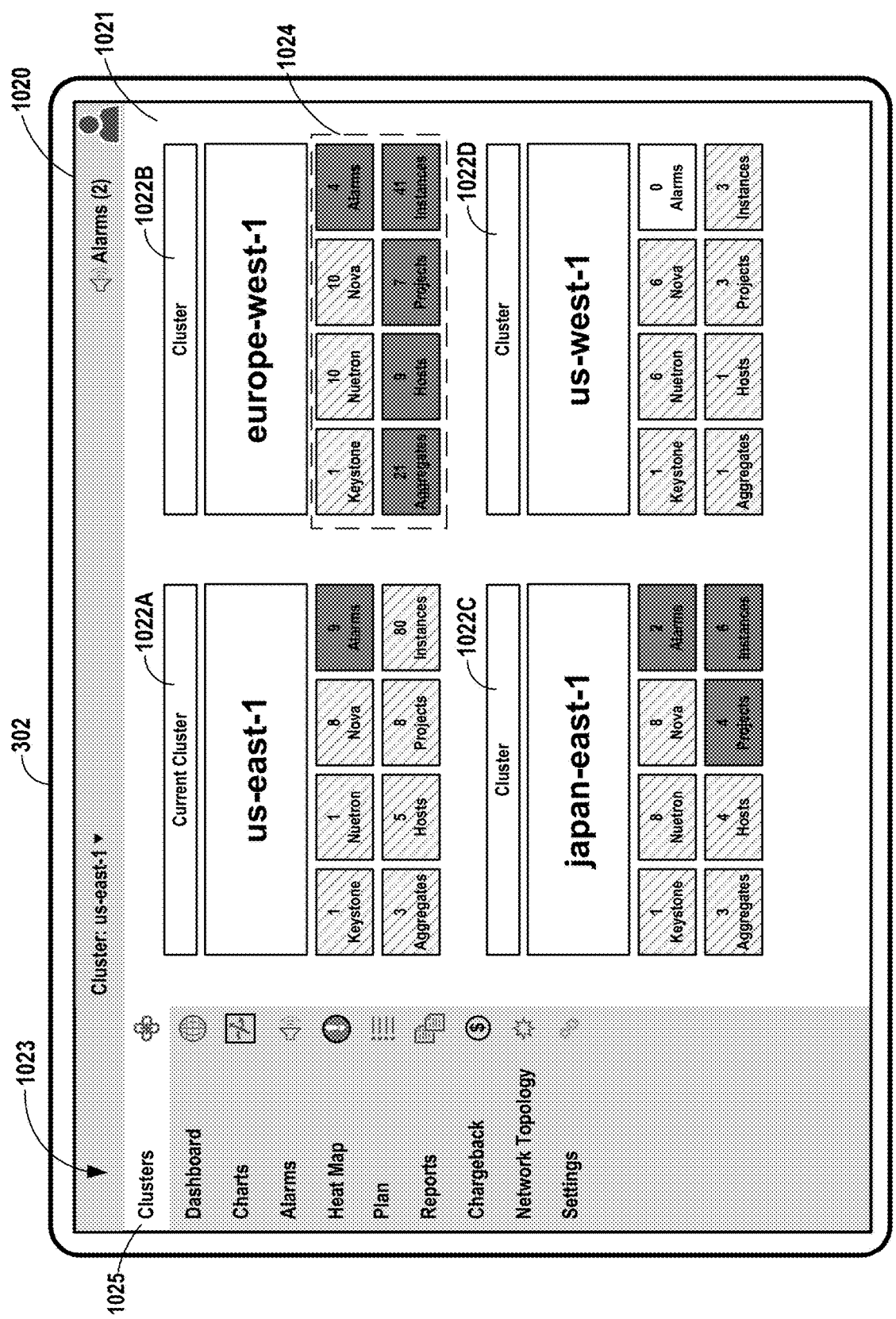
FIG. 10 illustrates an example user interface presented on a computing device for a multi-cluster dashboard in accordance with one or more aspects of the present disclosure.

FIG. 10 illustrates an example user interface 1020 presented on a computing device for multi-cluster dashboard system 901 in accordance with one or more aspects of the present disclosure. In general, user interface 1020 may be rendered on a user interface device based on output provided by multi-cluster dashboard system 901. Dashboard 1004 may view viewed as a software object instantiated in memory having associated data and/or executable software instructions that provide output data for rendering on a display. Although user interface 1020 is shown as graphical user interfaces, other types of interfaces may be presented by user interface device, including a text-based user interface, a console or command-based user interface, a voice prompt user interface, or any other appropriate user interface.

In the example shown in FIG. 10, and in accordance with one or more aspects of the present disclosure, user interface 1020 includes a main display region 1021 that includes four graphical cluster regions 1022A-1022D, each of which corresponds to a different compute cluster 1008. As shown, each cluster region 1022 of the user interface display a number of graphical tiles, each of tiles 1024 presenting a count of the number of elements within each element group being monitored for the corresponding compute cluster 1008. In this example, multi-cluster dashboard system 901 is associated with a plurality of clusters of different OpenStack installations, and each cluster region 1022 of user interface 120 includes eight graphical tiles showing counts for user-specified OpenStack elements for the cluster. In this OpenStack example, the monitored OpenStack elements include Keystone services for identity management within an OpenStack cloud, Neutron services for network management, Nova services for virtual machine management, Alarms, Aggregates, Hosts, Projects and Instances for the corresponding compute clusters. For each defined group of elements, the corresponding graphical tile lists an integer count of the number of elements of that type being monitored within the color. An indicator such as a color of the tile, e.g., green or red, provides an indication as to whether the corresponding SLA defined for the group of elements is being met. In this example, four types of OpenSource elements represented within cluster 1022B are healthy while five types of OpenSource elements (Alarms, Aggregates, Hosts, Projects and Interfaces) are observed and reported as unhealthy based upon their SLA requirements in view of the collected performance data.

In one example, user interface 1020 includes sidebar 1023 that allows the user to select between a number of different modes and corresponding user interfaces. In this example, sidebar 1023 shows that the user has selected "Cluster" mode 1025, causing multi-cluster dashboard system 901 to render the multi-cluster view on display region 1021.

Figure 11:
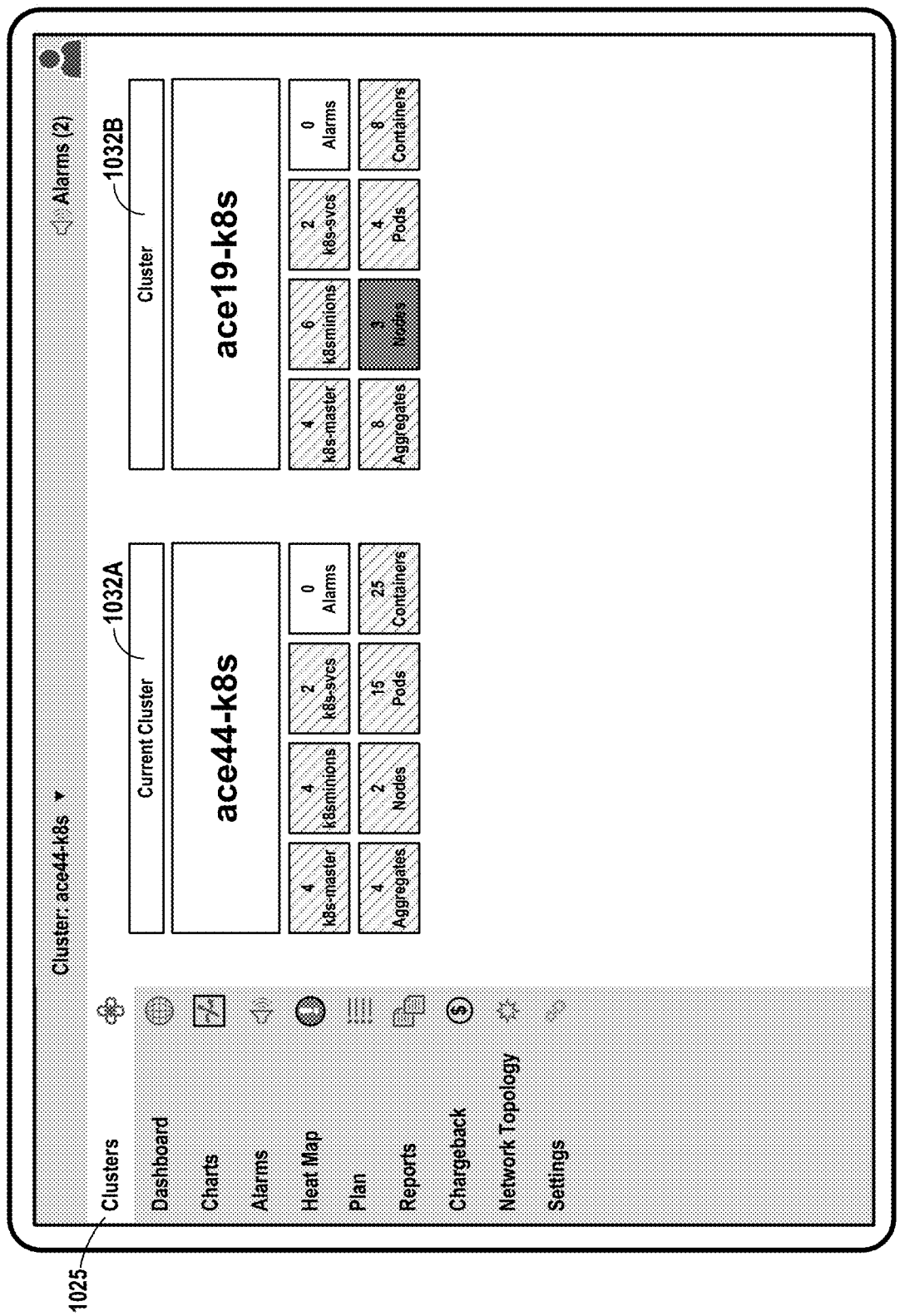
FIG. 11 illustrates an example user interface output by a computing device for a multi-cluster dashboard in accordance with one or more aspects of the present disclosure.

FIG. 11 illustrates an example user interface 1030 output by a computing device for multi-cluster dashboard system 901 in accordance with one or more aspects of the present disclosure. In the example shown in FIG. 11, user interface 1030 two four graphical cluster regions 1032A-1032B, each of which corresponds to a different compute cluster 1008. In this example, each of the clusters corresponds to different installations of the monitoring, policy distribution and control framework described herein for two different Kubernetes cloud installations. As such, the example user interface 1030 of multi-cluster dashboard system 901 illustrates a set of Kubernetes element types that are monitored by the respective controllers for the clusters.

Figure 12:
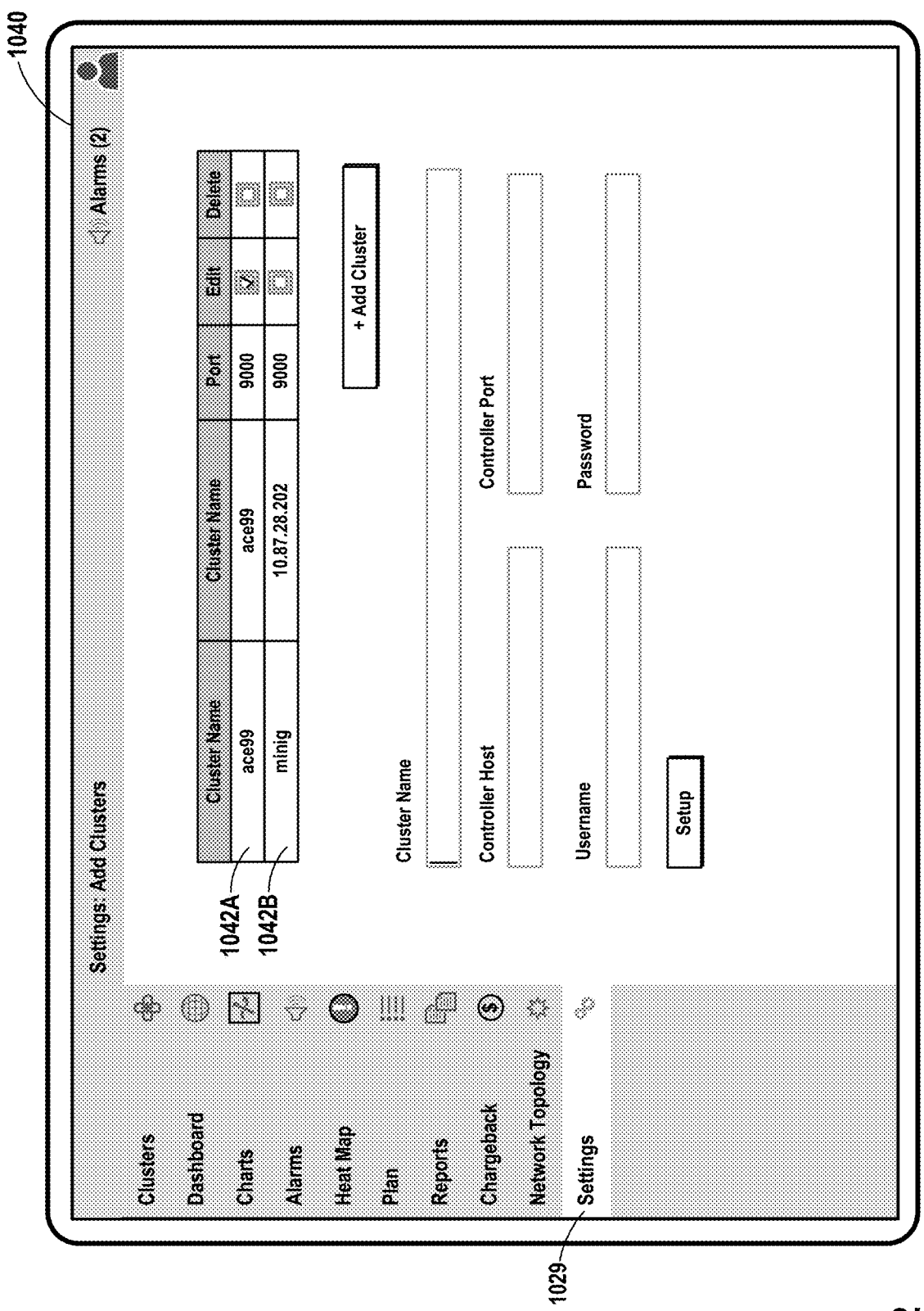
FIG. 12 illustrates an example user interface output by the multi-cluster dashboard for receiving and processing input from an administrator to configure the clusters to be displayed on the multi-cluster dashboard.

FIG. 12 illustrates an example user interface 1040 output by multi-cluster dashboard system 901 for receiving and processing input from an administrator to configure the clusters to be displayed on the multi-cluster dashboard. Adding clusters to the master cluster can be done by adjusting settings on the multi-cluster dashboard. In one example, the administrator interacts with user interface 1040 to provide a controller host IP and port for the controller 1006 (FIG. 9) to be added to the dashboard, along with a username and password or other security credentials for the administrator. In the example of FIG. 12, the administrator has configured the multi-cluster dashboard to include two member clusters 1042A and 1042B. In this example, cluster 1042A is named "ace99" and associated with a controller "ace99" and cluster 1042B is named "minig" and associated with a controller located at a host having network address 10.87.28.202.

Figure 13:
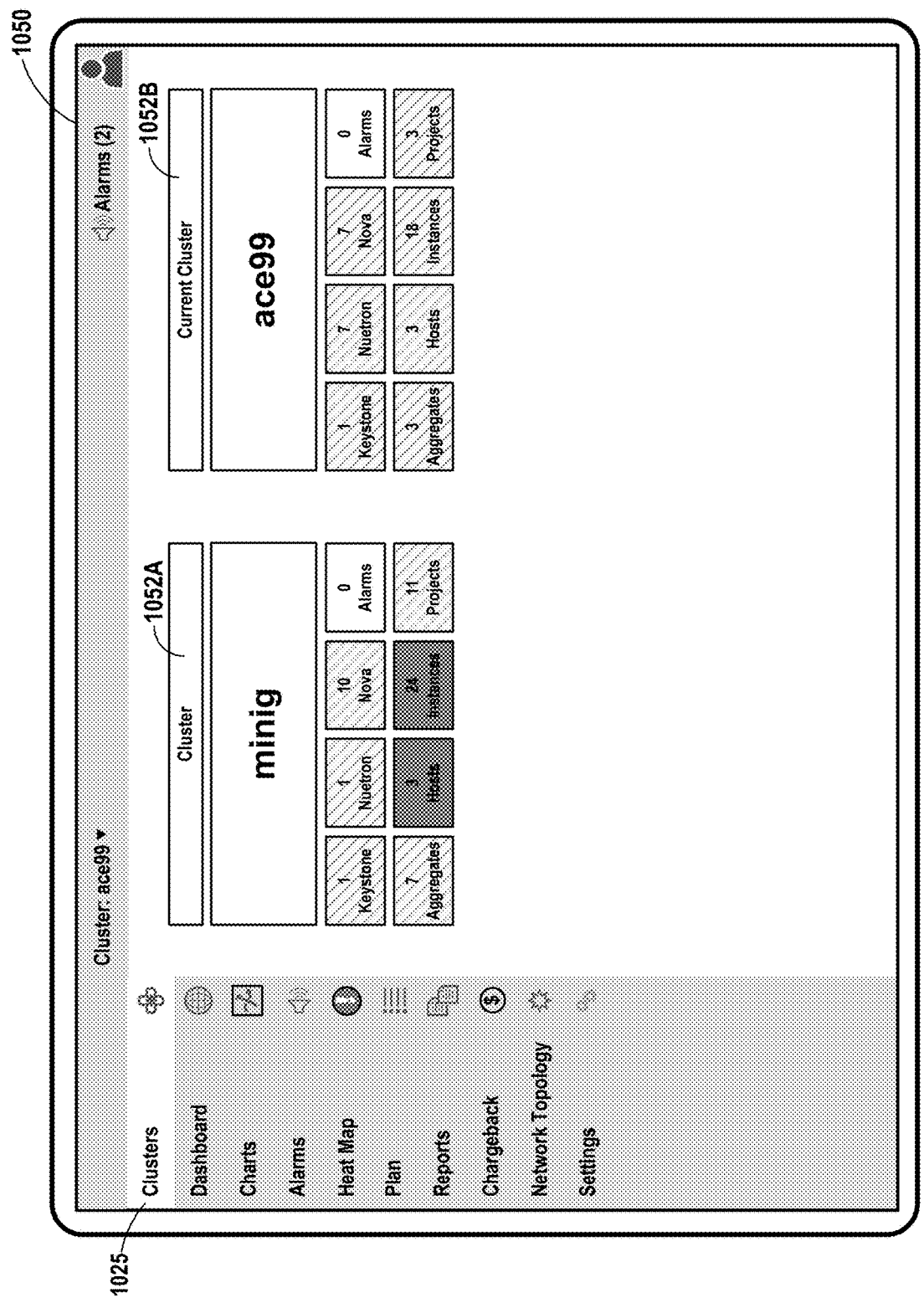
FIG. 13 illustrates an example user interface presented by the multi-cluster dashboard software system in response to the example configuration shown in FIG. 12.

As shown in FIG. 13, once a cluster 1006 is added through the settings page, multi-cluster dashboard system 901 processes the input to construct and output a corresponding graphical cluster region 1052 for the added cluster. FIG. 13 illustrates an example user interface 1042 presented by multi-cluster dashboard system 901 in response to the example configuration shown in FIG. 12.

In one example implementation, multi-cluster dashboard system 901 enables a user to easily navigate from the multi-cluster view to any individual cluster without needing additional login authentication. Moreover, the user may further drill into the elements being monitored within a single cluster to visualize metric, alarms and reporting for any element (instance object) defined within a cluster, such as a particular element being monitored, thereby viewing the real-time charting and data for that instance. For any element, the user is able to view resource utilization, metrics, health status, SLA profiles and the like. Similarly, the user can move back up the dashboard hierarchy and drill down into element utilization for a different cluster, where the multi-cluster view provides a top-level visualization for the different cloud installations. This may advantageously provide a seamless user experience since the user can switch between different clusters without having to refresh or login again.

For example, based on user interface 104 presented by multi-cluster dashboard system 901, the administrator may determine that one of the clusters ("minig") has some resources at risk or otherwise in bad health. As such, the administrator may provide input to select the "minig" cluster, e.g., by clicking on graphical cluster region 1052A to effective drill down to the minig cluster.

Figure 14:
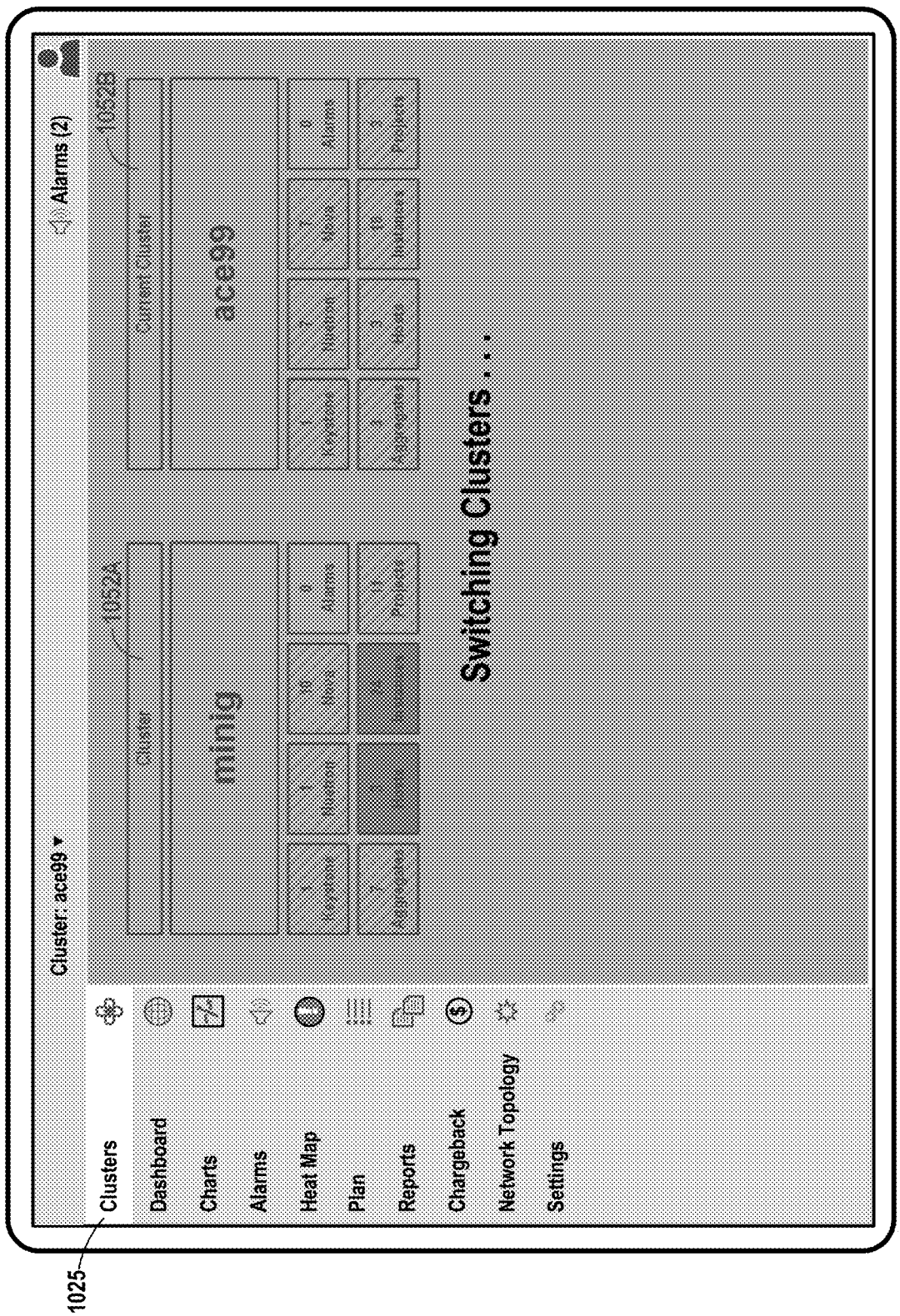
FIG. 14 is an example user interface output by the multi-cluster dashboard software system to inform the administrator that it is switching the view from multi-cluster view to a single cluster.

In response, as shown in FIG. 14, multi-cluster dashboard system 901 updates the user interface to inform the administrator that it is switching the view from multi-cluster view to the desired cluster, the "minig" cluster in this example. At this time, multi-cluster dashboard system 901 operates in a single cluster view and updates its data based on the elements being monitored by the policy controller within the target cluster. In other words, the internal data structures for multi-cluster dashboard system 901 are created and refreshed with the full resource counts and SLA information maintained by the respective policy controller for the target cluster, and a new user interface is rendered and output for display to the user. These changes may appear in real-time without any manual refresh or authentication needed by the user. At this time multi-cluster dashboard system 901 operates in a single cluster view and is configured to start listening to the message bus of the new cluster so that new performance data can be received and reflected in the dashboard.

Figure 15:
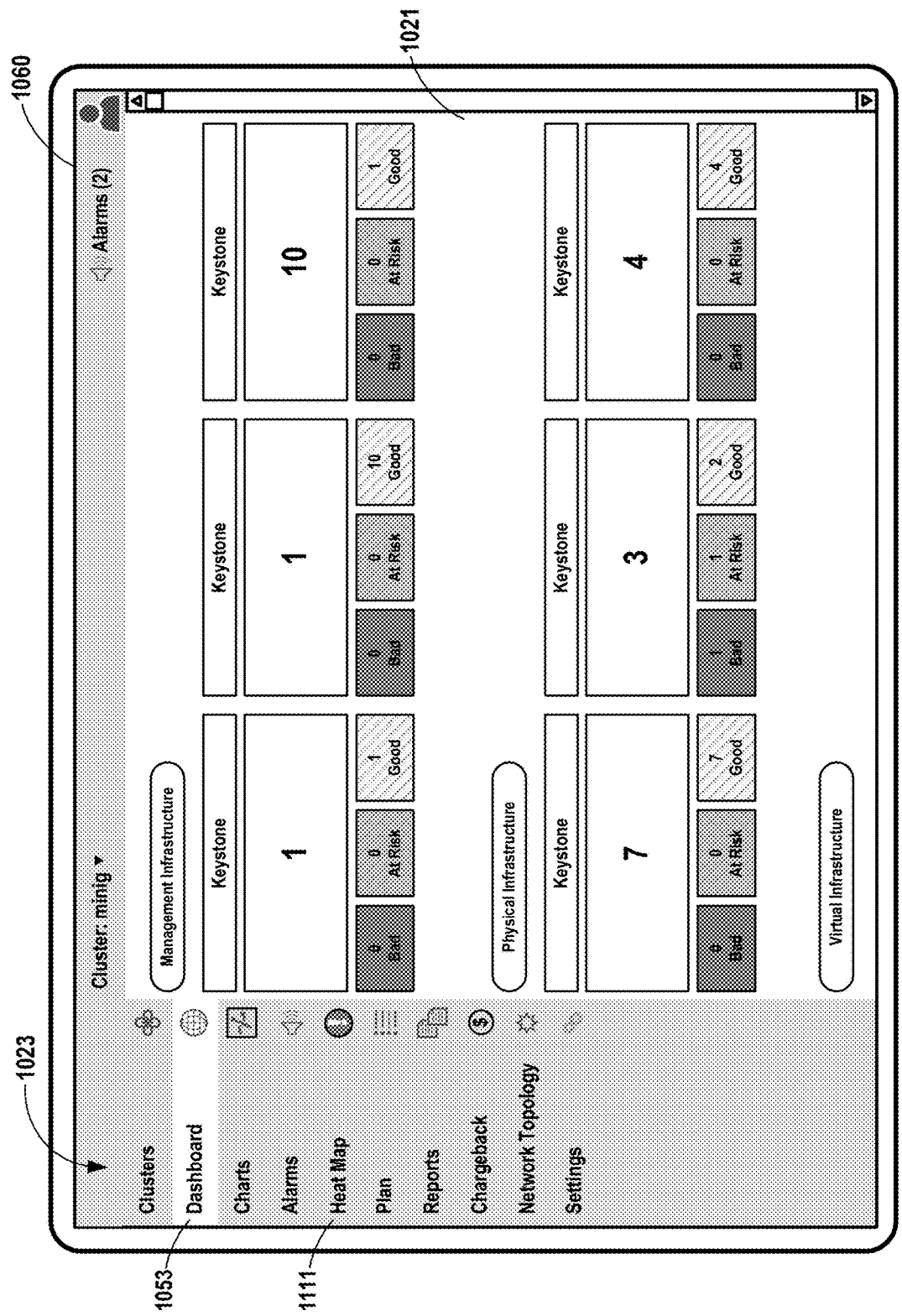
FIG. 15 illustrates an example user interface output by multi-cluster dashboard software system when operating in single cluster view.

FIG. 15 illustrates an example user interface 1060 generated and output by multi-cluster dashboard system 901 when operating in single cluster view. As shown in FIG. 15, multi-cluster dashboard system 901 has switched from multi-cluster view to single dashboard view 1053 for the dashboard in which display region 1021 presents entire usage metrics, monitoring and performance data for the infrastructure of a single desired cluster. This allows the administrator to easily visualize and identify which specific elements are affected for that cluster. Further, if the administrator desires to drill (switch) back up to the cluster view, the administrator can selected the Clusters menu item in the sidebar to return to the multi-cluster view.

In this way, in this particular example, multi-cluster dashboard system 901 enables a user to easily navigate from the multi-cluster view to any individual cluster and back to multi-cluster view without needing to provide additional login authentication for each specific cluster, even though the clusters may be different domains or cloud environments. As described above, a user may log into the master cluster dashboard with his or her credentials for the master cluster, which are authenticated by the controller for the master cluster. When configuring multi-cluster dashboard to add additional member clusters, the credentials for the user that has been authenticated to the master cluster is provided to the authentication components for the cluster being added, which generates and returns a cluster-specific security token with an expiration date. The master cluster controller constructs a hash map that is indexable by the cluster ID to store the security tokens for later seamless authentication of the user when traversing the dashboards.

For example, in the event the user is viewing a multi-cluster dashboard and wants to drill into an individual cluster, as discussed in the example above, multi-cluster view dashboard system 901 makes a call to a security director software component ("cluster token") via an API with the selected (target) cluster's id. This security director software component operates as a form of a security proxy to accesses the stored credentials and configuration of the selected cluster from the hash table to retrieve the security token and then uses the security token to query the controller for the cluster to be viewed so as to load data from the desired cluster. This way the security director and the backend authentication software components for each cluster handle cluster authentication as the user traverses the multiple clusters and switches views between multi-cluster view and single cluster view in which the detail performance and monitoring data for any member cluster can be inspected. This may advantageously provide a seamless user experience since the user can switch between different individual clusters and multi-cluster view without having to refresh or login again.

As an example, assume multiple clusters C1, C2, C3 have been added the multi-cluster dashboard and are configured with usernames u1, u2, u3 and passwords p1, p2, p3, respectively. Let C1 be the master cluster. Typically, the administrator will log into the master cluster such that the dashboard 1004 will have an authenticated security token T1 for the cluster C1. In general, the security directory software component (cluster token API) is configured to accept as inputs token T1 and a clusterID for a target cluster and respond with security token for the specified cluster. For example, let the tokens for C2 and C3 be T2, T3 acquired through the security director API. These tokens are then used to get further details for each of the clusters. In one example, dashboard 1004 represents each cluster by a software object instantiated within a process space of the dashboard, and each cluster object is keyed (accessed) by clusterId, which may be an integer, pointer, index or the like. In this example, each cluster object contains all the necessary data dashboard 1004 has received for display on the view. Information identifying child resources being monitored for the cluster may be stored in respective data structures within the parent object created by dashboard 1004 for the cluster. In one example, all individual security tokens (T1-T3) for the clusters are stored in a hash table along with an expiration timestamp. The master token T1 may also be temporarily cached on the user's browser local storage. When a cluster is selected, multi-cluster dashboard system 901 may perform the following:

1. Determine whether the selected cluster is the current cluster. If so, do nothing. Otherwise, proceed to step 2.
2. If the security token already exists in the token hash table and the security token has not passed expiration, then multi-cluster dashboard system 901 uses the token to request, receive and update the dashboard with that cluster's resources. Otherwise, proceed to step 3.
3. If the security token does not exist, multi-cluster dashboard system 901 uses the master token to make an API call to provide the necessary credentials to receive a security token from the selected cluster. This new token will be added to the token hash table maintained by multi-cluster dashboard system 901. If any previous token existed for the selected cluster, then that token will be overwritten. Then the program will execute step 2 again.

Figure 16:
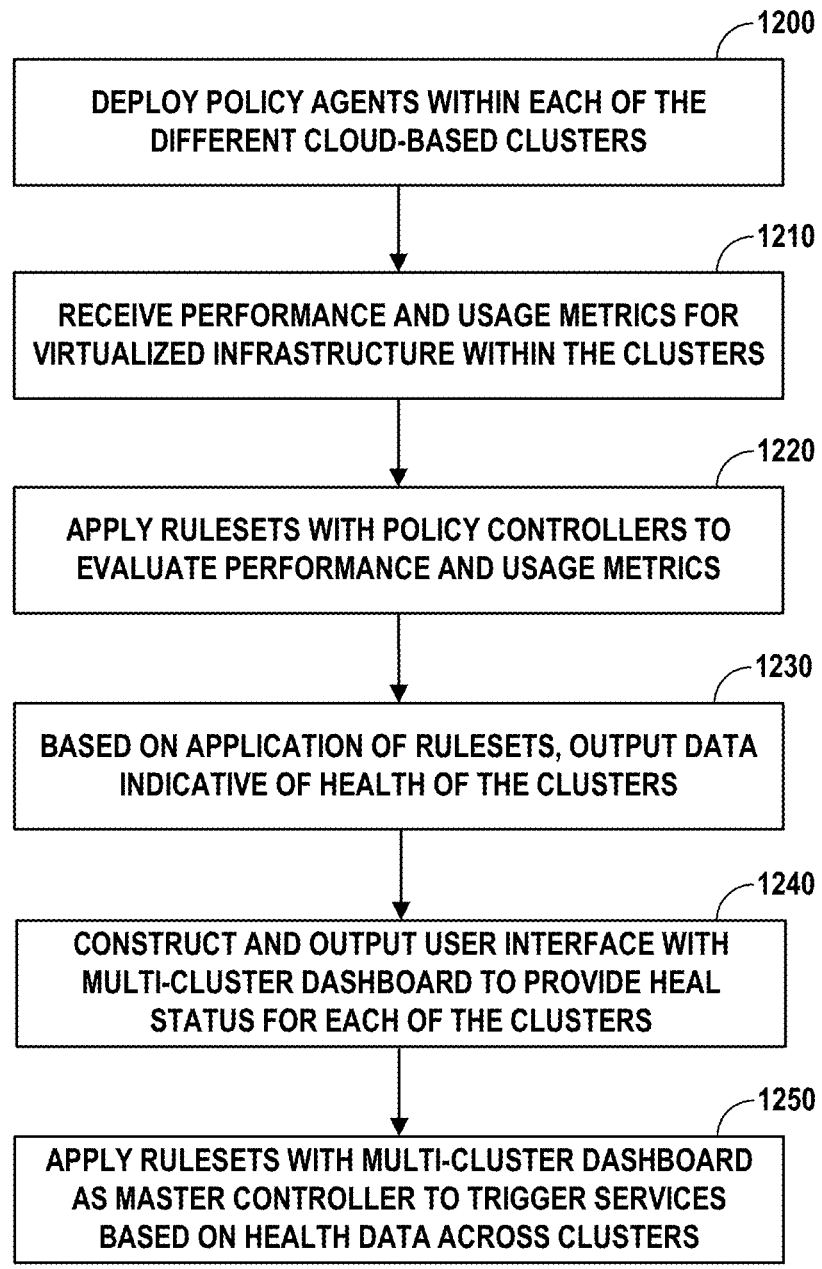
FIG. 16 is a flowchart illustrating one example operation of multi-cluster dashboard software systems described herein.

FIG. 16 is a flowchart illustrating example operation of multi-cluster dashboards described herein. As described, policy agents (e.g., policy agents 205) are deployed for execution on compute nodes within a plurality of different cloud-based compute clusters, where each of the policy agents monitor performance and usage metrics relating to resources of the compute nodes within each of the compute clusters (e.g., different cloud domains or environments) (1200). Each of a plurality of policy controllers (e.g., policy controllers 201) operating with the respective compute clusters receives, from the policy agents executing on the compute nodes of the respective compute cluster, performance and usage metrics for virtualized infrastructure within the cluster (1210).

In response, each of the policy controllers evaluate the performance and usage metrics for respective compute cluster by application of one or more rulesets (e.g., policies 202) for infrastructure elements of the respective compute cluster (1220) and output data to the multi-cluster dashboard (e.g., dashboard 1004), wherein the data is indicative of a current health status for the infrastructure elements and is based on the evaluation of the performance and usage metrics for the cluster (1230). The multi-cluster dashboard constructs and outputs a user interface screen, e.g., for display by UI device 129, that provides the current health status for each of the cloud-based compute clusters, thereby providing a unified view of the different cloud-based compute clusters even though multiple policy controllers may be used for the different cloud domains/environments (1240). In addition, the multi-cluster dashboard may apply rulesets and trigger services based on the data pushed to the multi-cluster dashboard that is indicative of health and status information for the resources within each cluster, thereby easily providing automated policy control over multiple, different cloud-based installations (1250).

The techniques described herein may provide additional advantages. For example, custom services for orchestration may be defined and implemented on the master cluster controller in a multi cluster environment so as to leverage and apply multi-cluster rules across the distributed notifications being received from multiple clusters via the message bus. For example, custom services can be defined and triggered by rules to automatically move virtual machines from one cloud installation to another based on SLA violation(s) detected and reported by one or more individual clusters. Moreover, the services may be triggered by rulesets applied by the master controller to the delta data pushed to the multi-cluster dashboard that is indicative of health and status information for the resources within each cluster. Further, the triggered services may leverage the master token and authentication hash table of tokens to seamlessly perform the services without necessary requiring re-authentication at each of the impacted clusters.

As another example of the potential advantages of the techniques described herein, an administrator may leverage multi-cluster dashboard system 901 and the master cluster controller to easily configure rate chargeback services and configure the service to apply a certain chargeback fee schedule to customer(s) based on the push notifications and deltas received by the multi-cluster dashboard as to the usage metrics that span multiple cloud installations.

As another example of the potential advantages of the techniques described herein, an administrator may leverage multi-cluster dashboard system 901 and configure the master controller for dynamic capacity planning and recommendation based on based on the push notifications and deltas received by the multi-cluster dashboard as to the usage metrics that span multiple cloud installations.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising a storage device and processing circuitry, wherein the processing circuitry has access to the storage device and is configured to:
   receive, from a first plurality of policy agents, information about usage metrics for a first plurality of compute nodes within a first compute cluster;
   generate, based on the usage metrics for the first plurality of compute nodes, a first health status for infrastructure elements in the first compute cluster;
   instruct, based on the first health status, at least one of the first plurality of policy agents to take an action in the first compute cluster;
   receive, from a second plurality of policy agents, information about usage metrics for a second plurality of compute nodes within a second compute cluster, wherein the first compute cluster and the second compute cluster are included within a plurality of compute clusters;
   generate, based on the usage metrics for the second plurality of compute nodes, a second health status for infrastructure elements in the second compute cluster;
   output a multi-cluster user interface for presenting, in a single view, information about both the first health status for the infrastructure elements in the first compute cluster and the second health status for the infrastructure elements in the second compute cluster; and
   switch, responsive to input, between the multi-cluster user interface and a single cluster user interface, wherein the single cluster user interface presents information about a health status for infrastructure elements in any one of the plurality of compute clusters.

2. The computing system of claim 1, wherein the processing circuitry is further configured to:
   maintain a data store for storing authentication tokens for each of the plurality of compute clusters.

3. The computing system of claim 2, wherein to switch between the multi-cluster user interface and the single cluster user interface, the processing circuitry is further configured to:
   access an authentication token of the authentication tokens in the data store and present the single cluster user interface without requiring reauthentication performed by a user.

4. The computing system of claim 1, wherein to output a multi-cluster user interface, the processing circuitry is further configured to:
   enable presentation of a first graphical region within the single view that includes information about the infrastructure elements in the first compute cluster; and
   enable presentation of a second graphical region within the single view that includes information about the infrastructure elements in the second compute cluster.

5. The computing system of claim 4,
   wherein to enable presentation of the first graphical region, the processing circuitry enables presentation of a first plurality of graphical tiles, each corresponding to a different type of infrastructure element within the first compute cluster; and
   wherein to enable presentation of the second graphical region, the processing circuitry enables presentation of a second plurality of graphical tiles, each corresponding to a different type of infrastructure element within the second compute cluster.

6. The computing system of claim 5,
wherein each of the first plurality of graphical tiles includes an integer count of infrastructure elements being monitored within the first compute cluster; and
wherein each of the second plurality of graphical tiles includes an integer count of infrastructure elements being monitored within the second compute cluster.

7. The computing system of claim 5,
wherein each of the first plurality of graphical tiles has an appearance indicating whether a type of infrastructure element within the first compute cluster has been determined to be unhealthy; and
wherein each of the second plurality of graphical tiles has an appearance indicating whether a type of infrastructure element within the second compute cluster has been determined to be unhealthy.

8. The computing system of claim 1, wherein the processing circuitry is further configured to:
output a first single-cluster user interface for presentation as a single-cluster dashboard for the first compute cluster, wherein the first single-cluster user interface presents health status information about the first compute cluster but not health status information about the second compute cluster; and
output a second single-cluster user interface for presentation as a single-cluster dashboard for the second compute cluster, wherein the second single-cluster user interface presents health status information about the second compute cluster but not health status information about the first compute cluster.

9. The computing system of claim 1,
wherein to generate the first health status, the processing circuitry is further configured to evaluate, based on the information about the usage metrics for the first plurality of compute nodes, infrastructure elements for the first compute cluster; and
wherein to generate the second health status, the processing circuitry is further configured to evaluate, based on the information about the usage metrics for the second plurality of compute nodes, infrastructure elements for the second compute cluster.

10. The computing system of claim 1, wherein to generate the first health status, the processing circuitry is further configured to:
generate difference information specifying changes to a prior first health status of infrastructure elements for the first compute cluster.

11. The computing system of claim 10,
wherein the difference information includes specifying a count of a number of infrastructure elements for the first compute cluster having a changed health status.

12. A method comprising:
receiving, by a computing system and from a first plurality of policy agents, information about usage metrics for a first plurality of compute nodes within a first compute cluster;
generating, by the computing system and based on the usage metrics for the first plurality of compute nodes, a first health status for infrastructure elements in the first compute cluster;
instructing, by the computing system and based on the first health status, at least one of the first plurality of policy agents to take an action in the first compute cluster;
receiving, by the computing system and from a second plurality of policy agents, information about usage metrics for a second plurality of compute nodes within a second compute cluster, wherein the first compute cluster and the second compute cluster are included within a plurality of compute clusters;
generating, by the computing system and based on the usage metrics for the second plurality of compute nodes, a second health status for infrastructure elements in the second compute cluster;
outputting, by the computing system, a multi-cluster user interface for presenting, in a single view, information about both the first health status for the infrastructure elements in the first compute cluster and the second health status for the infrastructure elements in the second compute cluster; and
switching, by the computing system and responsive to input, between the multi-cluster user interface and a single cluster user interface, wherein the single cluster user interface presents information about a health status for infrastructure elements in any one of the plurality of compute clusters.

13. The method of claim 12, further comprising:
maintaining, by the computing system, a data store for storing authentication tokens for each of the plurality of compute clusters.

14. The method of claim 13, wherein switching between the multi-cluster user interface and the single cluster user interface includes:
accessing an authentication token of the authentication tokens in the data store and present the single cluster user interface without requiring reauthentication performed by a user.

15. The method of claim 12, wherein outputting a multi-cluster user interface includes:
enabling presentation of a first graphical region within the single view that includes information about the infrastructure elements in the first compute cluster; and
enabling presentation of a second graphical region within the single view that includes information about the infrastructure elements in the second compute cluster.

16. The method of claim 15,
wherein enabling presentation of the first graphical region includes enabling presentation of a first plurality of graphical tiles, each corresponding to a different type of infrastructure element within the first compute cluster; and
wherein enabling presentation of the second graphical region includes enabling presentation of a second plurality of graphical tiles, each corresponding to a different type of infrastructure element within the second compute cluster.

17. The method of claim 16,
wherein each of the first plurality of graphical tiles includes an integer count of infrastructure elements being monitored within the first compute cluster; and
wherein each of the second plurality of graphical tiles includes an integer count of infrastructure elements being monitored within the second compute cluster.

18. The method of claim 16,
wherein each of the first plurality of graphical tiles has an appearance indicating whether a type of infrastructure element within the first compute cluster has been determined to be unhealthy; and
wherein each of the second plurality of graphical tiles has an appearance indicating whether a type of infrastructure element within the second compute cluster has been determined to be unhealthy.

19. The method of claim 12, further comprising:

outputting, by the computing system, a first single-cluster user interface for presentation as a single-cluster dashboard for the first compute cluster, wherein the first single-cluster user interface presents health status information about the first compute cluster but not health status information about the second compute cluster; and outputting, by the computing system, a second single-cluster user interface for presentation as a single-cluster dashboard for the second compute cluster, wherein the second single-cluster user interface presents health status information about the second compute cluster but not health status information about the first compute cluster.

20. A non-transitory computer-readable medium comprising instructions that, when executed, configure processing circuitry of a computing system to:

receive, from a first plurality of policy agents, information about usage metrics for a first plurality of compute nodes within a first compute cluster;

generate, based on the usage metrics for the first plurality of compute nodes, a first health status for infrastructure elements in the first compute cluster;

instruct, based on the first health status, at least one of the first plurality of policy agents to take an action in the first compute cluster;

receive, from a second plurality of policy agents, information about usage metrics for a second plurality of compute nodes within a second compute cluster, wherein the first compute cluster and the second compute cluster are included within a plurality of compute clusters;

generate, based on the usage metrics for the second plurality of compute nodes, a second health status for infrastructure elements in the second compute cluster;

output a multi-cluster user interface for presenting, in a single view, information about both the first health status for the infrastructure elements in the first compute cluster and the second health status for the infrastructure elements in the second compute cluster; and switch, responsive to input, between the multi-cluster user interface and a single cluster user interface, wherein the single cluster user interface presents information about a health status for infrastructure elements in any one of the plurality of compute clusters.

* * * * *